(12) United States Patent
Ma et al.

(10) Patent No.: US 6,507,544 B1
(45) Date of Patent: Jan. 14, 2003

(54) ERROR SIGNAL DETECTION APPARATUS AND REPRODUCTION SIGNAL DETECTION APPARATUS FOR OPTICAL RECORDING/ REPRODUCING SYSTEM AND METHOD THEREFOR

(75) Inventors: Byung-in Ma, Suwon (KR); Byung-ho Choi, Suwon (KR); Chong-sam Chung, Seongnam (KR); In-sik Park, Suwon (KR); Tae-yong Doh, Suwon (KR); Joong-eon Seo, Uiwang (KR)

(73) Assignee: Samsung Electronics Co., Ltd., Suwon (KR)

( * ) Notice: Subject to any disclaimer, the term of this patent is extended or adjusted under 35 U.S.C. 154(b) by 64 days.

(21) Appl. No.: 09/663,839

(22) Filed: Sep. 15, 2000

(30) Foreign Application Priority Data

Sep. 16, 1999 (KR) .............................................. 99-39831
Oct. 21, 1999 (KR) .............................................. 99-45850
Mar. 10, 2000 (KR) .......................................... 2000-12051

(51) Int. Cl.[7] ................................................. G11B 7/00
(52) U.S. Cl. ................................ 369/44.41; 369/44.42; 369/44.32
(58) Field of Search ........................... 369/44.26, 44.27, 369/44.28, 44.29, 44.41, 44.42, 44.32

(56) References Cited

U.S. PATENT DOCUMENTS 6,275,463 B1 * 8/2001 Nagata et al. ........... 369/44.41

* cited by examiner

Primary Examiner—Nabil Hindi
(74) Attorney, Agent, or Firm—Staas & Halsey LLP

(57) ABSTRACT

An error signal detection apparatus for an optical recording/ reproducing system which detects a tilt error signal and/or tracking error signal, based on the phase characteristics of light reflected and diffracted from a recording medium, and a method therefor. The error signal detection apparatus includes multiple photodetectors and a circuit unit for detecting an error signal by processing detection signals generated by each photodetector The the photodetectors are arranged in a matrix wherein a row or column of the matrix is parallel to a direction corresponding to a direction of an information stream on the recording medium. A circuit unit compares the phases of the detection signals of the inner and/or outer light receiving portions arranged in the same row or of detection signals from diagonal positions on the matrix to output at least one of a tilt error signal and a tracking error signal based on the phase comparison.

75 Claims, 36 Drawing Sheets

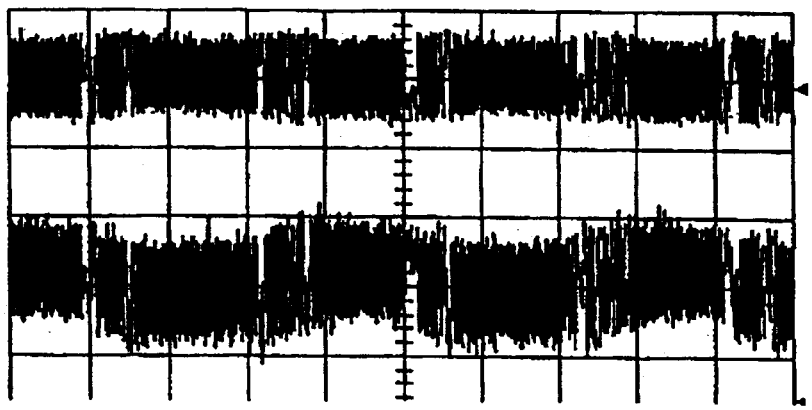
FIG. 6A
FIG. 6B
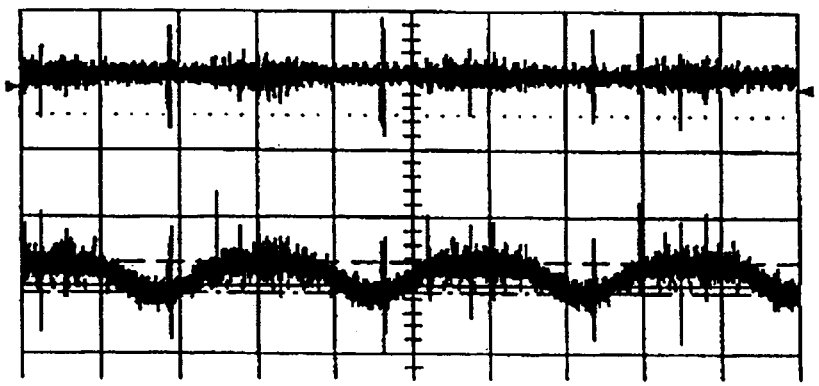
FIG. 7A
FIG. 7B

ERROR SIGNAL DETECTION APPARATUS AND REPRODUCTION SIGNAL DETECTION APPARATUS FOR OPTICAL RECORDING/REPRODUCING SYSTEM AND METHOD THEREFOR

CROSS REFERENCE TO RELATED APPLICATIONS

This application claims the benefit of Korean Application No.99-39831, filed Sep. 16, 1999, Korean Application No. 99-45850, filed Oct. 21, 1999 and Korean Application No. 00-12051, filed Mar. 10, 2000, the disclosures of which are herein incorporated herein by reference.

BACKGROUND OF THE INVENTION

1. Field of the Invention

The present invention relates to an error signal detection apparatus for an optical recording/reproducing system, which is capable of detecting a tilting error signal and/or a tracking error signal, based on the phase characteristics of light reflected and diffracted from a recording medium, with improved accuracy and precision, and a reproduction signal detection apparatus for an optical recording/reproducing system and method therefor.

2. Description of the Related Art

Optical pickups record an information signal on or reproduce an information signal from a recording medium, such as an optical disk seated on a turntable and rotating, while scanning the recording medium in the radial direction. However, if the rotating optical disk is tilted with respect to the optical axis, due to bending of the optical disk itself or error in loading the disk, degradation of a recording/reproduction signal can be caused.

When an optical pickup adopts a light source which emits a shorter wavelength of light, and an objective lens having a high numerical aperture (NA), for the purpose of increasing recording density, comma aberration caused by tilting of the optical disk increases, thereby further degrading the recording/reproduction signal. This is because optical aberration is proportional to $\lambda/(NA)^3$.

In an optical recording/reproducing system required for high-density recording and reproduction with a medium, such as a next generation digital versatile disk (DVD), so-called high-definition (HD)-DVD, which has been focused on as a future generation high-density recording medium, there is a need for a tilt error signal detection apparatus capable of preventing degradation of the recording/reproduction signal by detecting the degree of tilting of the disk and correcting for the tilting of the disk based on the result of the detection.

As a conventional tilt error signal detection apparatus, the tilt error signal detection apparatus shown in FIG. 2, which detects tilting of a disk 10 with respect to an objective lens 7, using a signal detected by a photodetector 9 of a general optical pickup as shown in FIG. 1, has been suggested.

FIG. 1 illustrates an example of the optical structure of a general optical pickup. Referring to FIG. 1, a laser beam emitted from a light source 1 for recording and reproducing an information signal is incident on an objective lens 7 through a beam splitter 5. The objective lens 7 focuses incident light from the light source 1 to form a light spot on the recording surface of the disk 10. Light reflected from the recording surface of the optical disk 10 passes through the objective lens 7, is reflected by the beam splitter 5, and goes toward the photodetector 9. Reference numeral 8 indicates a light sensing lens for condensing light reflected by the beam splitter 5 through the objective lens 7 to allow detection of light by the photodetector 9.

The photodetector 9 includes four divided plates A, B, C and D, as shown in FIGS. 2 and 3, for receiving light and performing photoelectric conversion, separately, on incident light. The photodetector 9 sums and/or subtracts the signals detected by the four divided plates A, B, C and D, to detect an information signal and an error signal.

As shown in FIG. 2, the conventional tilt error signal detection apparatus includes a photodetector 9 for use in recording and reproducing an information signal, which consists of four divided plates A, B, C and D arranged in a 2×2 matrix, for receiving light reflected by a disk (not shown) and separately performing photoelectric convention on incident light, first and second adders 11 and 13 for summing the signals generated by the divided plates A and D, and the signals generated by the divided plates B and C, respectively, and a differential unit 15 for subtracting the signals from the first and second adders 11 and 13, and outputting a radial push-pull signal.

The radial push-pull signal output from the differential unit 15 corresponds to a tilt error signal. This radial push-pull signal can be used as a tracking error signal.

The tilt error signal output from the conventional tilt error signal detection apparatus is provided to an apparatus for adjusting relative tilt between the objective lens 7 and the disk 10, and is used in correcting for the tilt error by the apparatus.

The conventional tilt error signal detection apparatus has an advantage of a simple configuration. However, a tilt error signal is detected by subtracting the detection signals of the two groups of the divided plates, which face each other on either side of the central axis aligned in the tangential direction. For this reason, when the objective lens is shifted or when an objective lens-to-disk distance is beyond On-focus positions, the tilt error signal varies with high sensitivity, and thus it is difficult to detect the degree of tilt error with accuracy.

On the other hand, when recording information on or reproducing information from a disk using the optical pickup as shown in FIG. 1, it is required for the optical pickup to accurately trace the tracks of the optical disk. To end this, usually the optical pickup employs a unit for detecting a tracking error signal from the disk by receiving light reflected by the disk after having been emitted from the light source.

As shown in FIG. 3, a conventional differential push-pull detection (DPD) type tracking error signal detection apparatus includes a photodetector 9 for use in detecting an information signal, a matrix circuit 21, two high-pass filters HPF1 and HPF2, two pulse shaping circuits 23 and 25, and a phase comparator 27.

The matrix circuit 21 receives signals a, b, c and d, detected by the four divided plates A, B, C and D, respectively, and sums the detected signals of the diagonally opposite divided plates A and C, and diagonally opposite divided plates B and D, respectively. If a light spot is formed beyond the center of the track, a time delay or a phase difference occurs between the sums (a+c) and (b+d) of the signals. Thus, the amount of tracking error can be identified by detecting the time delay between these signals.

The high-pass filters HPF1 and HPF2 filter off a low-frequency component of the sums (a+c) and (b+d) of the signals output from the matrix circuit 21, and pass only a high-frequency component.

The signals (a+c) and (b+d) passed through the high-pass filters HPF1 and HPF2, respectively, are converted to pulse signals through the pulse shaping circuits 23 and 25. The phase comparator 27 compares the phases of the pulse signals, and outputs a tracking error signal TES'.

The DPD type tracking error signal detection apparatus, which employs the four-section photodetector 9, is adopted to detect the amount of tracking error of the disk in a read only memory (ROM) type disk drive.

Meanwhile, as shown in FIG. 4A, light reflected by the disk for reproduction, after having been focused on the disk, is diffracted into a 0th order diffracted beam and ±1st order diffracted beams by pits (P) or marks (not shown) formed on the tracks of the disk 10. Thus, the photodetector 9 receives the 0th order diffracted beam and ±1st order diffracted beams, which overlap each other in the radial direction. FIG. 4A illustrates light reflected and diffracted in the radial direction from a high-density disk having narrow tracks. This shows the case where ±1st order diffracted beams overlap the 0th order diffracted beam, while separated from each other according to the width of a pit. The signals resulting from the two overlapping portions, i.e., between the 0th order diffracted beam and ±1st order diffracted beam, and between the 0th order diffracted beam and −1st order diffracted beam, have different phase characteristics from the signal resulting from the 0th order diffracted beam.

If a disk having pits or marks with a relatively large width, three beams, 0th order diffracted beam and ±1st order diffracted beams, reflected and diffracted from the disk, may overlap each other in a portion. In this case, the overlapping portion of the three beams, and the overlapping portions between the 0th order diffracted beam and ±1st order diffracted beam, and between the 0th order diffracted beam and −1st order diffracted beam, show different phase characteristics.

In the case where the disk 10 having narrow tracks for high-density recording, as shown in FIG. 4A, is adopted, along with the reduction of the track pitch, for example, the minimum length of the pit (P) and the minimum interval between the pits (Ps) become short, compared to a general normal density disk (not shown).

As the disk 10 rotates, light is continuously radiated over the pit (P), and the base surface 10a, which is between the pits 10. At the time when the light spot tracing tracks of the disk 10 lands on both a pit (P) and the base surface 10a, interference and diffraction occur between light reflected by the pit (P) and light reflected by the base surface 10a due to the difference in optical paths. As a result, as shown in FIG. 4B, 0th order diffracted beam and ±1st order diffracted beams are generated such that they overlap.

Thus, light received by the photodetector 9 includes light from a 0th order diffracted beam and ±1st order diffracted beams, which overlap in the track direction, i.e., in the tangential direction. The phase signals in the overlapping portions, i.e., between 0th order diffracted beam and ±1st order diffracted beam, and between 0th order diffracted beam and −1st order diffracted beam, show different characteristics from the phase signal of the pure 0th order diffracted beam. As shown in FIGS. 4A and 4B, the diffracted beams are complexly overlapping each other and the photodetector 9 receives such complexly overlapping diffracted beams.

As for the conventional tilt error signal detection apparatus shown in FIG. 2, incident light is received by the four divided plates A, B, C and D, and a tilt error signal, i.e., a radial push-pull signal, can be detected from the detected signals. However, the phase characteristics of the detected signals are obscured, and thus the degree of accuracy in detecting the tilt error signals is low.

As for the conventional tracking error signal detection apparatus shown in FIG. 3, the detection signals of the two divided plates A and C, and B and D in the diagonal direction are summed, so that the phase characteristics between the detection signals in the tangential direction are obscured. Thus, in the case where a tracking error signal is detected with the conventional tracking error signal detection apparatus shown in FIG. 3 for high-density recording and reproduction, the phase signals in the overlapped portions can act as noise.

Furthermore, because a high-density optical disk has a narrow minimum pit or mark interval, if interference due to neighboring pits or marks occurs, the level of noise in the tracking error signal can further increase.

Thus, when the conventional tracking error signal detection apparatus of FIG. 3 is employed in detecting a tracking error signal from a high-density disk having narrow tracks for recording and reproducing operations, it is difficult to accurately detect the tracking error signal due to decreased gain and increased noise.

SUMMARY OF THE INVENTION

To solve the above problems, it is an object of the present invention to provide an error signal detection apparatus for an optical recording/reproducing system, in which a tilt error signal and/or a tracking error signal can be detected, from a high-density disk having narrow tracks, with high accuracy and precision, in consideration of the phase characteristics of light reflected and diffracted from a recording medium, and a reproduction signal detection apparatus.

Additional objects and advantages of the invention will be set forth in part in the description which follows, and, in part, will be obvious from the description, or may be learned by practice of the invention.

To achieve the object of the present invention, there is provided an error signal detection apparatus for an optical recording/reproducing system, comprising; a photodetector for detecting an information signal by receiving light reflected and diffracted from a recording medium; and a circuit unit for detecting an error signal by processing detection signals generated by the photodetector, wherein, when the direction of information stream recorded on the recording medium is defined as a tangential direction, and the direction perpendicular to the information stream is defined as a radial direction, the photodetector comprises eight light receiving portions arranged in a 2×4 matrix (2 rows×4 columns), to separately perform photoelectric conversion on light reflected and diffracted from the recording medium, wherein the rows of the matrix are parallel to a direction corresponding to the radial direction of the recording medium, and the columns of the matrix are parallel to a direction corresponding to the tangential direction, and the eight light receiving portions include four inner light receiving portions arranged at the center region of the photodetector, and four outer light receiving portions arranged around the corresponding inner light receiving portions, and the circuit unit compares the phases of the detection signals of the inner and/or outer light receiving portions arranged in the same row, and outputs a tilt error signal and/or tracking error signal from phase comparison signals.

In another embodiment, the circuit unit amplifies the detection signals generated by the inner and/or outer light receiving portions arranged in a first diagonal direction by a predetermined gain factor, compares the phase of the amplified signal with the phase of the detection signals generated by the inner and/or outer light receiving portions arranged in a second diagonal direction, and outputs a tilt error signal and/or tracking error signal from phase comparison signals.

The present invention provides an error signal detection apparatus for an optical recording/reproducing system, comprising: a photodetector for receiving light reflected and diffracted from a recording medium; and a circuit unit for detecting an error signal by processing detection signals generated by the photodetector, wherein, when the direction of information stream recorded in the recording medium is defined as a tangential direction, and the direction perpendicular to the information stream is defined as a radial direction, the photodetector comprises first through fourth light receiving portions arranged counterclockwise in order in a 2×2 matrix, to separately perform photoelectric conversion on light reflected and diffracted from the recording medium, the first through fourth light receiving portions, wherein the rows of the matrix are parallel to a direction corresponding to the radial direction of the recording medium, and the columns of the matrix are parallel to a direction corresponding to the tangential direction, and the circuit unit compares the phases of the detection signals generated by the light receiving portions arranged in the same row or column, and detects a tilt error signal and/or tracking error signal from phase detection signals.

In another embodiment, the circuit units comprises: first and second delays for delaying the phases of the detection signals generated by the first and second light receiving portions arranged in one row of the matrix, respectively; and a phase comparator for comparing the phase of the sum of the delayed detection signal of the first light receiving portion and the detection signal generated by the diagonally opposite third light receiving portion, and the phase of the sum of the delayed detection signal of the second light receiving portion and the detection signal generated by the diagonally opposite fourth light receiving portion.

The present invention provides an error signal detection apparatus for an optical recording/reproducing system comprising: a photodetector for receiving light reflected and diffracted from a recording medium; and a circuit unit for detecting an error signal by processing detection signals generated by the photodetector, wherein, when the direction of an information stream recorded in the recording medium is defined as a tangential direction, and the direction perpendicular to the information stream is defined as a radial direction, the photodetector comprises eight light receiving portions in a 4×2 matrix (4 rows×2 columns), to separately perform photoelectric conversion on light reflected and diffracted from the recording medium, wherein the rows of the matrix are parallel to a direction corresponding to the radial direction, and the columns of the matrix are parallel to a direction corresponding to the tangential direction, and the eight light receiving portions include four inner light receiving portions arranged at the center region of the photodetector, and four outer light receiving portions arranged around the corresponding inner light receiving portions, and the circuit unit compares the phases of the detection signals of the inner and/or outer light receiving portions arranged in the same row, and outputs a tilt and/or tracking error signal from phase comparison signals.

Another error signal detection apparatus for an optical recording/reproducing system, comprises: a photodetector for receiving light reflected and diffracted from a recording medium; and a circuit unit for detecting an error signal by processing detection signals generated by the photodetector, wherein, when the direction of an information stream recorded on the recording medium is defined as a tangential direction, and the direction perpendicular to the information stream is defined as a radial direction, the photodetector comprises eight light receiving portions in a 4×2 matrix (4 rows×2 columns), to separately perform photoelectric conversion on light reflected and diffracted from the recording medium, wherein the rows of the matrix are parallel to a direction corresponding to the radial direction of the recording medium, and the columns of the matrix are parallel to a direction corresponding to the tangential direction, and the eight light receiving portions include four inner light receiving portions arranged at the center region of the photodetector, and four outer light receiving portions arranged around the corresponding inner light receiving portions, and the circuit unit amplifies the sum of the detection signals generated by the inner and/or outer light receiving portions arranged in a first diagonal direction by a predetermined gain factor, compares the phase of the amplified signal with the phase of the sum of the detection signals generated by the inner and/or outer light receiving portions arranged in a second diagonal direction, to detect a tilt and/or tracking error signal.

Another error signal detection apparatus for an optical recording/reproducing system, comprises: a photodetector for receiving light reflected and diffracted from a recording medium; and a circuit unit for detecting an error signal by processing detection signals generated by the photodetector, wherein, when the direction of information stream recorded on the recording medium is defined as a tangential direction, and the direction perpendicular to the information stream is defined as a radial direction, the photodetector comprises first through fourth light receiving portions arranged counterclockwise in order in a 2×2 matrix, and separated in the radial and/or tangential direction, to separately perform photoelectric conversion on light reflected and diffracted from the recording medium, the first through fourth light receiving portions, wherein the rows of the matrix are parallel to a direction corresponding to the radial direction of the recording medium, and the columns of the matrix are parallel to a direction corresponding to the tangential direction, and the circuit unit comprises: an amplifier for amplifying the sum of the detection signals generated by the first and third light receiving portions arranged in a first diagonal direction by a predetermined gain factor; and a phase comparator for comparing the phase of the output signal of the amplifier and the phase of the sum of the detection signals generated by the second and fourth light receiving portions arranged in a second diagonal direction, to detect a tilt and/or tracking error signal.

According to another aspect of the present invention, there is provided an apparatus for detecting a reproduction signal with a photodetector having eight light receiving portions in a 2×4 matrix, four inner light receiving portions arranged at the center region of the photodetector, and four outer light receiving portions arranged around the corresponding inner light receiving portions, wherein, when the direction of information stream recorded on the recording medium is defined as a tangential direction, and the direction perpendicular to the information stream is defined as a radial direction, the rows of the matrix are parallel to a direction corresponding to the radial direction of the recording medium, and the columns of the matrix are parallel to a direction corresponding to the tangential direction, the apparatus comprising: first through fourth delays for delaying a predetermined period of time the detection signals generated by the inner and outer light receiving portions, respectively, arranged in one row; a first adder for summing a delayed detection signal for one of the inner light receiving portions arranged in a first diagonal direction and the detection signal generated by the other inner light receiving portion arranged in the first diagonal direction, and outputting a first sum signal; a second adder for summing a delayed detection signal for one of the outer light receiving portions arranged in the first diagonal direction and the detection signal generated by the other outer light receiving portion arranged in the first diagonal direction, and outputting a second sum signal; a third adder for summing a delayed detection signal for one of the inner light receiving portions arranged in a second diagonal direction and the detection signal generated by the other inner light receiving portion arranged in the second diagonal direction, and outputting a third sum signal; a fourth adder for summing a delayed detection signal for one of the outer light receiving portions arranged in the second diagonal direction and the detection signal generated by the other outer light receiving portion arranged in the second diagonal direction, and outputting a fourth sum signal; and a fifth adder for summing the first through fourth sum signals and outputting the reproduction signal.

BRIEF DESCRIPTION OF THE DRAWINGS

The above objective and advantages of the present invention will become more apparent by describing in detail preferred embodiments thereof with reference to the attached drawings in which:

FIGS. 6A and 6B are graphs showing the output signals of the circuit unit of FIG. 5 when a tracking servo is not operated;

FIGS. 7A and 7B are graphs showing the output signals of the circuit unit of FIG. 5 when the tracking servo is operated;

DESCRIPTION OF THE PREFERRED EMBODIMENTS

Figure 1:
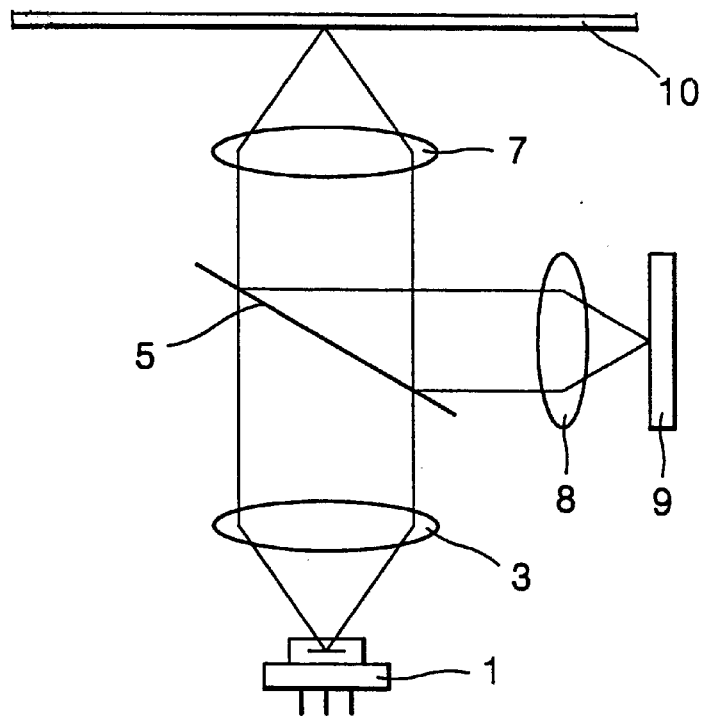
FIG. 1 is a schematic view of an example of a conventional general optical pickup.

Reference will now be made in detail to the present preferred embodiments of the present invention, examples of which are illustrated in the accompanying drawings, wherein like reference numerals refer to like elements throughout.

Figure 4A:
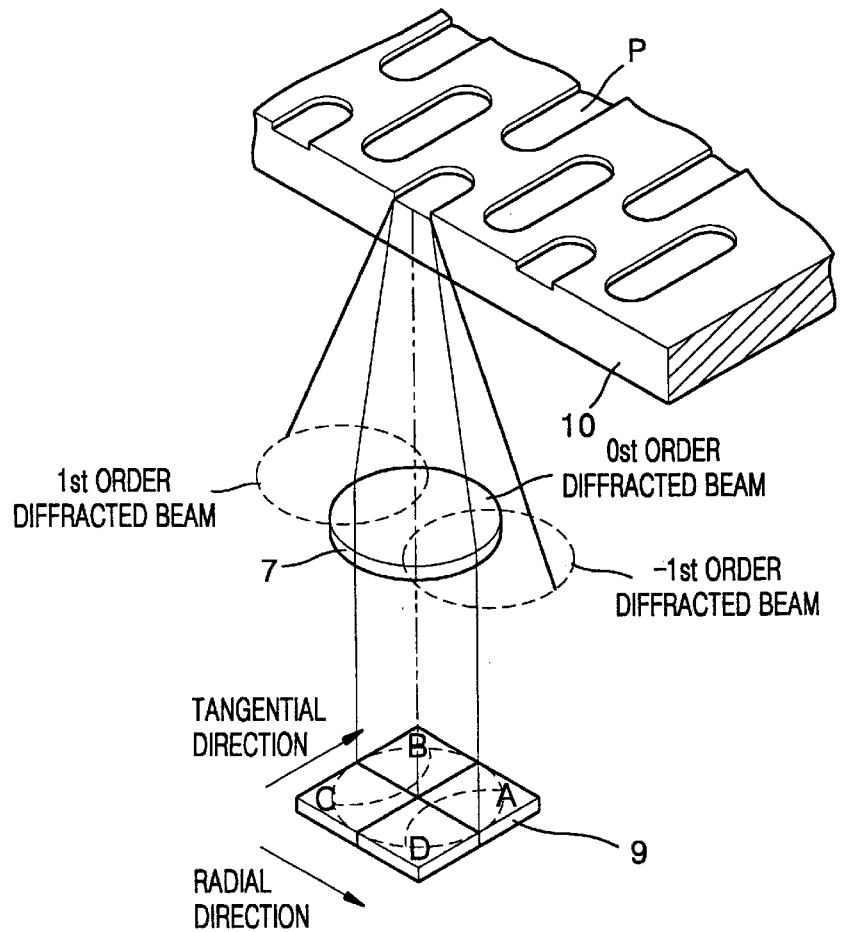
FIG. 4A illustrates light reflected and diffracted in the radial direction from a common high-density recording medium.
Figure 4B:
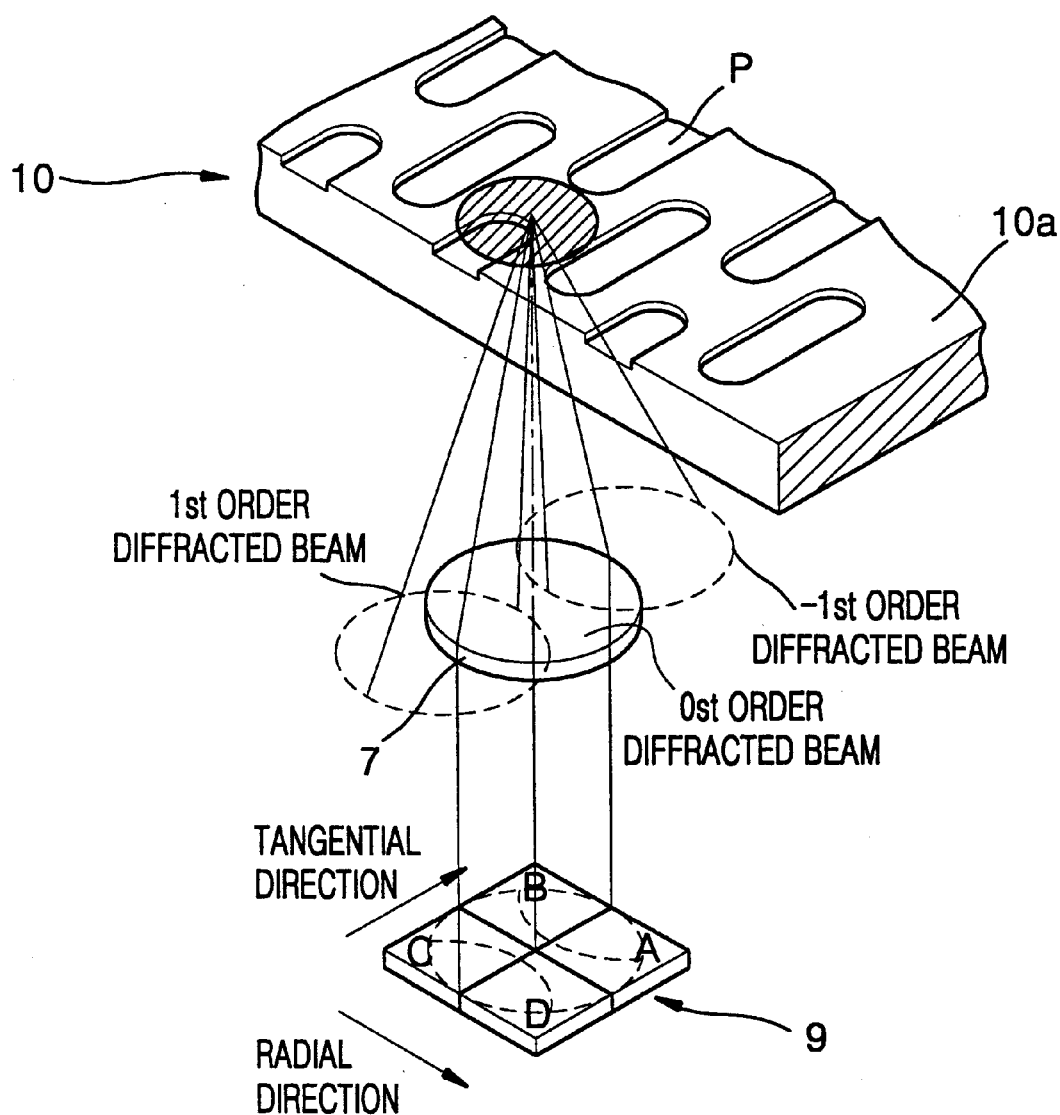
FIG. 4B illustrates light reflected and diffracted in the tangential direction from a common high-density recording medium.
Figure 5:
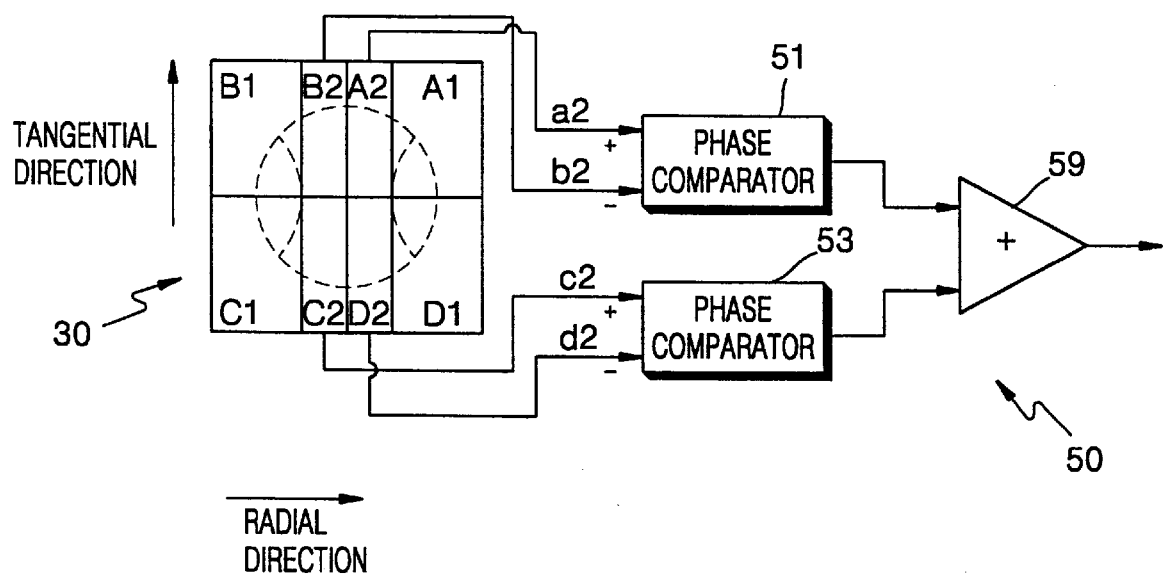
FIG. 5 is a schematic diagram of a preferred embodiment of an error signal detection apparatus for an optical recording/reproducing system according to the present invention.

As shown in FIG. 5, a preferred embodiment of an error signal detection apparatus for an optical recording/reproducing apparatus according to the present invention includes a photodetector 30 for receiving light reflected and diffracted from a recording medium, such as the disk 10 of FIGS. 4A and 4B, and a circuit unit 50 for processing the signals converted by the photodetector 30 to detect an error signal. The photodetector 30 receives light reflected by the recording medium, and the received signals are utilized in detecting a tilt error signal, which is caused by tilting of an objective lens 7 (see FIG. 1) with respect to the recording medium, a tracking error signal, a reproduction signal from the recording medium, or the like. That is, the photodetector 30 is for use in detecting an information signal in an optical pickup.

Assuming that the direction of an information stream recorded on the recording medium is a tangential direction, and the direction perpendicular to the information stream is a radial direction, the photodetector 30 is divided into two in a direction corresponding to the tangential direction of the recording medium (hereinafter, referred to as just tangential direction), and into four in a direction corresponding to the radial direction of the recording medium (hereinafter, referred to as just radial direction), which provides an 8-section structure. The photodetector 30 includes four inner light receiving portions A2, B2, C2 and D2, which are arranged counterclockwise in order, and four outer light receiving portions A1, B1, C1 and D1, which are arranged counterclockwise in order. Here, the eight light receiving portions are arranged in a 2×4 matrix (2 row×4 column), wherein the rows are parallel to a direction corresponding to the radial direction, and the columns are parallel to a direction corresponding to the tangential direction, and each light receiving portion separately performs photoelectric conversion on incident light. The inner light receiving portions A2, B2, C2 and D2 are long in the tangential direction and narrow in the radial direction. That is, a length of the light receiving portion in the tangential direction is greater than a width of the light receiving portion in the radial direction.

The total width of the inner light receiving portions A2, B2, C2 and D2 in the radial direction is appropriately determined within the range of 10 to 80% of the diameter of the 0th order diffracted beam in consideration of the track pitch and length and width of pits on the recording medium, the numerical aperture (NA) of the objective lens 7 (see FIG. 1), and the wavelength of light emitted from a light source.

For example, if a recording medium whose pit or mark width is determined such that 0th order and ±1st order diffracted beams, which are reflected and diffracted in the radial direction by the recording medium, overlap only between each of the ±1st order diffracted beams and the 0th order diffracted beam, not between ±1st order diffracted beam and −1st order diffracted beam, is adopted, it is preferable that the photodetector is designed such that the inner light receiving portions A2, B2, C2 and D2 receive only a portion of the overlapping portions between each of the ±1st order diffracted beams and the 0th order diffracted beam, or do not receive the overlapping portions at all.

Preferably, the total width of the inner light receiving portions A2, B2, C2 and D2 in the radial direction is large enough so as not to receive the overlapping portions between each of the ±1st order diffracted beams and the 0th order diffracted beam.

Signals a2, b2, c2 and d2 generated by the inner light receiving portions A2, B2, C2 and D2 exclusively include the characteristics of the 0th order diffracted beam, while signals a1, b1, c1 and d1 generated by the outer light receiving portions A1, B1, C1 and D1 include the characteristics of the overlapping portions between each of the ±1st order diffracted beams and the 0th order diffracted beam.

For example, assuming that a light spot is focused on the center of a track of the recording medium, the detection signals a1, b1, c1 and d1 of the outer light receiving portions A1, B1, C1 and D1, and the detection signals a2, b2, c2 and d2 of the inner light receiving portions A2, B2, C2 and D2 show the following phase relationship according to radial tilt error. As for the detection signals a1, b1, c1 and d1 generated by the outer light receiving portions A1, B1, C1 and D1, if the radial tilt error is positive, the phase of the detection signal a1 is retarded to that of the detection signal b1, and the phase of the detection signal c1 is retarded to that of the detection signal d1. If the radial tilt error is negative, the reverse effect results.

As for the detection signals a2, b2, c2 and d2 generated by the inner light receiving portions A2, B2, C2 and D2, if the radial tilt error is positive, the phase of the detection signal a2 is retarded to that of the detection signal b2, and the phase of the detection signal c2 is retarded to that of the detection signal d2. If the radial tilt error is negative, the reverse effect results.

The phase relationship between the detection signals a1, b1, c1 and d1 of the outer light receiving portions A1, B1, C1 and D1, and the detection signals a2, b2, c2 and d2 of the inner light receiving portions A2, B2, C2 and D2 according to tracking error shows a similar tendency to the above.

The photodetector 30 having the above divided structure according to the present invention, which is able to detect a tilt error signal and/or a tracking error signal based on the phase characteristics of light in each light receiving portion of the photodetector, also has the circuit unit 50.

If a recording medium with a predetermined pit or mark width by which the three beams, 0th order diffracted beam and ±1st order diffracted beams from the recording medium, overlap each other in a portion is adopted, the total width of the inner light receiving portions A2, B2, C2 and D2 in the radial direction is determined to be large enough to receive the overlapping portion of the three beams. In this case, the phase relationship between the detection signals a2, b2, c2 and d2 shows a similar tendency as described above.

Although the following embodiments are described with reference to a recording medium having a pit or mark width which does not allow the ±1st order diffracted beams to overlap each other after reflection, as in the present embodiment, it will be appreciated that the error detection apparatus according to the present invention is applicable to a recording medium having a pit or mark width which allows the three beams to overlap each other in a portion.

According to a preferred embodiment of the present invention, the circuit unit 50 compares the phases of the detection signals a2 and b2 of the inner light receiving portions A2 and B2, and the phases of the detection signals c2 and d2 of the inner light receiving portions C2 and D2, which are arranged in the same row, and outputs a tilt error signal using the obtained phase comparison signals.

In particular, as shown in FIG. 5, the circuit unit 50 includes first and second phase comparators 51 and 53, which compare the phases of the detection signals a2 and b2 of the inner light receiving portions A2 and B2, and the phases of the detection signals c2 and d2 of the inner light receiving portions C2 and D2, respectively, to output first and second phase comparison signals, respectively, and an adder 59 for summing the first and second phase comparison signals output from the first and second phase comparators 51 and 53.

The first phase comparator 51 receives the detection signals a2 and b2 of the two inner light receiving portions A2 and B2 positioned in the first row of the photodetector 30 and compares the phases of the generated detection signals a2 and b2. The second phase comparator 53 receives the detection signals c2 and d2 of the two inner light receiving portions C2 and D2 positioned in the second row of the photodetector 30 and compares the phases of the generated detection signals c2 and d2.

The error signal output from the adder 59 is the sum of the first and second phase comparison signals. Thus, the phase comparison signal obtained by comparing the inner light receiving portions of one row is added to the phase comparison signal obtained by comparing the signals from the inner light receiving portions of the other row.

FIGS. 6A and 6B illustrate the output signal of the adder 59 when a tracking servo of an optical recording/reproducing system is not operated. In this case, if a tilt error of a recording medium with respect to an objective lens does not occur, a signal including only a tracking error component is output from the adder 59, as shown in FIG. 6A.

Meanwhile, if a tilt error of the recording medium with respect to the objective lens exists, a signal including a tilt error component as well as a tracking error component is output from the adder 59, as shown in FIG. 6B. The high frequency component in FIG. 6B is a tracking error signal, and the low frequency component in FIG. 6B is a tilt error signal.

When the tracking error and/or the tilt error occur as previously mentioned, the tracking error signal component and/or the tilt error signal component are included in the signal output from the adder 59. Thus, the output signal of the adder 59 is just the tilt error signal when the tracking servo is operated. Also, if the tilting of an optical disk is controlled, or if the tilting of the optical disk is not a problem to an optical recording/reproducing system, the output signal of the adder 59 is just the tracking error signal.

FIGS. 7A and 7B illustrate the output signal of the adder 59 when a light spot traces along On-track positions of the recording medium by operation of the tracking servo. Referring to FIGS. 7A and 7B, if a tilt error of the recording medium with respect to the objective lens does not occur, because the tracking servo is under operation, a signal including almost no tilt error nor tracking error components is output from the adder 59, as shown in FIG. 7A.

Meanwhile, if a tilt error of the recording medium with respect to the objective lens exists, due to the operation of the tracking servo, a signal including a tilt error component and almost no tracking error component is output from the adder 59, as shown in FIG. 7B.

For general optical recording/reproducing systems, the tracking servo continuously operates in a record/reproduction mode.

As described with reference to FIGS. 6A through 7B, when the error signal detection apparatus shown in FIG. 5 is adopted in an optical recording/reproducing system, the tilt error signal is output from the adder 59 of the circuit unit 50, and can be used in controlling the relative tilt between the objective lens and the recording medium. It will be apparent that the error signal detection apparatus of FIG. 5 can be used for detecting a tracking error signal as needed.

Figure 8:
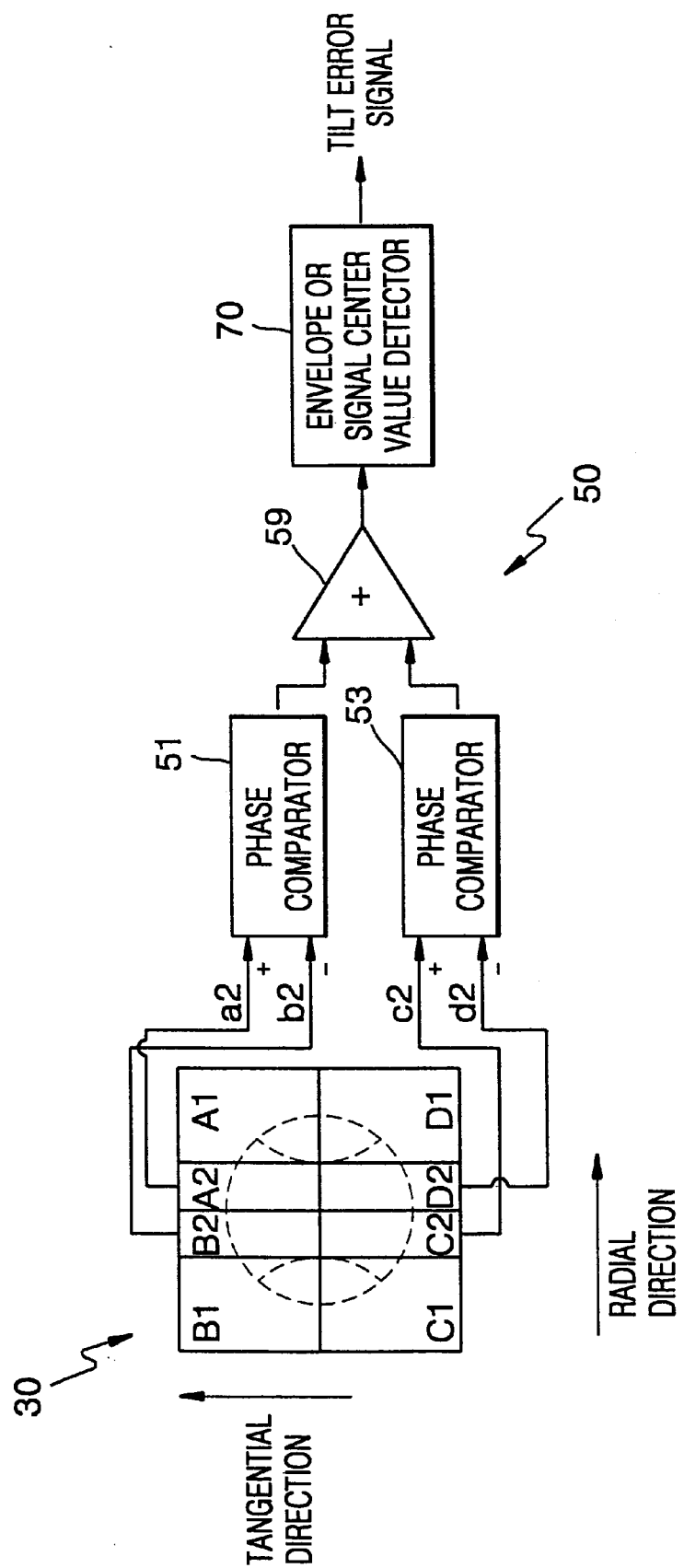
FIGS. 8 through 21 illustrate alternative embodiments of an error signal detection apparatus for an optical recording/reproducing system according to the present invention.

To detect a tilt error signal using the error signal detection apparatus, as show in FIG. 5, without operation of the tracking servo, a detector 70 for detecting an envelope or a variation of signal center value of the signal output from the circuit unit 50 can be further included at the output end of the adder 59, as shown in FIG. 8.

For example, when an envelope detector is adopted as the detector 70, the envelope detector detects the envelope of the signal output from the adder 59, which looks like the signal of of FIG. 7B, i.e., a relatively low-frequency tilt error signal. Thus, the detector 70 outputs the signals as shown in FIGS. 7A and 7B, depending on whether a tilt error is present or not.

When a signal center value detector is adopted as the detector 70, the signal center value detector detects and outputs the center value of the tracking error signal component. The center value variation of the tracking error signal component corresponds to the tilt error signal component, and is approximately the same as the envelope signal.

Figure 9:
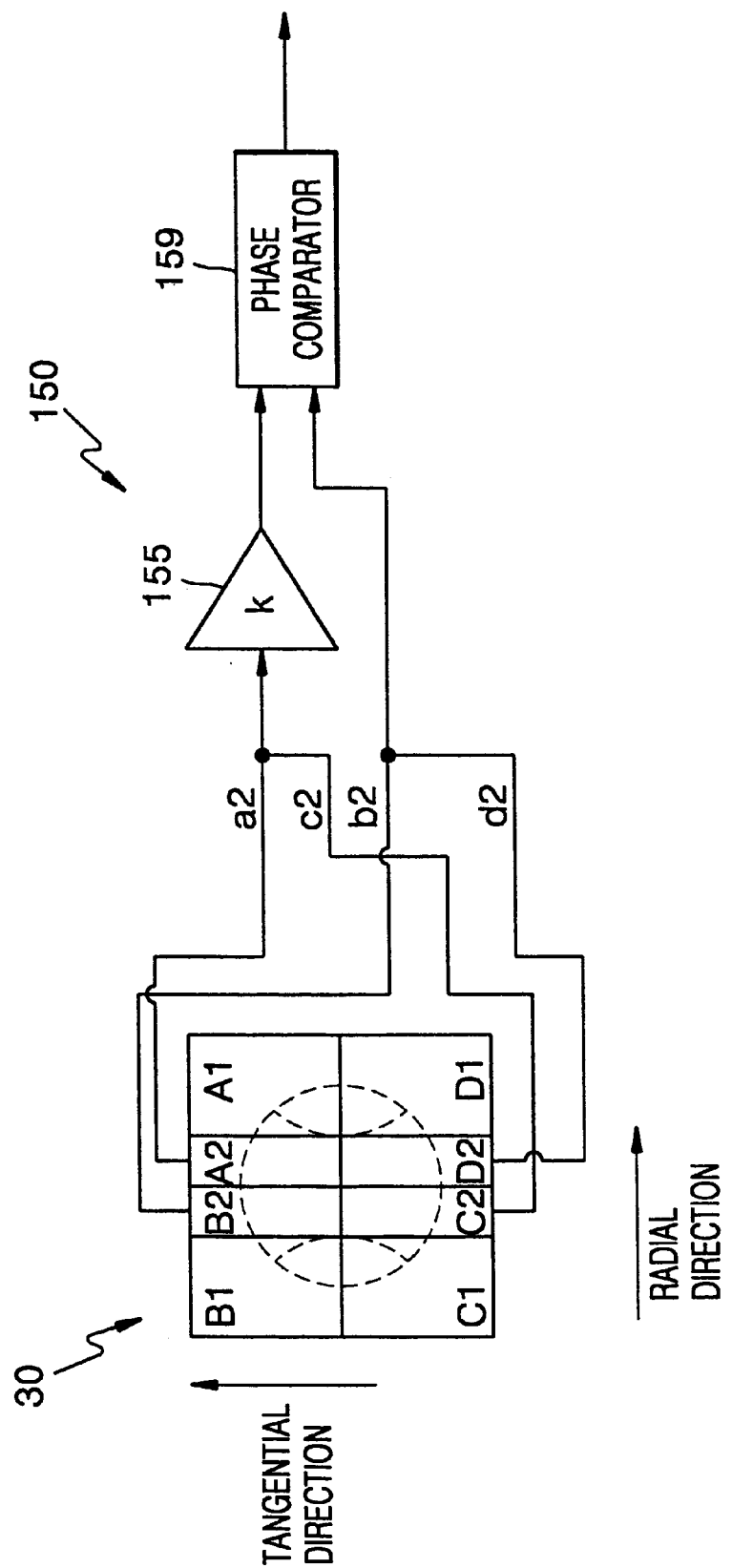

Another embodiment of the present invention is shown in FIG. 9. Referring to FIG. 9, the circuit unit 150 comprises a phase comparator 159 for comparing the phase of the sum (a2+c2) of the detection signals a2 and c2 of diagonally opposite inner light receiving portions A2 and C2, and the phase of the sum (b2+c2) of detection signals b2 and d2 of diagonally opposite inner light receiving portions B2 and D2.

As previously mentioned, the phases of the detection signals a2 and c2 either lead or lag the phases of the detection signals b2 and d2, respectively. In other words, the phase characteristics of the detection signal a2 are more similar to the detection signal c2 than to the detection signal b2.

Thus, similar to the circuit unit 50 shown in FIG. 5, an error signal can be detected by summing the detection signals of the diagonally opposite inner light receiving portions, which have similar phase characteristics, and comparing the obtained results.

In the embodiment of FIG. 9, it is preferable that the circuit unit 150 further comprises a gain controller 155 to amplify one of the sums, (a2+c2) or (b2+d2), with a predetermined gain factor k, and to output an amplified result to the phase comparator 159, which enables correction of offset of the error signals. Here, the gain factor k is a non-zero constant.

Similar to a general differential push-pull detection (DPD), the error signal detection apparatus described with reference to FIG. 9 sums the detection signals of the diagonally opposite light receiving portions, and compares the phases of the two results. However, only the detection signal corresponding to the 0th order diffracted beam of the light received by the photodetector 30 is used, and thus a tilt error signal and/or tracking error signal can be detected with high precision and accuracy.

Figure 10:
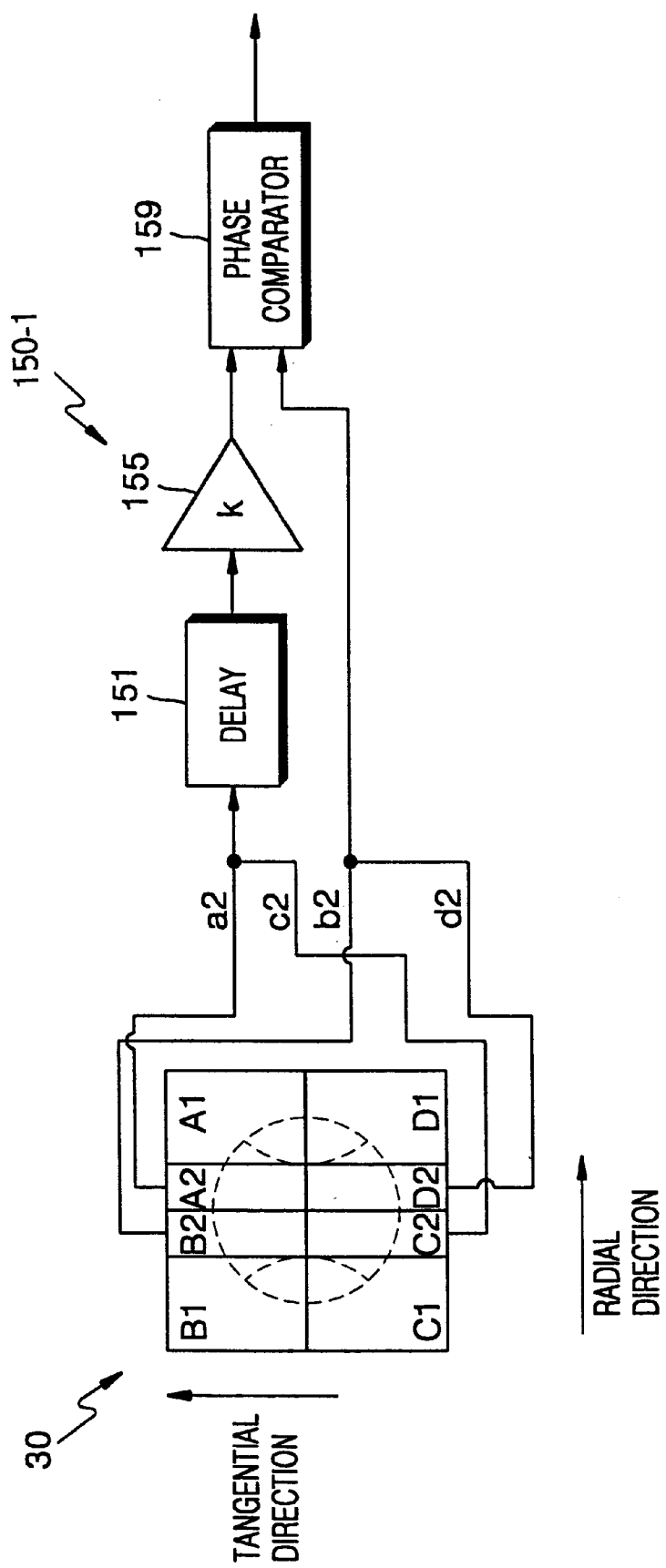

An alternate structure of the circuit unit 150 as shown in FIG. 9, is shown schematically in FIG. 10 as circuit unit 150-1. As shown in FIG. 10, the circuit unit 150-1 further comprises a delay 151 between a node which connects the outputs of the diagonally opposite inner light receiving portions A2 and C2, and the gain controller 155, i.e., delay 151 delays the signal (a2+c2).

In this case, the sum of the detection signals a2 and c2 of the inner light receiving portions A2 and C2 is delayed by the delay 151 and input to the gain controller 155. The signal input to the gain controller 155 is amplified and the phase of the signal is compared with that of the sum of the detection signals b2 and c2 of the other diagonally opposite inner light receiving portions B2 and D2.

By delaying the sum of the detection signals of one of the pairs of the diagonally opposite inner light receiving portions, degradation of phases caused by distortion of the signals, which possibly occurs in comparison of the signals due to summing the detection signals of the diagonally opposite inner light receiving portions, can be prevented.

In particular, the offset of error signals which can occur when an objective lens (not shown) is shifted, is corrected by phase comparison offset between the sums of the diagonally opposite detection signals, which is caused due to deviation in pit depth on a recording medium, and thus an error signal can be detected more accurately.

As for the circuit unit 150-1 of FIG. 10 according to the present invention, although the detection signals of the diagonally opposite light receiving portions are summed, an error signal is detected through delay and amplification processes, as previously mentioned. As a result, although the pit depth on recording media vary, degradation of phase due to distortion of signal according to the pit depth variations is improved. Thus, an error signal can be detected with reduced offset even when the objective lens is shifted.

Figure 11:
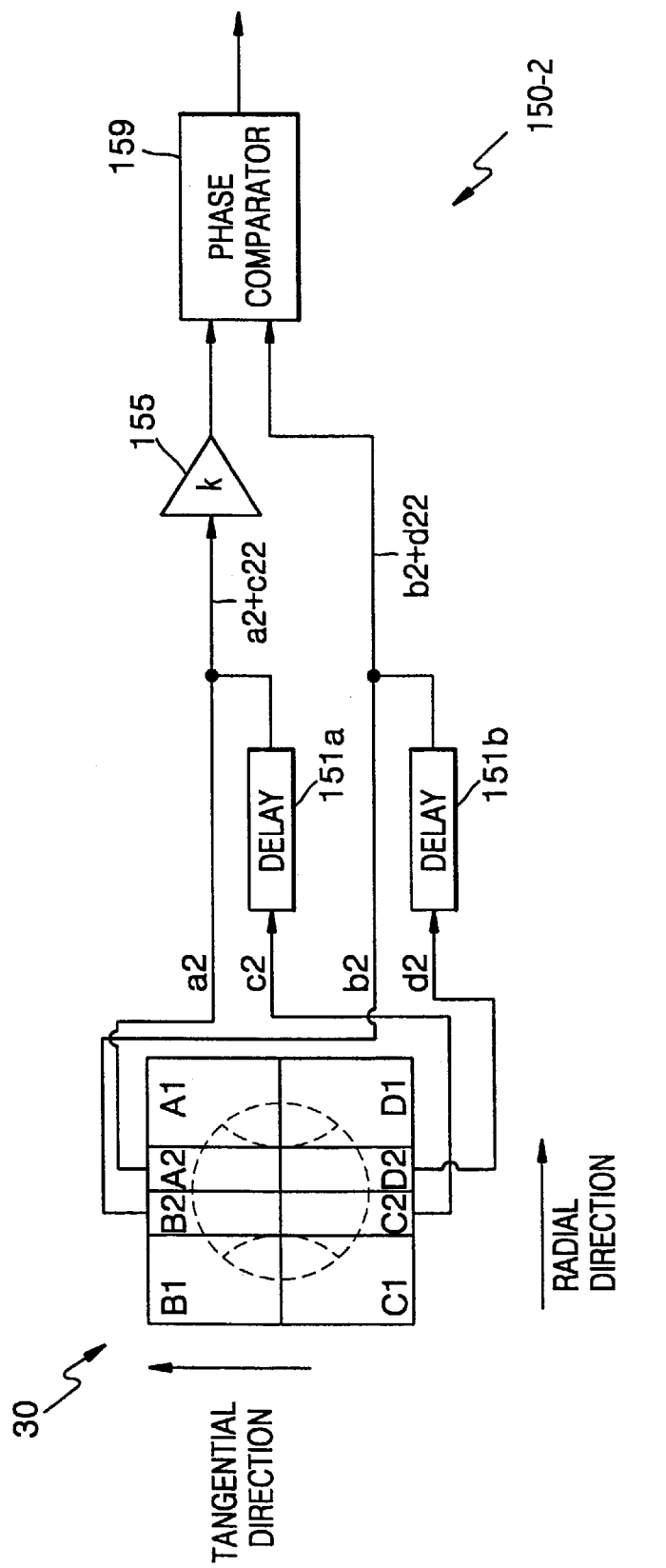

Another alternate structure of the circuit unit 150 as shown in FIG. 9, is shown schematically in FIG. 11 as circuit unit 150-2. As shown in FIG. 11, the circuit unit 150-2 comprises delays 151a and 151b for separately delaying detection signals c2 and d2 of the inner light receiving portions C2 and D2 in the same row. For this case, the problem caused by the pit depth variation of the recording medium can be improved in detecting an error signal.

As previously mentioned with reference to FIG. 5, the error signal detection apparatuses shown in FIGS. 9 and 11 according to the present invention output a tilt error signal during operation of a tracking servo. If a tilt error is not present, the error signal detection apparatuses can be used to detect a tracking error signal. As previously mentioned with reference to FIG. 8, when the envelope or signal center value detector 70 is further included, a tilt error signal can be output irrespective of the operation of the tracking servo.

In the error signal detection apparatuses according to the present invention, which are described with reference to FIGS. 5, and 8 through 11, an error signal is detected using the detection signals generated by the inner light receiving portions A2, B2, C2 and D2, which receive the 0th order diffracted beam, and thus a tilt error signal can be detected with increased accuracy. This is because the 0th order diffracted beam is more sensitive to the tilting of the recording medium with respect to the objective lens than the other ±1st diffracted beams reflected and diffracted by the recording medium.

In the error signal detection apparatuses according to the present invention, which are described with reference to FIGS. 5 and 9, the phase comparison signals with respect to the detection signals of the inner light receiving portions arranged in the radial direction are obtained and summed to detect an error signal. As a result, even if the objective lens is shifted, or the distance between an objective lens and a disk is beyond On-focus positions, the tilt error signal varies very little and thus the tilt error can be accurately detected.

Figure 12:
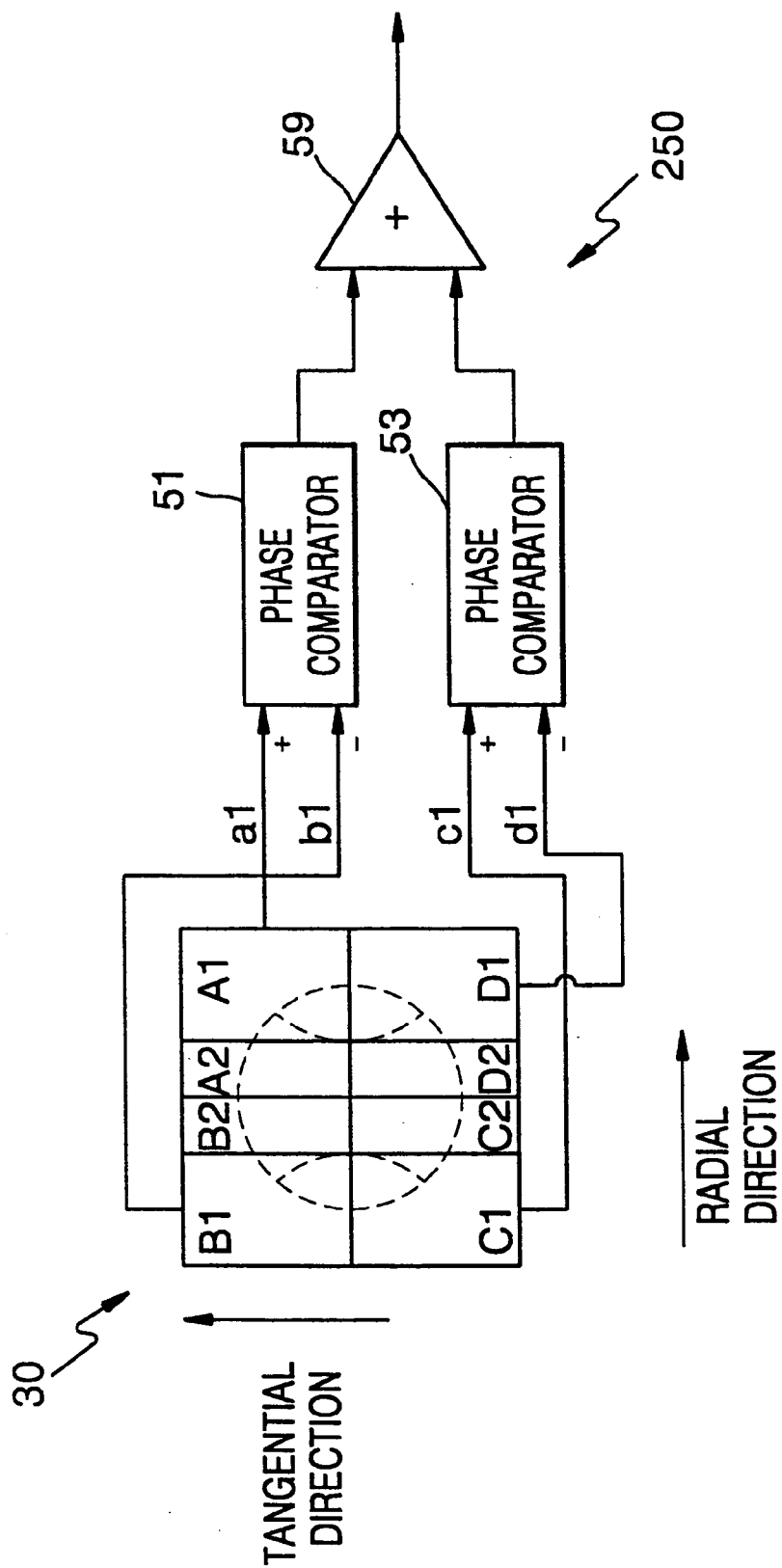

FIG. 12 is a schematic diagram of another embodiment of the error signal detection apparatus for an optical recording/reproducing system according to the present invention. The error signal detection apparatus of FIG. 12 is similar to the error signal detection apparatus of FIG. 5, and differs in that the detection signals a1, b1, c1 and d1 of the outer light receiving portions A1, B1, C1 and D1 are provided to a circuit unit 250 instead of the detection signals a2, b2, c2 and d2.

In particular, a first phase comparator 51 receives the detection signals a1 and b1 of the outer light receiving portions A1 and B1 arranged in the first row and compares the phases of the detection signals a1 and b1. A second phase comparator 53 receives the detection signals c1 and d1 of the outer light receiving portion C1 and D1 arranged in the second row, and compares the phases of the detection signals c1 and d1.

As mentioned with reference to FIG. 5, the circuit unit 250 also outputs a tilt error signal with operation of the tracking servo. When the circuit unit 250 further comprises the envelope or signal center value detector 70, which is described with reference to FIG. 8, a tilt error signal can be detected irrespective of the operation of the tracking servo. If there is not tilt error, the output signal of the circuit unit 250 can be used in detecting a tracking error signal.

Figure 13:
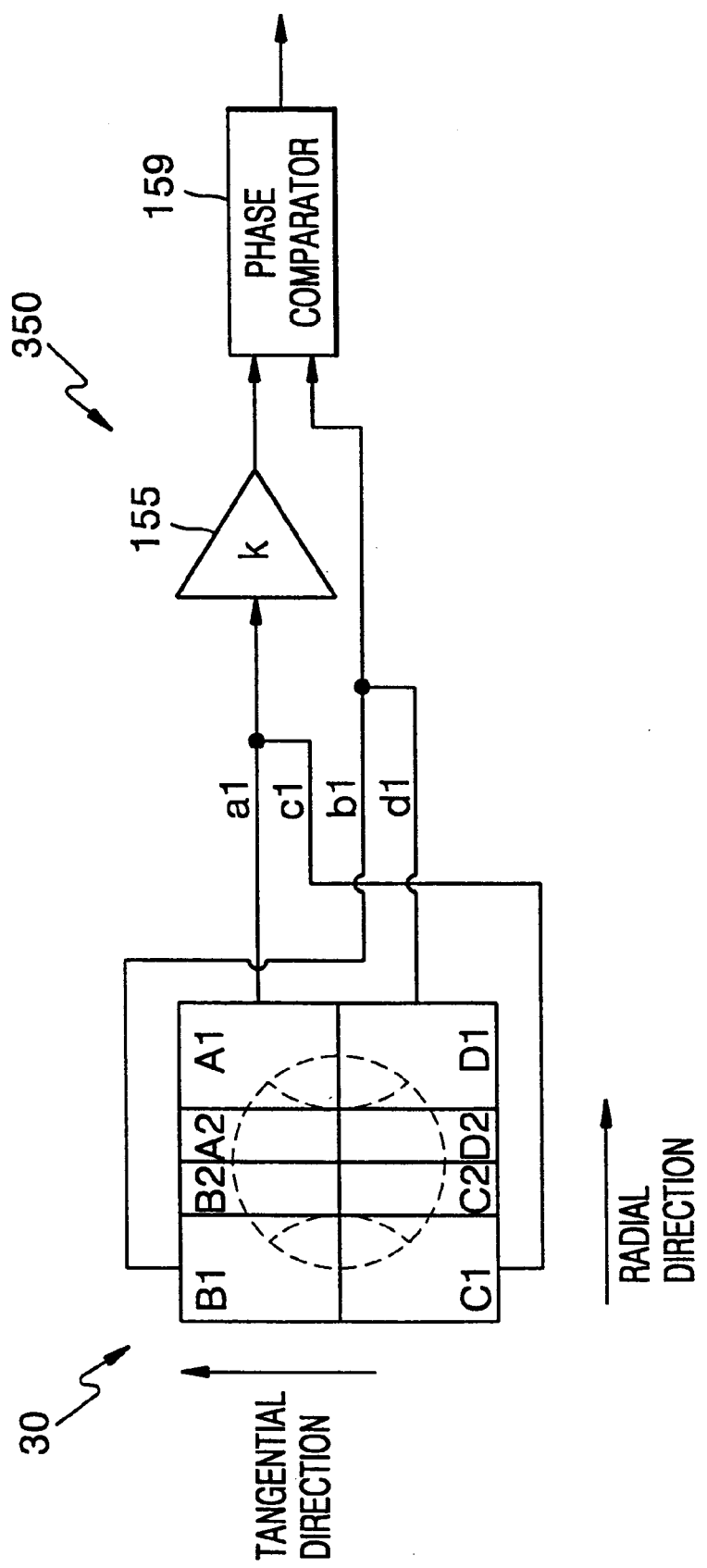
Figure 14:
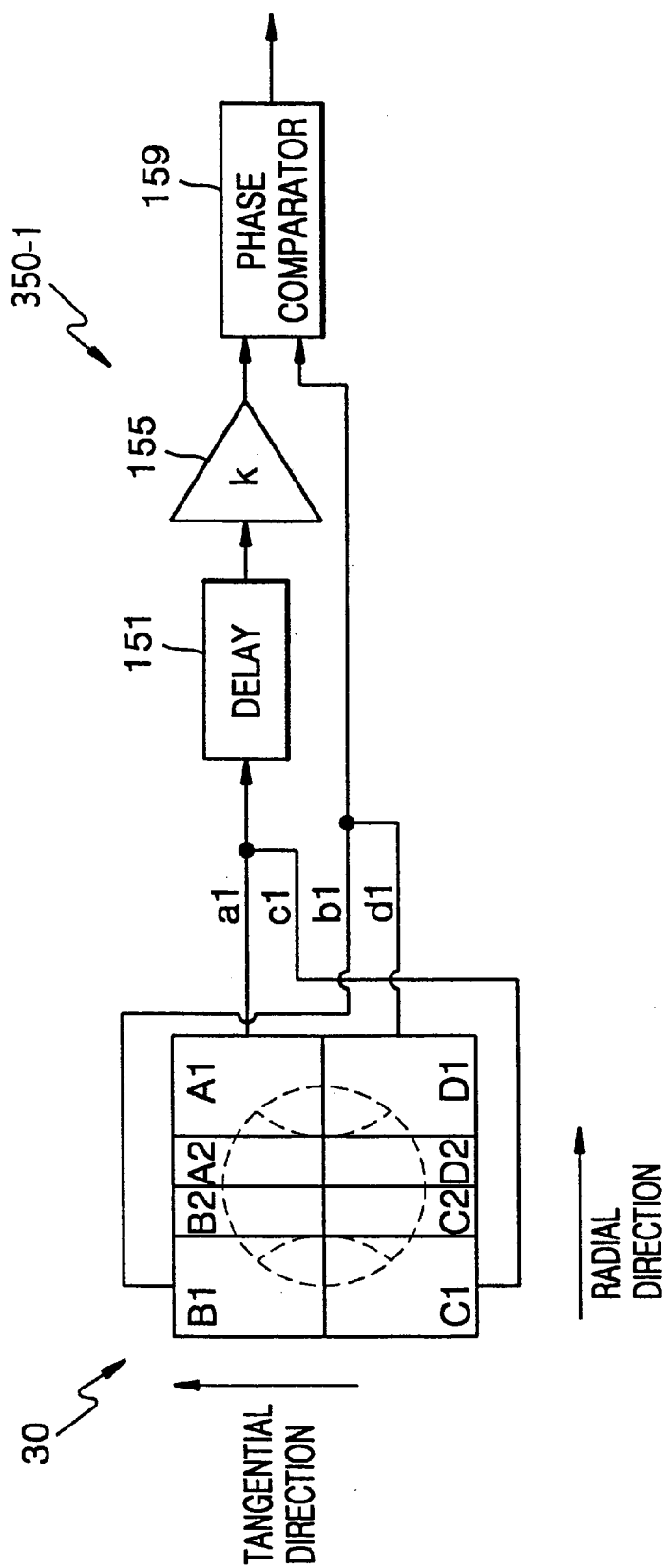
Figure 15:
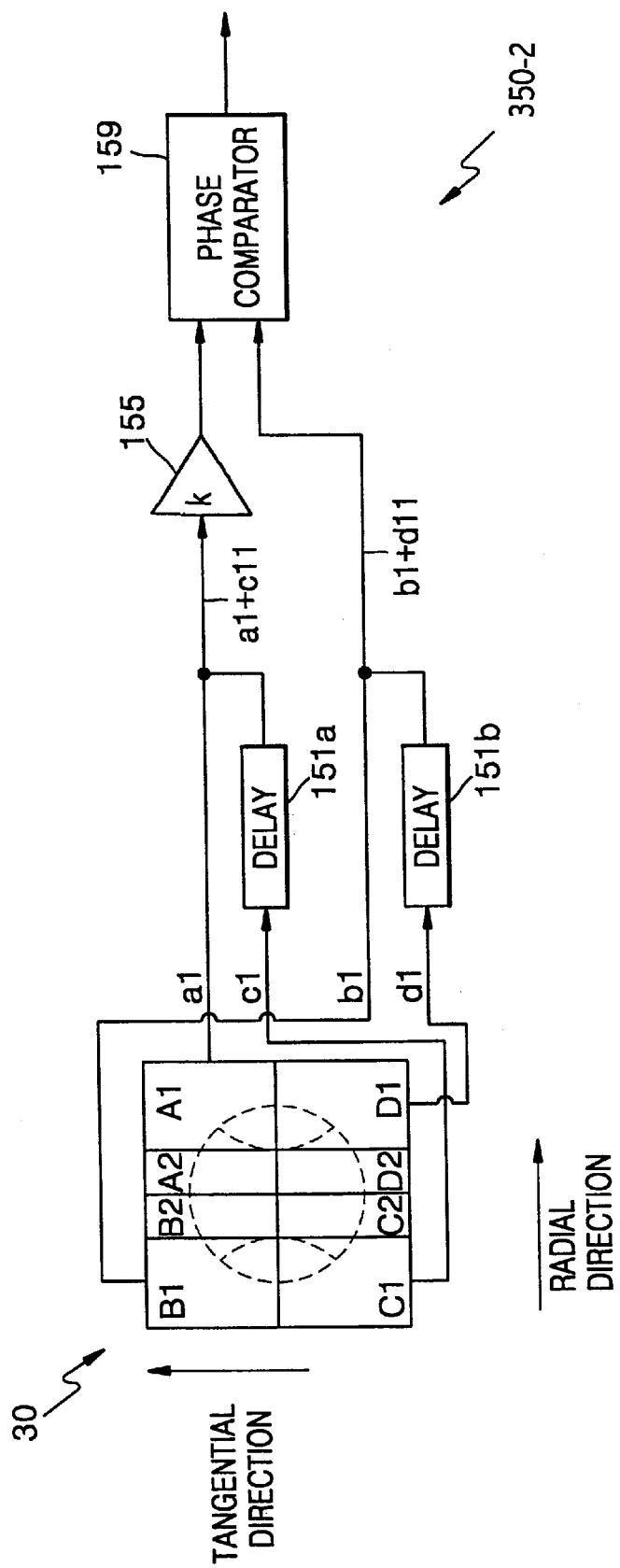

FIGS. 13 through 15 illustrate other embodiments of the error signal detection apparatus according to the present invention, which utilize the detection signals generated by the outer light receiving portions. The structures of the error signal detection apparatuses shown in FIGS. 13 through 15 are similar to error signal detection apparatuses shown in FIGS. 9 through 11, respectively, each differing in that the detection signals a1, b1, c1 and d1 of the outer light receiving portions A1, B1, C1 and D1 are input to the circuit units 350, 350-1, and 350-2 instead of the detection signals a2, b2, c2 and d2 being input into circuit units 150, 1501 and 150-2 as in FIGS. 9 through 11

The error signal detection apparatuses shown in FIGS. 13 through 15 can detect a tilt error signal when the tracking servo is operated. When each respective circuit unit 350, 350-1 and 350-2 further includes the envelope or signal center value detector 70, as shown in FIG. 8, a tilt error signal can be detected by each respective circuit unit 350, 350-1 and 350-2, irrespective of the operation of the tracking servo.

The error signal detection apparatuses for an optical recording/reproducing system according to the present invention, which are described with reference to FIG. 5 and FIGS. 9 through 15, output error signals including a tracking error and/or tilt error component, according to whether the tracking servo is operated or not, and whether or not there is a relative tilt error between the objective lens and the recording medium.

If a pair of circuit units each for tilt error detection and tracking error detection are constructed using at least one of the circuit units described previously, a tilt error signal and a tracking error signal can be simultaneously detected.

When the envelope or signal center value detector 70 of FIG. 8 is provided to the output end of the circuit units shown in FIG. 5 and FIGS. 9 through 15, unnecessary signal components can be eliminated, and thus a tilt error signal can be detected more accurately.

Figure 16:
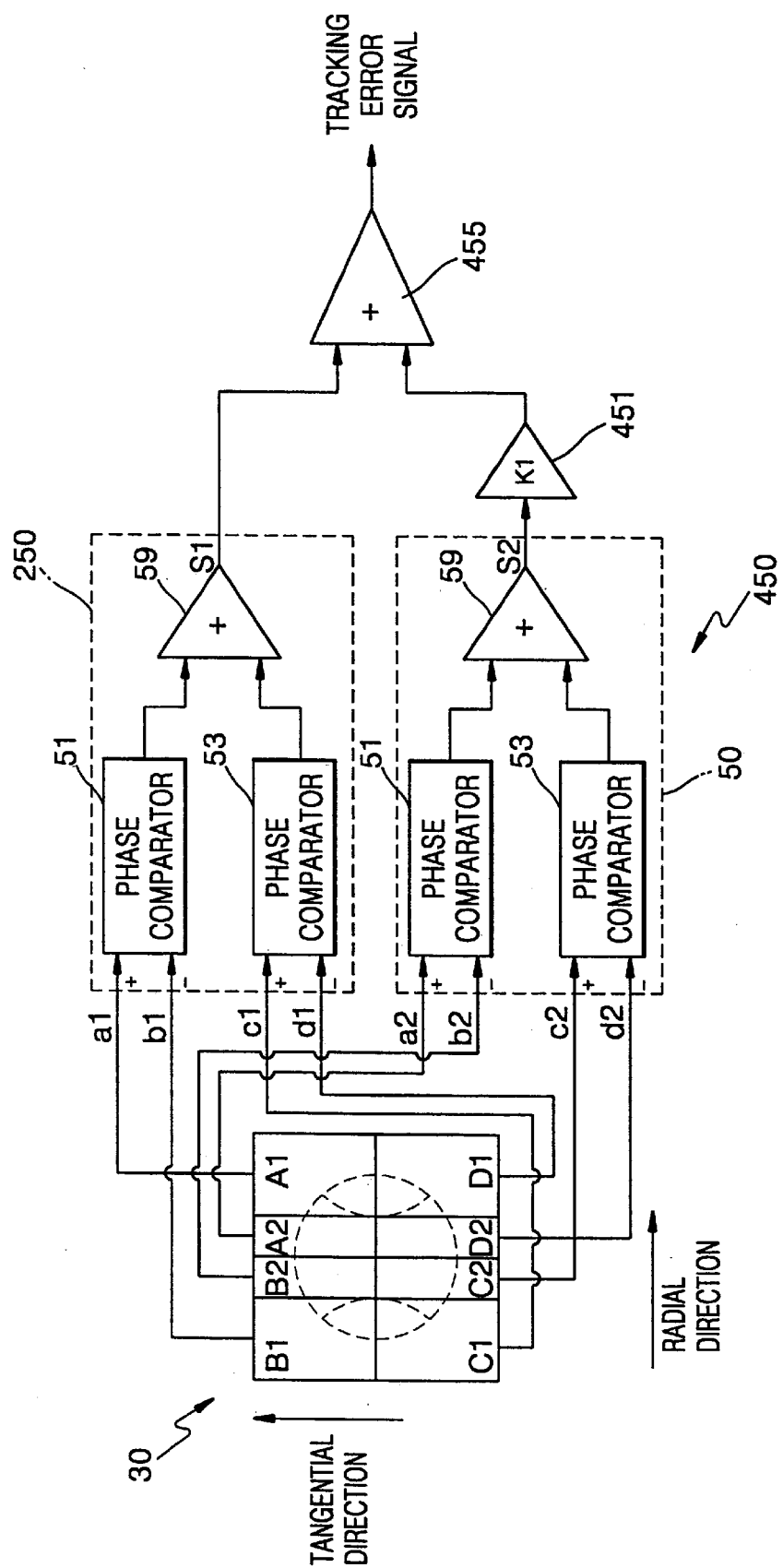
Figure 17:
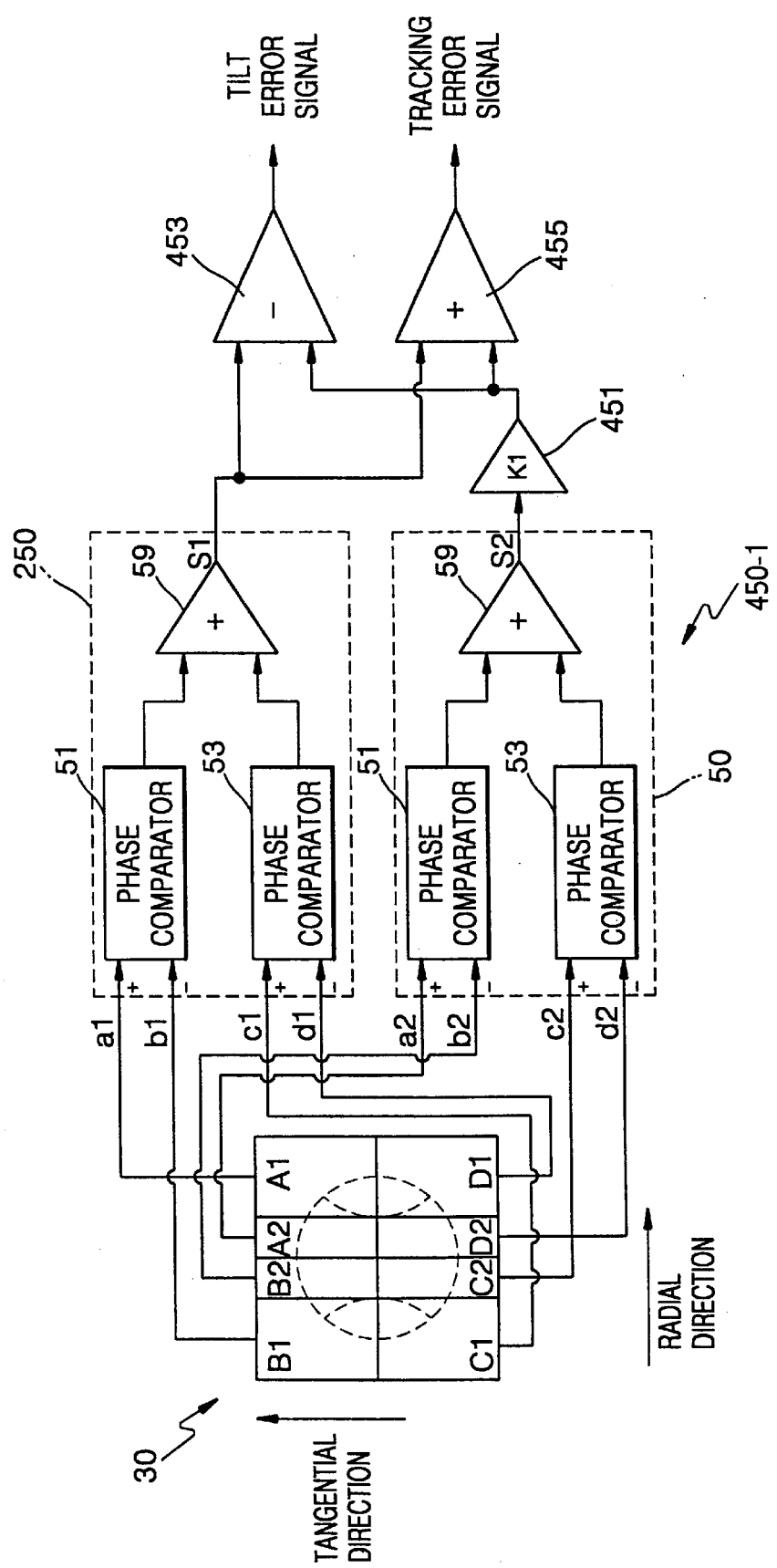

Other embodiments of the error signal detection apparatus according to the present invention are shown in FIGS. 16 and 17. Each of the error signal detection apparatuses of FIGS. 16 and 17 includes a circuit unit 450, 450-1, respectively, which detects an error signal using all the detection signals a1, b1, c1, d1, a2, b2, c2 and d2 of both the outer and inner light receiving portions A1, B1, C1, D1 A2, B2, C2 and D2, wherein an error signal is detected from the four phase comparison signals obtained by separately comparing the phases of the signals generated by the outer and inner light receiving portions, which are arranged in the same row.

Referring to FIG. 16, the circuit unit 450 detects a tracking error signal with a structure including a first circuit portion 250 to output an error signal S1 using the detection signals a1, b1, c1 and d1 of the outer light receiving portions A1, B1, C1 and D1; a second circuit portion 50 to output an error signal S2 using the detection signals a2, b2, c2 and d2 of the inner light receiving portions A2, B2, C2 and D2; and an adder 455 for summing the error signals Si and S2.

As shown in FIG. 17, the circuit unit 450-1 includes all the features of circuit unit 450 and further comprises a differential unit 453 for subtracting the error signals S1 and S2. By also subtracting the error signals S1 and S2, a tilt error signal as well as a tracking error signal can be detected. If the differential unit 453 is substituted for the adder 455 in FIG. 16, the circuit unit 450 of FIG. 16 will provide a tilt error signal instead of a tracking error signal.

The error signal S1 is the same as the output signal of the error signal detection apparatus of FIG. 12. Similar to the circuit unit of FIG. 12, the first circuit portion 250 has a structure in which the phases of the detection signals generated by the outer light receiving portions arranged in the radial direction are compared to obtain phase comparison signals, and the phase comparison signals are summed. The error signal S2 is the same as the output signal of the error signal detection apparatus of FIG. 5. Similar to the circuit unit of FIG. 5, the second circuit portion 50 has a structure in which the phases of the detection signals generated by the inner light receiving portions arranged in the radial direction are compared to obtain phase comparison signals, and the phase comparison signals are summed. As previously mentioned, the first and second circuit portions 250 and 50 have the same structures as the circuit units of FIGS. 12 and 5, respectively. For this reason, the same reference numerals used in FIGS. 12 and 5 are used to refer to the first and second circuit portions 50 and 250 of FIG. 16, and a detailed description thereof is not provided.

The error signal S1 obtained using the detection signals a1, b1, c1 and d1 of the outer light receiving portions A1, B1, C1 and D1, and the error signal S2 obtained using the detection signals a2, b2, c2 and d2 of the inner light receiving portions A2, B2, C2 and D2 have an almost opposite phase. Thus, the phases of the envelopes, i.e., the phases of the tilt error signal components, have a phase difference of 180°. It is appreciated that the tracking error signal components of the error signals S1 and S2 have the same phase.

Thus, when the error signals S1 and S2 are summed by the adder 455, the tilt error signal components of the error signals S1 and S2, which have opposite phase, are eliminated, and only the sum of the tracking error signal components is output. When the error signals S1 and S2 are input to the differential unit 453, as shown in FIG. 17, the tracking error signal components are eliminated through subtraction, and the amplitudes of the tilt error signal components included in the error signals S1 and S2 with opposite phase are simply summed.

As a result, the tracking error signal, which has a large amplitude, is output from the adder 455, and the tilt error signal which has a large amplitude, is output from the differential unit 453. Thus, a tracking error signal and/or a tilt error signal can be detected with increased accuracy using the error signal detection apparatus shown in FIG. 21.

In the embodiments shown in FIGS. 16 and 17, the error signal detection apparatus may further include a gain controller 451 for controlling the gain of one of the error signals S1 and S2, so that a difference in the amplitudes of the error signals S1 and S2 according to a division ratio of the outer and inner light receiving portions of the photodetector 30 can be corrected.

For example, the gain controller 451 may be connected to the output end of the adder 59 that outputs the error signal S2, and may amplify the error signal S2 by a predetermined gain factor k1. For this case, the amplitude of the error signal S2 can be controlled by the gain controller 451 to be equal to that of the error signal S1. As a result, a tracking error signal from which the tilt error signal component is completely removed is output from the adder 455, and a tilt error signal from which the tracking error signal component is completely removed is output from the differential unit 453. The incorporation of the gain controller 451 into the error signal detection apparatus according to the present invention increases the accuracy in detecting a tracking error signal and/or tilt error signal.

Figure 18:
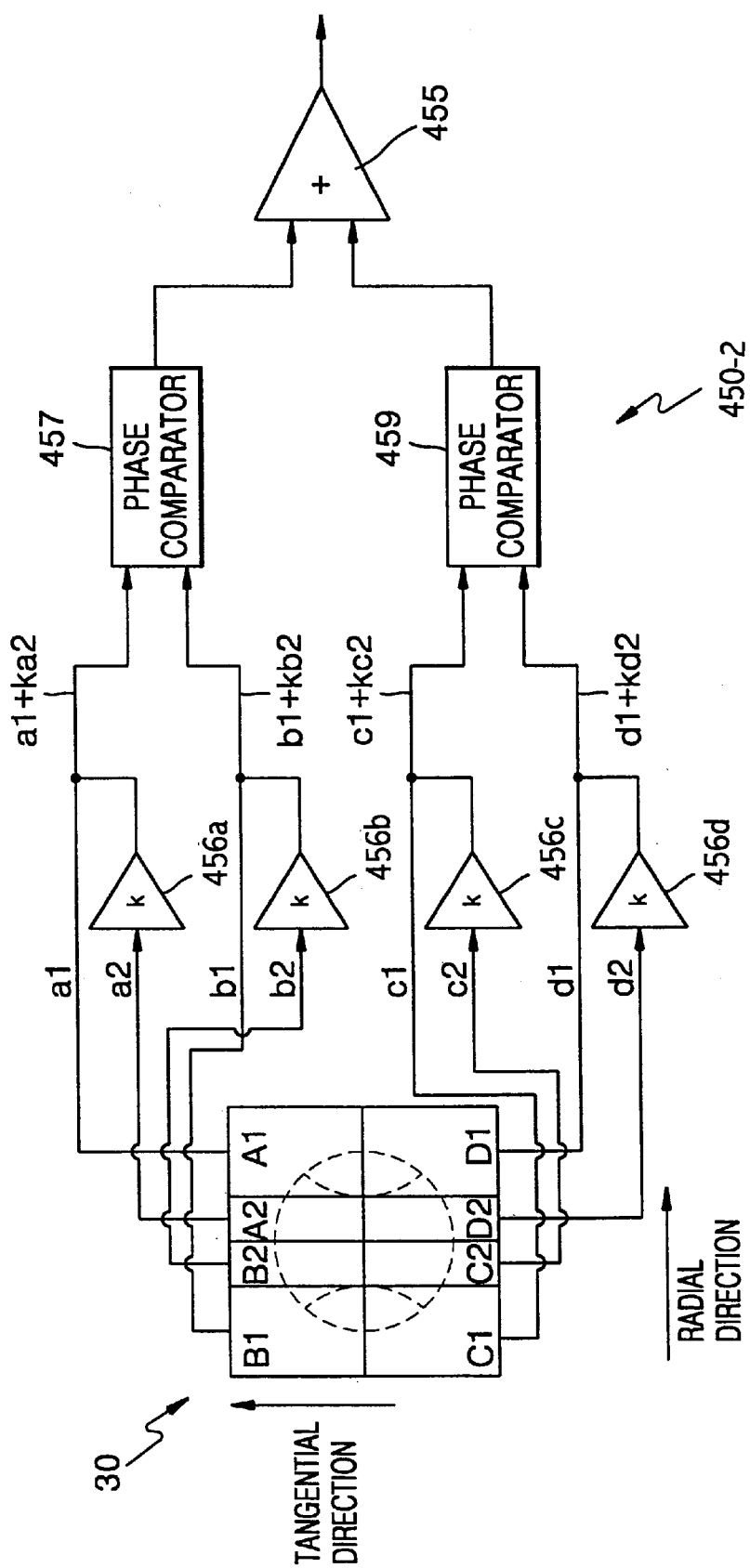

FIG. 18 illustrates an embodiment which uses two phase comparators 457 and 459 each for comparing the phases of the detection signals of the four light receiving portions arranged in the same row instead of the four phase comparators used in the embodiments of FIGS. 16 and 17. In particular, the phase comparator 457 compares the phases of the sums of the detection signals of the adjacent inner and outer light receiving portions arranged in the first row. The phase comparator 459 compares the phases of the sums of the detection signals of the adjacent inner and outer light receiving portions arranged in the second row . Preferably, gain controllers 456a, 456b, 456c and 456d, amplify the detection signals a2, b2, c2 and d2, respectively, of the inner light receiving portions A2, B2, C2 and D2 by a predetermined gain factor k so as to correct for a difference in the amount of light received by the inner and outer light receiving portions. Then, the gain amplified detection signals a2, b2, c2 and d2 of the inner light receiving portions A2, B2, C2 and D2 are summed with the detection signals a1, b1, c1 and d1 of the outer light receiving portions A1, B1, C1 and D1, to input signals (a1+ka2) and (b1+kb2) to the phase comparator 457 and to input signals (c1+kc2) and (d1+kd2) to the phase comparator 459. The circuit unit 450-2 of FIG. 18 may be adapted with a differential unit such as the differential unit 453 shown in FIG. 17 by connecting the inputs of a differential unit 453 in parallel with the inputs of adder 455, in a similar manner as in FIG. 17 to also provide a tilt error signal.

Figure 19:
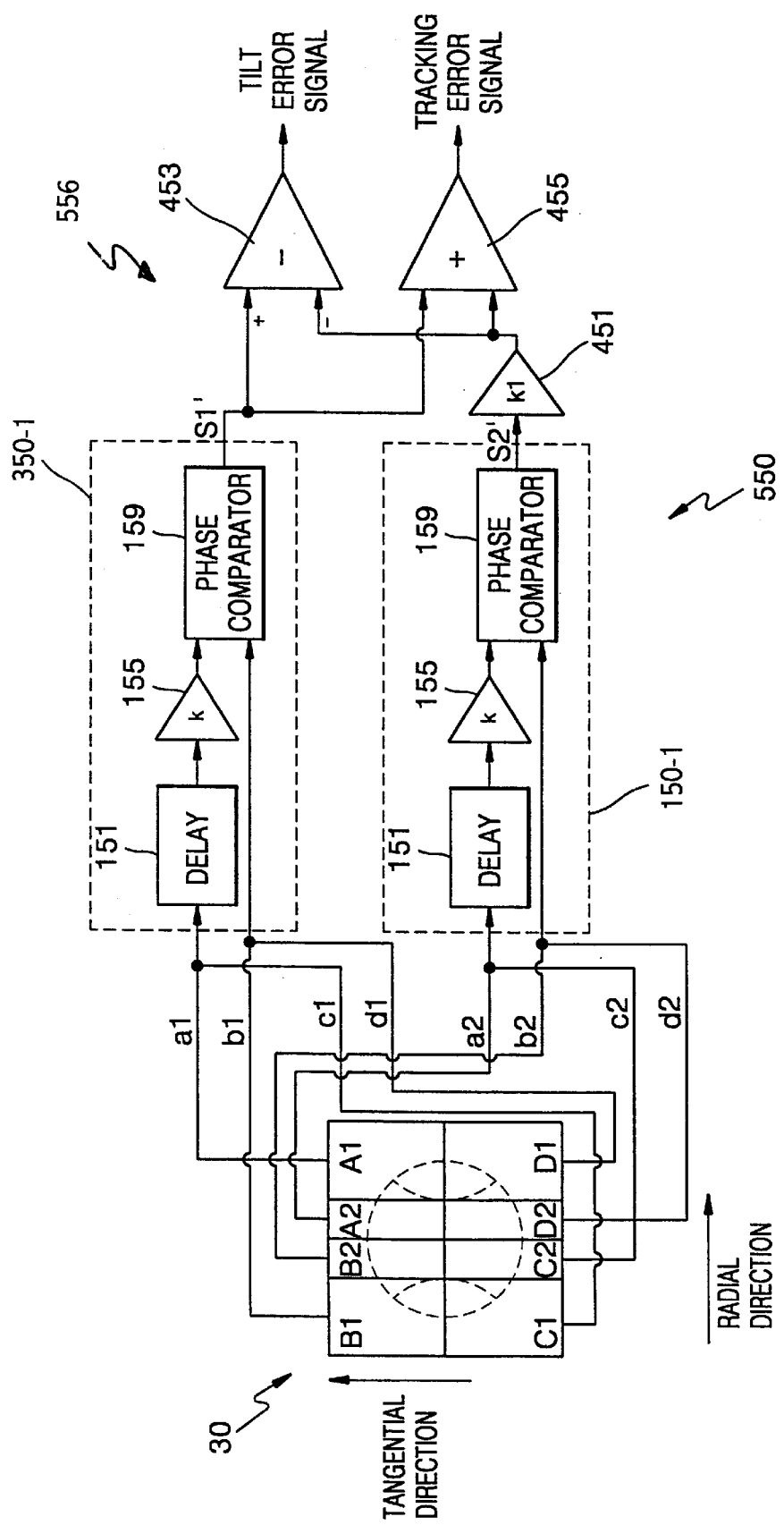
Figure 20:
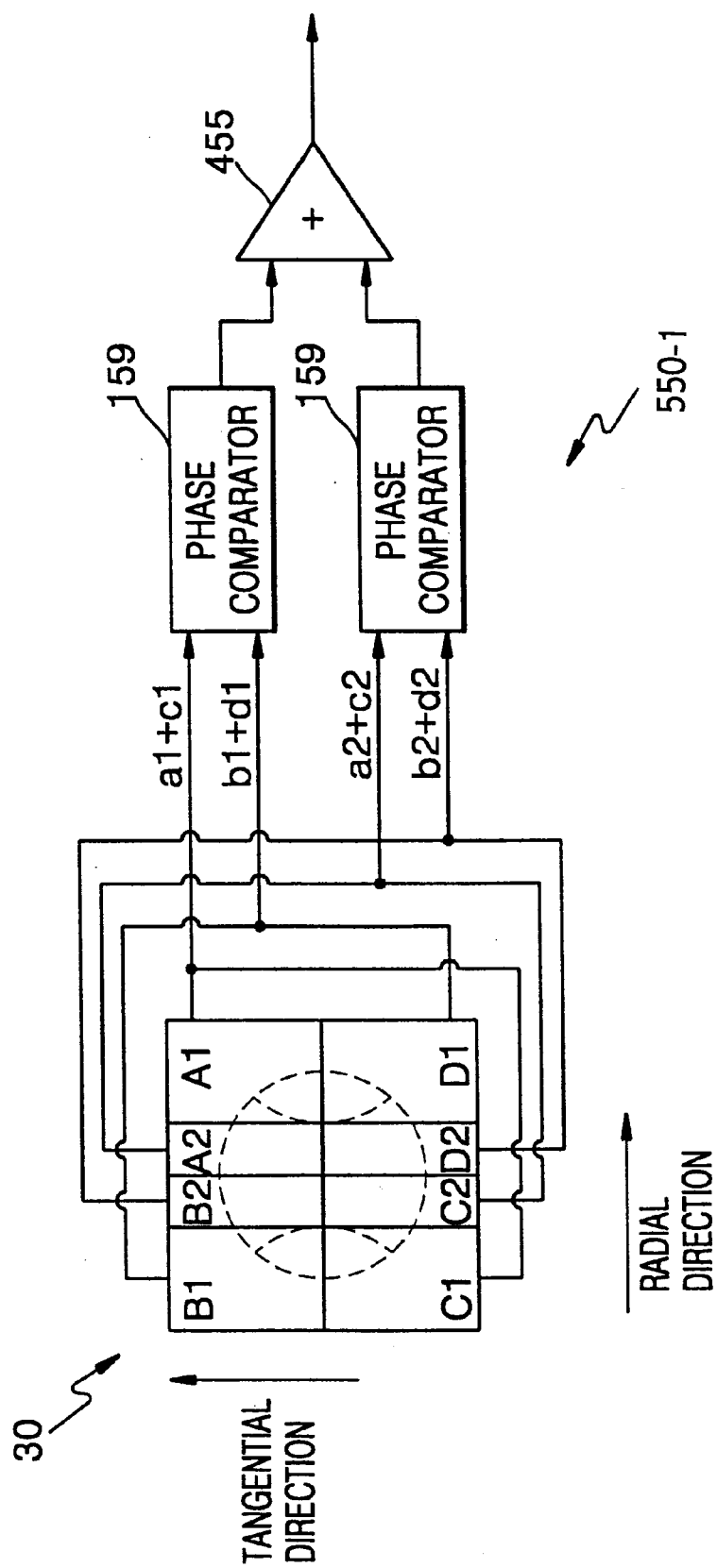
Figure 21:
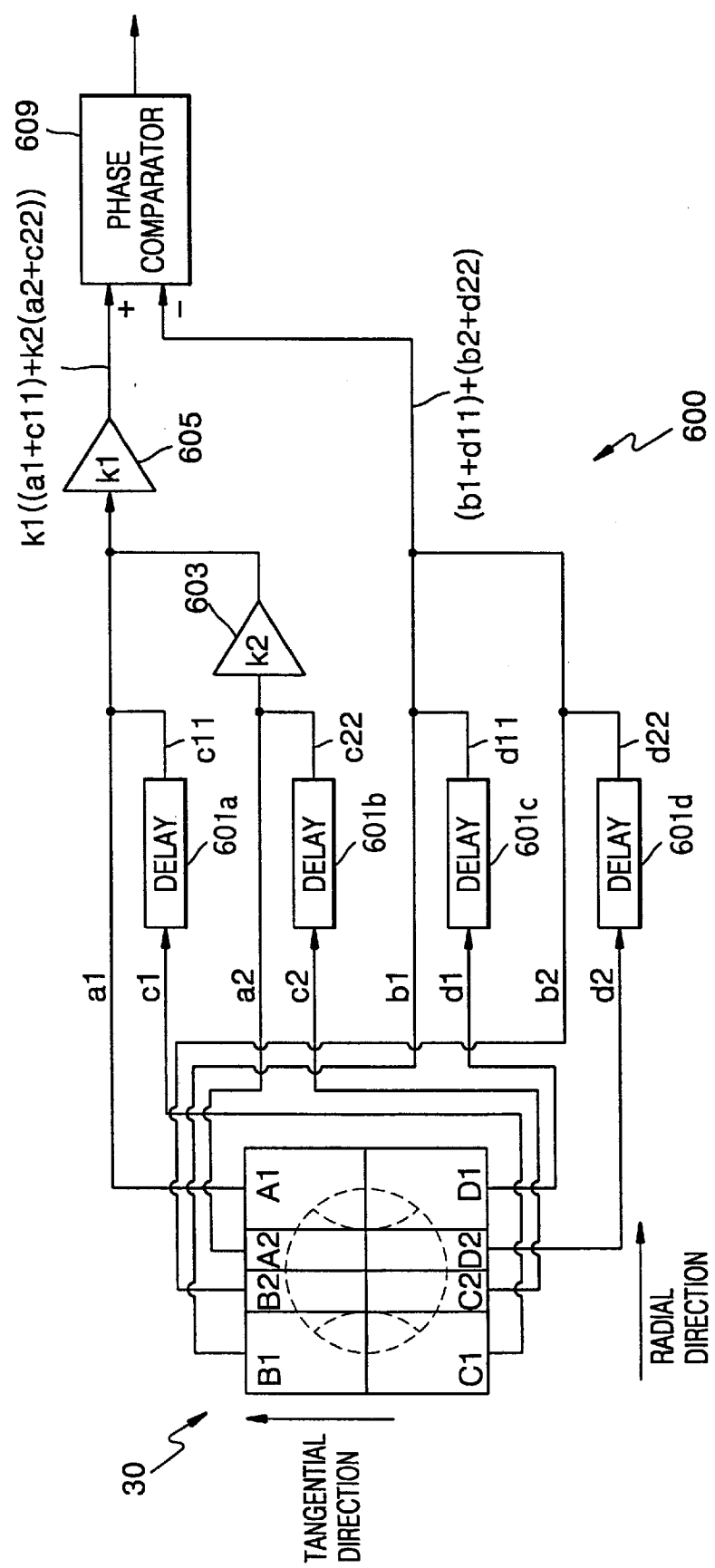

Referring to FIGS. 19 through 21, other embodiments of the error signal detection apparatus according to the present invention include a circuit unit 550, 550-1, or 600 for detecting error signals from the sums of the detection signals of the diagonally opposite light receiving portions. Here, all the of the outer light receiving portions, A1, B1, C1 and D1, and all the inner light receiving portions A2, B2, C2 and D2 are used in detecting error signals.

For example, referring to FIG. 19, the circuit unit 550 includes a first circuit portion 350-1 which outputs an error signal S1' using the detection signals a1, b1, c1 and d1 of the outer light receiving portions A1, B1, C1 and D1, a second circuit portion 150-1 which outputs an error signal S2' using the detection signals a2, b2, c2 and d2 of the inner light receiving portions A2, B2, C2 and D2, and a third circuit portion 556 for detecting a tilt error signal and/or tracking error signal from the error signals S1' and S2'.

The error signal S1' is the same as the output signal of the error signal detection apparatus of FIG. 14. Like the circuit unit of FIG. 14, the first circuit portion 350-1 has a structure in which the sum of the detection signals a1 and c1 of the diagonally opposite outer light receiving portions A1 and C1 is amplified by a predetermined gain factor k, and the phase of the amplified signal is compared with that of the sum of the detection signals b1 and d1 of the other diagonally opposite outer light receiving portions B1 and D1.

The error signal S2' is the same as the output signal of the error signal detection apparatus of FIG. 10. Like the circuit unit of FIG. 10, the second circuit portion 150-1 has a structure in which the sum of the detection signals a2 and c2 of the diagonally opposite inner light receiving portions A2 and C2 is amplified by a predetermined gain factor k, and the phase of the amplified signal is compared with that of the sum of the detection signals b2 and d2 of the other diagonally opposite inner light receiving portions B2 and D2. As previously mentioned, the first and second circuit portions 350-1 and 150-1 have the same structure as the circuit units 350-1 and 150-1 of FIGS. 10 and 14, respectively. For this reason, the same reference numerals used in FIGS. 10 and 14 are also used here, and a detailed description of the elements is not provided here. Also, the structure of the circuit units 350 and 150 shown in FIGS. 9 and 13 can be adopted for the first and second circuit portions 350-1 and 150-1, respectively, shown in FIG. 19.

The error signal S1' detected using the detection signals a1, b1, c1 and d1 of the outer light receiving portions A1, B1, C1 and D1, and the error signal S2' detected using the detection signals a2, b2, c2 and d2 of the inner light receiving portions A2, B2, C2 and D2 have phase characteristics similar to the phase characteristics of error signals S1 and S2 described with reference to FIGS. 16 and 17, respectively.

The structure of the third circuit portion 556 which detects a tilt error signal and/or a tracking error signal using the error signals S1' and S2', and the principle of detecting a tilt error signal and/or tracking error signal with increased precision and accuracy are similar to the descriptions and inner connections of signals S1 and S2, amplifier 451, adder 455 and differential unit 453 which are described with reference to FIGS. 16 and 17, and thus a further description thereof is not provided here.

Alternately, as shown in FIG. 20, a circuit unit 550-1, which compares the phases of the sums of the detection signals generated by the diagonally opposite outer light receiving portions, and the phases of the sums of the detection signals generated by the diagonally opposite inner light receiving portions, respectively, includes a pair of phase comparators 159 which compare the summed signals a1+c1 with b1+d1 and summed signals a2+c2 with b2+d2.

An adder 455 sums the outputs from the phase comparators 159. In this case, phase comparison signals are obtained, separately, using the detection signals of the inner and outer light receiving portions, which have different phase characteristics, and thus a tracking error signal can be detected with improved precision. If the adder 455 is replaced by a differential unit such as the differential unit 453 of FIG. 19, a tilt error signal can be detected. Alternatively, if both the adder 455 and the differential unit 453 shown in FIG. 19 are further adopted to the structure of FIG. 20, both tracking and tilt error signals can be detected.

Another error signal detection apparatus is shown in FIG. 21. The circuit unit 600 includes delays 601a, 601b, 601c and 601d, a gain controller 605, and a phase comparator 609. The delays 601b, 601d, 601a and 601c delay the detection signals c2, d2, c1 and d1, respectively, of the inner and outer light receiving portions C2, D2, C1 and D1 arranged in the second row of the photodetector, respectively, and output delayed signals c22, d22, c11 and d11. The gain controller 605 amplifies the sum of two sum signals by a predetermined gain factor k1, the two sum signals including a first sum signal of the delayed signal c11 and the detection signal a1 of the diagonally opposite light receiving portion A1, and a second sum signal of the delayed signal c22 and the detection signal a2 of the diagonally opposite inner light receiving portion A2. The phase comparator 609 compares the phase of the signal output from the gain controller 605 with that of the sum signal of two other sum signals, including a third sum signal of the delayed signal d11 and the detection signal b1 of the diagonally opposite outer light receiving portion B1, and a fourth sum signal of the delayed signal d22 and the detection signal b2 of the diagonally opposite inner light receiving portion B2.

The circuit unit 600 may further include a gain controller 603 for amplifying the second sum signal (a1+c22) by a predetermined gain factor k2, so as to correct for a difference in the amount of light received by the outer and inner light receiving portions. The circuit unit 600 may further comprise a gain controller (not shown) for amplifying the fourth sum signal (b2+d22) a predetermined amount. In addition, various circuit elements described previously can be provided to the output end of the phase comparator 609, and a tilt error signal and/or tracking error signal can be detected using the error signal detection apparatus.

Figure 22:
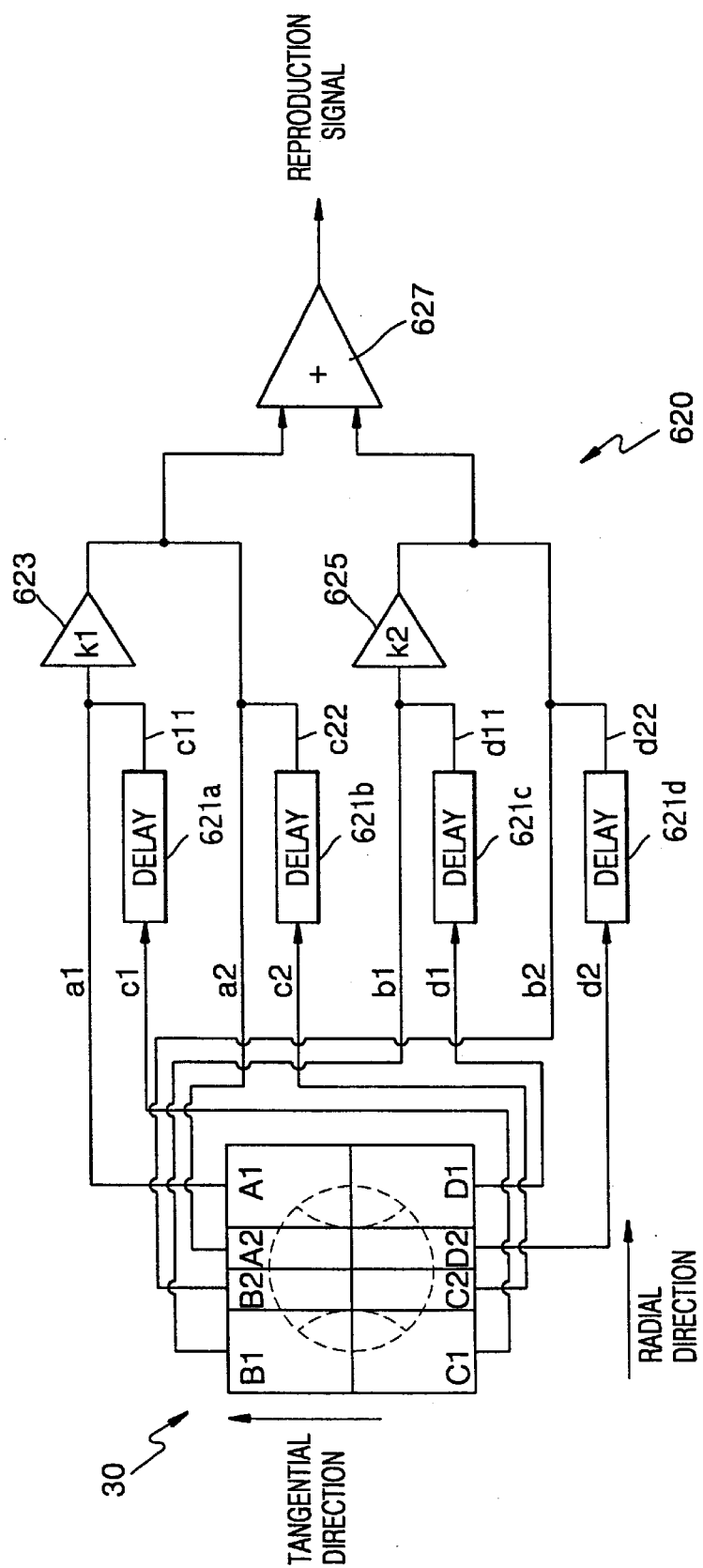
FIG. 22 is a schematic view of a preferred embodiment of a reproduction signal detection apparatus according to the present invention.

FIG. 22 illustrates a preferred embodiment of a reproduction signal detection apparatus according to the present invention. As show in FIG. 22, the reproduction signal detection apparatus includes an 8-section photodetector 30 with outer light receiving portions A1, B1, C1 and D1, and inner light receiving portions A2, B2, C2 and D2; and a circuit unit 620 for detecting a reproduction signal using all detection signals a1, b1, c1, d1, a2, b2, c2 and d2 of the outer and inner light receiving portions A1, B1, C1, D1 A2, B2, C2 and D2.

The circuit unit 620 includes delays 621b, 621d, 621a and 621c which delay the detection signals c2, d2, c1 and d1, respectively, of the inner and outer light receiving portions C2, D2, C1 and D1, respectively, arranged in the second row of the photodetector 320 and outputting delayed signals c22, d22, c11 and d11; first and second gain controllers 623 and 625 which amplify the sum of the delayed signal c11 and the detection signal a1 of the diagonally opposite outer light receiving portion A1 by a predetermined gain factor k1, and the sum of the delayed signal d11 and the detection signal b1 of the diagonally opposite outer light receiving portion B1 by a predetermined gain factor k2, respectively; and an adder 627 which sum the amplified signals output from the first and second gain controllers 623 and 625, and the other sum signals. Preferably, the sum of the gain factors k1 and k2 is constant.

In the reproduction signal detection apparatus according to the present invention, different phase characteristics between the detection signals generated by the diagonally opposite light receiving portions are corrected using delays. Also, the difference in the amount of light received by the inner and outer light receiving portions can be corrected using the gain controllers. As a result, a high quality reproduction signal can be produced.

FIGS. 23 through 27B, and FIGS. 30 through 32 illustrates other embodiments of the error signal detection apparatus according to the present invention, which detects a tracking error signal and/or a tilt error signal in consideration of the phase characteristics of light reflected and diffracted from a recording medium along the information stream direction, as shown in FIG. 4B. The principle of detecting a tilt and/or tracking error signal with the error signal detection apparatuses shown in FIGS. 23 through 27B, and FIGS. 30 through 32 is the same as in the previous embodiments, and a description of the principle is not provided here.

Figure 23:
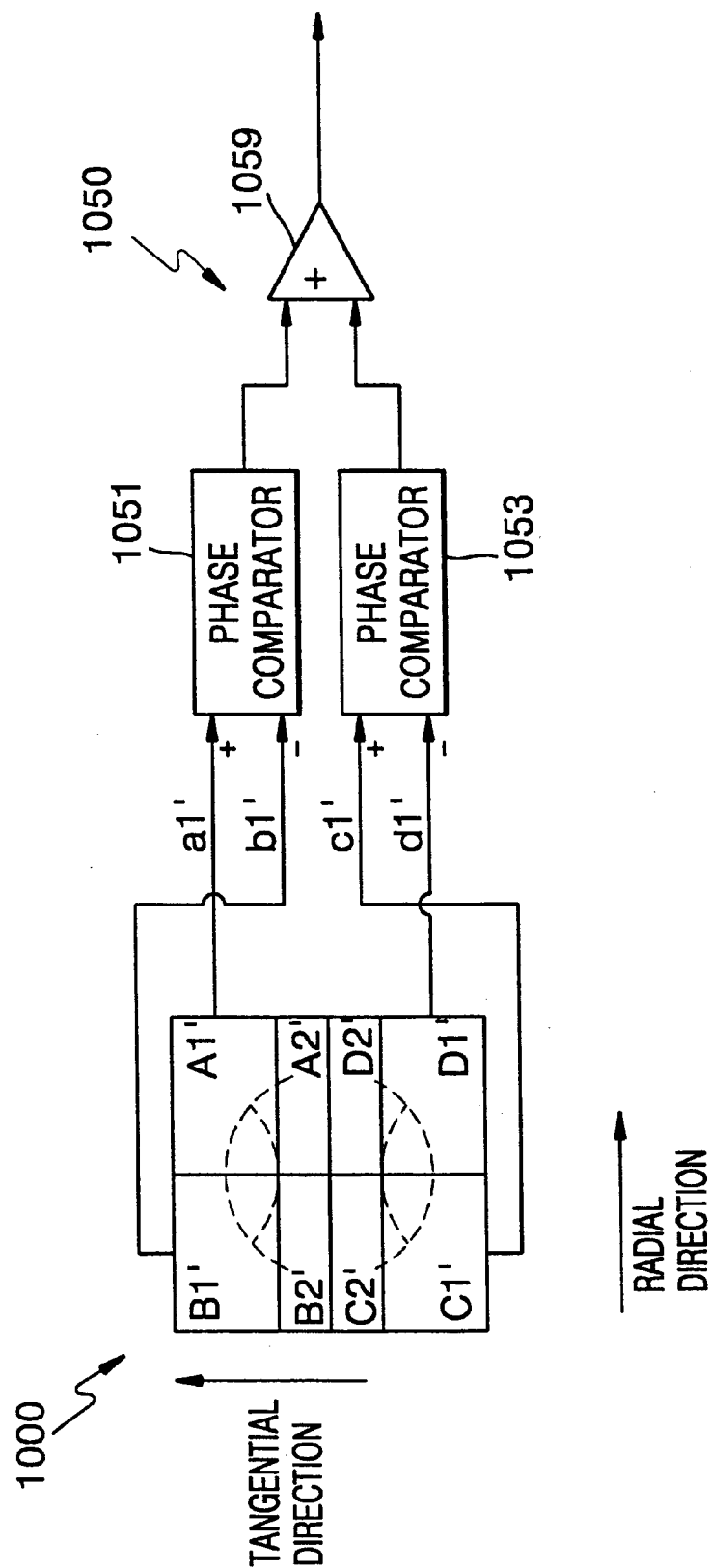
FIG. 23 illustrates the structure of another embodiment of the error signal detection apparatus according to the present invention, which detects a tracking error signal.

Referring to FIG. 23, the error signal detection apparatus according to the present invention includes a photodetector 1000 for receiving light reflected and diffracted from a recording medium, such as the disk 10 of FIG. 4B, and a circuit unit 1050 for detecting an error signal by processing the detection signals generated by the photodetector 1000. The photodetector 1000 receives light reflected from the recording medium, and outputs detection signals which are used in detecting a reproduction signal of the recording medium, and a tracking and/or tilt error signal.

The photodetector 1000 is divided into four sections in the tangential direction and two sections in the radial direction, which forms a 4×2 matrix (4 rows×2 columns) with an 8-section structure. That is, the photodetector 1000 includes eight light receiving portions: four inner light receiving portions A2', B2', C2' and D2', and four outer light receiving portions A1', B1', C1' and D1', which are arranged counter-clockwise in order. The eight light receiving portions separately perform photoelectric conversion on incident light. In the present embodiment, the inner light receiving portions A2', B2', C2' and D2' are wide in the radial direction and narrow in the tangential direction. That is, a width of the light receiving portion in the radiall direction is greater than a width of the light receiving portion in the tangential direction.

When light reflected and diffracted from the recording medium is diffracted into 0th order and ±1st order diffracted beams along the tangential direction, i.e., the pit direction, as shown in FIG. 4B, it is preferable that the width of the inner light receiving portions A2', B2', C2' and D2' in the tangential direction is determined to receive most of the 0th order diffracted beam. If a portion of each of the ±1st order diffracted beams overlaps the 0th order diffracted beam, the width of the inner light receiving portions A2', B2', C2' and D2' in the tangential direction can be determined to receive the overlapping portions of the three beams.

Similar to the photodetector 30 of FIG. 5, the phases of the detection signals a2', b2', c2' and d2' of the inner light receiving portions A2', B2', C2' and D2' are different from those of the detection signals a1', b1', c1' and d1' of the outer light receiving portions A1', B1', C1' and D1'.

The circuit unit 1050 of FIG. 23 separately processes the detection signals of the outer light receiving portions. That is, the circuit unit 1050 compares the phases of the detection signals generated by the light receiving portions arranged in the same row, and detects an error signal using the phase comparison signals. To end this, as shown in FIG. 23, the circuit unit 1050 includes a pair of phase comparators 1051 and 1053 for comparing the phases of the detection signals, and an adder 1059 for summing the phase comparison signals output from the phase comparators 1051 and 1053.

The phase comparator 1051 receives the detection signals a1' and b1' of the outer light receiving portions A1' and B1' arranged in the first row, and compares the phases thereof. The phase comparator 1053 receives the detection signals c1' and d1' of the outer light receiving portions C1' and D1' arranged in the fourth row, and compares the phases thereof.

An error signal output from the adder 1059 is the sum of the phase comparison signal with respect to the detection signals a1' and b1' of the outer light receiving portions A1' and B1' arranged in the same row in the tangential direction, which is output from the phase comparator 1051, and the phase comparison signal with respect to the detection signals c1' and d1' of the outer light receiving portions C1' and D1' arranged in the same row in the tangential direction, which is output from the phase comparator 1053.

Figure 2:
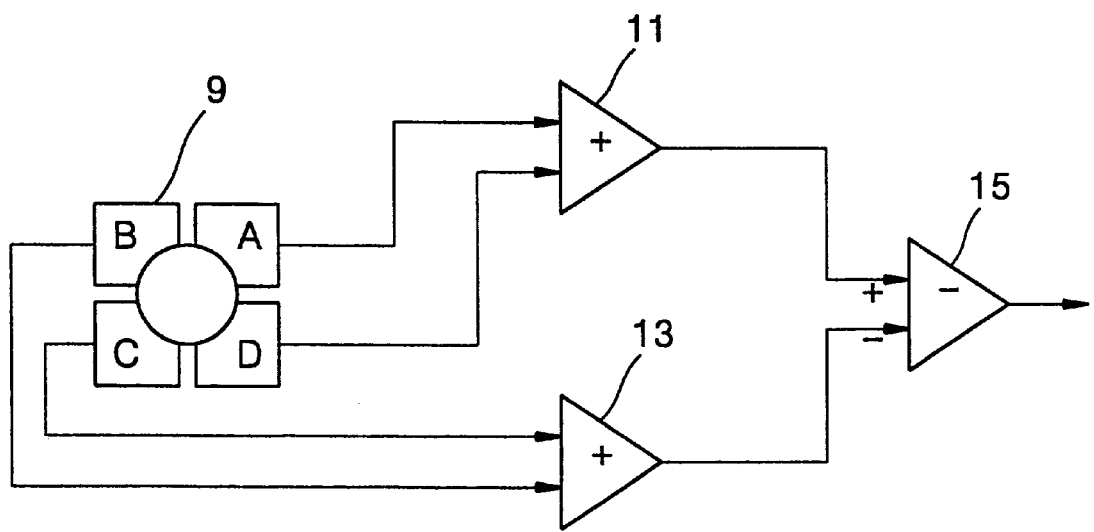
FIG. 2 illustrates the structure of a conventional tilt error signal detection apparatus.

When an error signal is detected using the phase comparison signals that are obtained by comparing the detection signals of the light receiving portions arranged in the same row, as in the present embodiment, degradation of phase due to signal distortion can be prevented, compared to the conventional error detection technique of comparing the phases of the sums of detection signals of the diagonally opposite light receiving portions, which is described above with reference to FIGS. 2 and 3. Although there is variation in the depth of pits on recording media, signal degradation which possibly occurs with the conventional method using the sums of the detection signals of diagonally opposite light receiving portions can be prevented.

According to the present invention, the phase characteristics along the tangential direction of the detection signals of the light receiving portions are not obscured, and thus an error signal with a high gain can be obtained.

Figure 24:
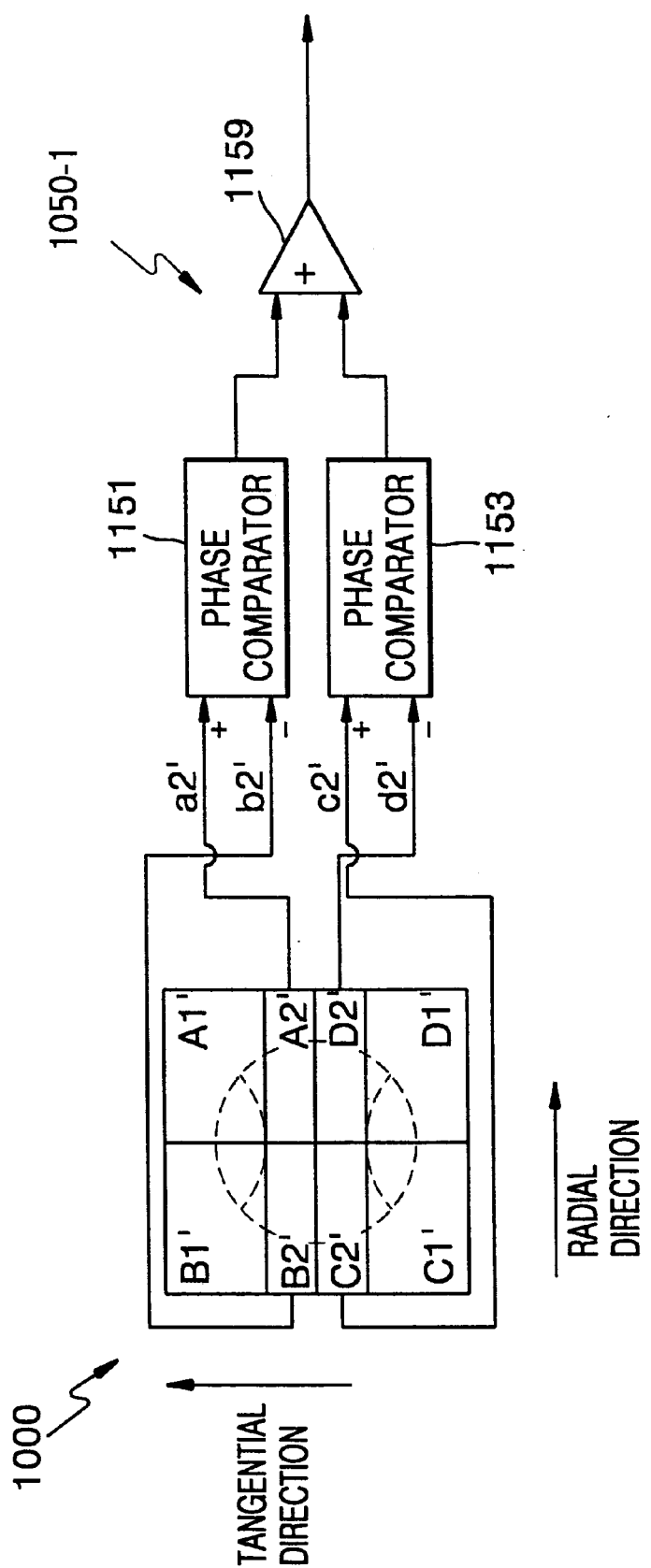
FIGS. 24 through 26 illustrate alternative embodiments of the circuit unit of FIG. 23.

In another embodiment, shown in FIG. 24, a circuit unit 1050-1 may be constructed such that it detects a tracking error signal using the detection signals a2', b2', c2' and d2' of the inner light receiving portions A2', B2', C2' and D2', instead of using the detection signals a1', b1', c1' and d1' of the outer light receiving portions A1', B1', C1' and D1'. In particular, the phase comparator 1151 receives the detection signals a2' and b2' of the inner light receiving portions A2' and B2' arranged in the second row, and outputs a phase comparison signal. The phase comparator 1153 receives the detection signals c2' and d2' of the inner light receiving portions C2' and C2' arranged in the third row, and outputs a phase comparison signal. The adder 1159 outputs an error signal by summing the phase comparison signals.

Figure 25:
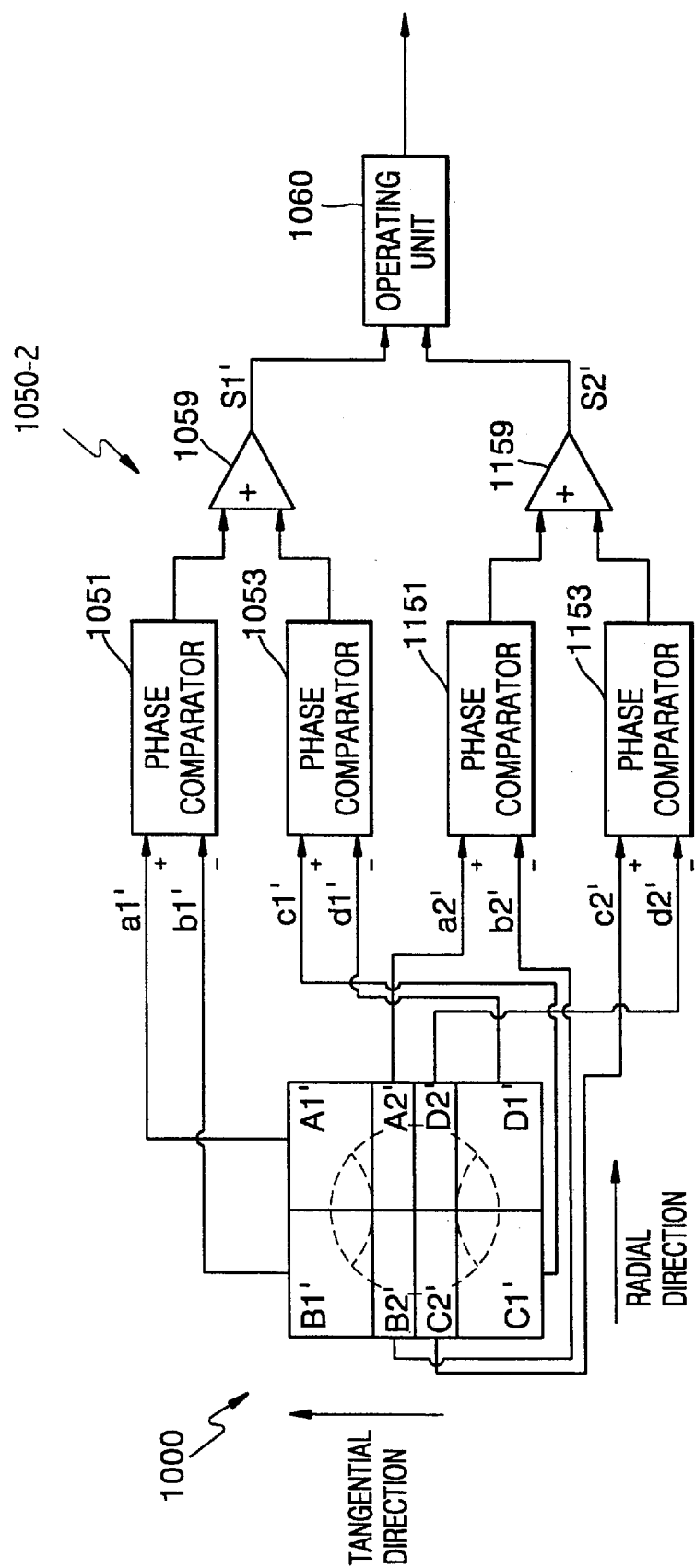

In another embodiment, shown in FIG. 25, the circuit unit 1050-2 may be constructed such that it is able to detect an error signal using all the detection signals a1', b1', c1', d1', a2', b2', c2' and d2' of the outer and inner light receiving portions A1', B1', C1', D1', A2', B2', C2' and D2', which includes a combination of the circuit units 1050 and 1050-1 of FIGS. 23 and 24. In particular, an error signal S1' is obtained by processing the detection signals a1', b1', c1' and d1' of the outer light receiving portions A1', B1', C1' and D1', which is the same as in FIG. 23, and an error signal S2' is obtained by processing the detection signals a2', b2', c2' and d2' of the outer light receiving portions A2', B2', C2' and D2', which is the same as in FIG. 24. Then, the two error signals S1' and S2' are summed or subtracted by the operating unit 1060, so that a final error signal is obtained.

Preferably, the operating unit 1060 amplifies only the error signal S2' from the adder 1159 by a predetermined gain factor k, sums or subtracts the amplified error signal (k*S2') and the error signal S1' from the adder 1059, to output a final error signal. Alternatively, both of the error signals S1' and S2' may be amplified a predetermined amount, and summed to obtain a final error signal.

The operating unit 1060 may be constructed of the gain controller 451 and the adder 455 as shown in FIG. 16. In this case, a tracking error signal is output from the operating unit 1060. Alternatively, if the operating unit 1060 is constructed of the gain controller 451, the adder 455 and the differential unit 463 as shown in FIG. 17, both tracking and tilt error signals can be detected by the operating unit 1060.

Figure 26:
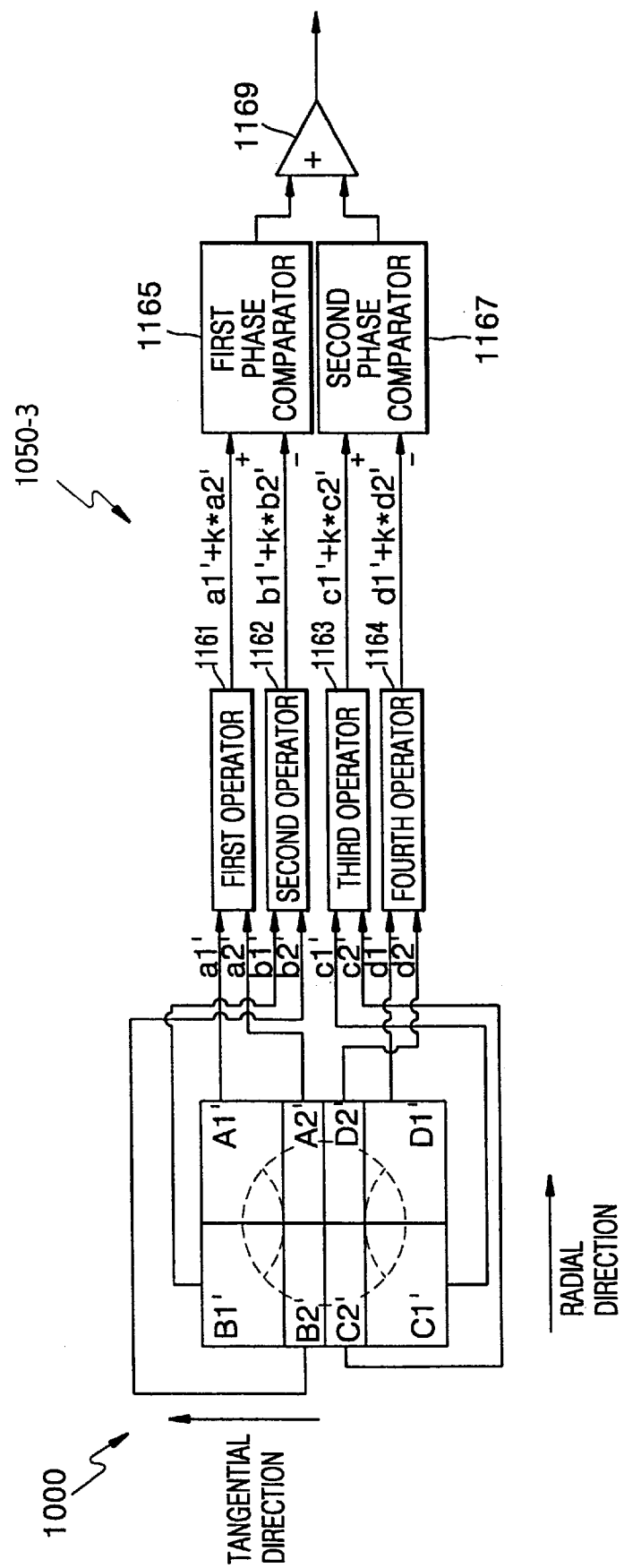

In another embodiment, a circuit unit 1050-3 amplifies the detection signals of the inner light receiving portions with a predetermined gain, and sums the products and the detection signals of the corresponding outer light receiving portions. Then, phase comparison is performed with respect to the detection signals generated by the light receiving portions arranged in the radial direction. As a result, distortion that occurs between the detection signals generated by the outer and inner light receiving portions can be corrected. As shown in FIG. 26, the detection signals a2', b2', c2' and d2' of the inner light receiving portions A2', B2', C2' and D2' are amplified with the predetermined gain, and summed with the detection signals a1', b1', c1' and d1' of the corresponding outer light receiving portions A1', B1', C1' and D1'. The phases of the sums of the detection signals generated by the light receiving portions arranged in radial directions are compared, and an error signal is obtained by summing the phase comparison signals.

In particular, the detection signals a1' and a2' of the outer and inner light receiving portions A1' and A2' are input to a first operator 1161. The first operator 1161 amplifies the detection signal a2' of the inner light receiving portions A2' by a predetermined gain factor k, and sums the amplified detection signal and the detection signal a1' of the outer light receiving portion A1'. As a result, the first operator 1161 outputs the signal (a1'+k*a2').

In a similar manner, a second operator 1162 receives the detection signals b1' and b2' of the outer and inner light receiving portions B1' and B2' and outputs the signal (b1'+k*b2'). A third operator 1163 receives the detection signals c1' and c2' of the outer and inner light receiving portions C1' and C2' and outputs the signal (c1'+k*c2'). A fourth operator 1164 receives the detection signals d1' and d2' of the outer and inner light receiving portions D1' and D2' and outputs the signal (d1'+k*d2').

A first phase comparator 1165 compares the phase of the output signal of the first operator 1161, which is obtained from the detection signals a1' and a2' of the outer and inner light receiving portions A1' and A2' arranged in the tangential direction, and the phase of the output signal of the second operator 1162, which is obtained from the detection signals b1' and b2' of the outer and inner light receiving portions B1' and B2' arranged in the tangential direction. A second phase comparator 1167 compares the phase of the output signal of the third operator 1163, which is obtained from the detection signals c1' and c2' of the outer and inner light receiving portions C1' and C2' arranged in the tangential direction, and the phase of the output signal of the fourth operator 1164, which is obtained from the detection signals d1' and d2' of the outer and inner light receiving portions D1' and D2' arranged in the tangential direction.

An adder 1169 sums the phase comparison signals output from the first and second phase comparators 1165 and 1167, to output an error signal.

Figure 27A:
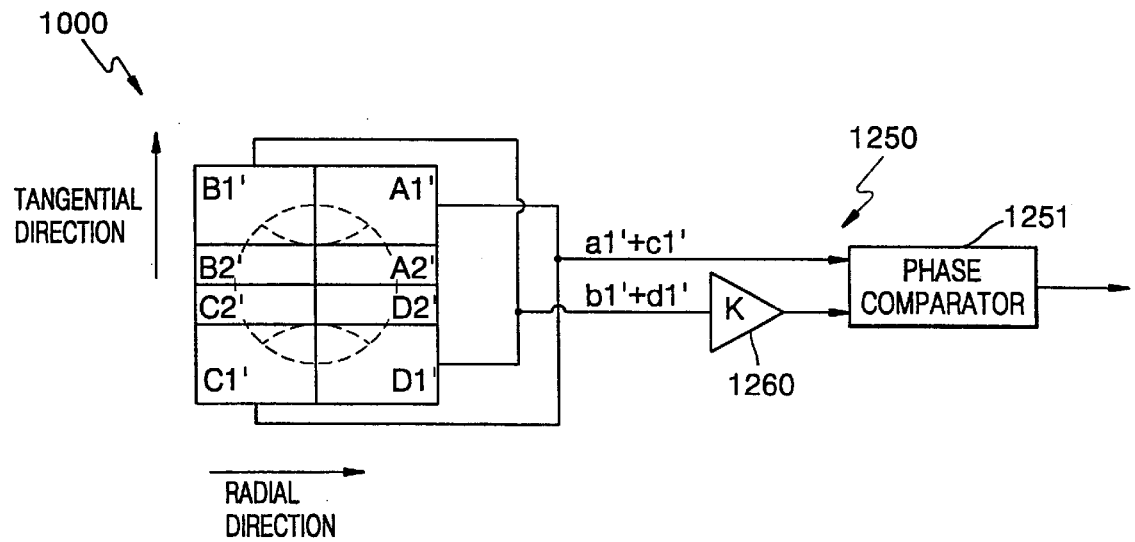
FIGS. 27A and 27B illustrates the structure of another embodiment of the error signal detection apparatus according to the present invention.

As shown in FIG. 27A an error signal is detected by amplifying the sum of the detection signals generated by the outer light receiving portions arranged in one diagonal direction, and the sum of the detection signals generated by the outer light receiving portions arranged in one diagonal direction, and comparing the phases of the amplified signals with the phases of the sum of the detection signals generated by the outer light receiving portions in a second diagonal direction.

The circuit unit 1250 includes an amplifier 1260 for amplifying the sum of the detection signals b1' and d1' of the outer light receiving portions B1' and D1' arranged in the second diagonal direction with a predetermined gain; and a phase comparator 1251 for comparing the phase of the sum of the detection signals a1' and c1' of the outer light receiving portions A1' and C1' arranged in a first diagonal direction, with the phase of the output signal from the amplifier 1260, to detect an error signal. Here, the gain factor k is a constant.

Figure 3:
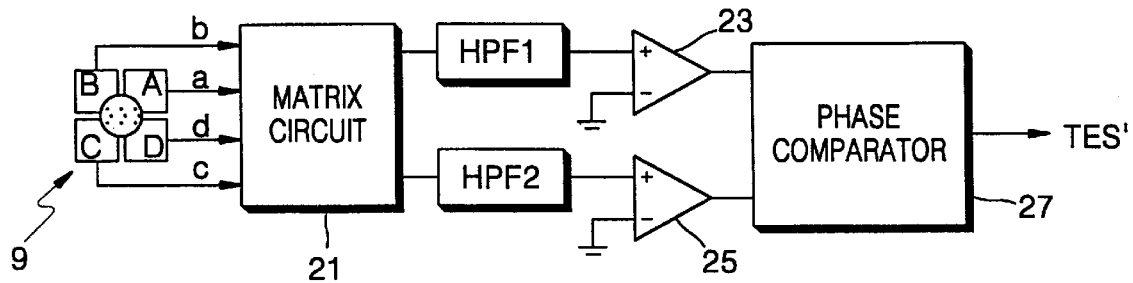
FIG. 3 illustrates the structure of a conventional tracking error signal detection apparatus.
Figure 28:
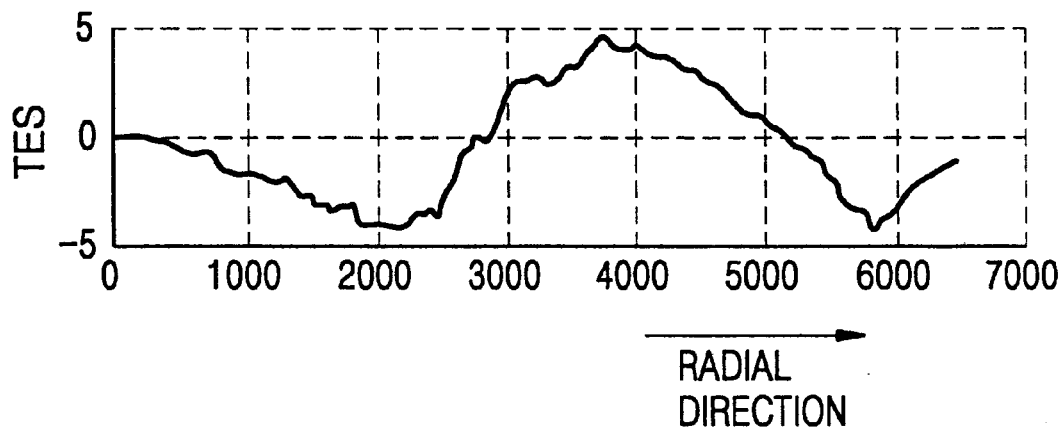
FIGS. 28 and 29 are graphs showing the tracking error signals output from the circuit units of FIGS. 27A and 3, respectively.
Figure 29:
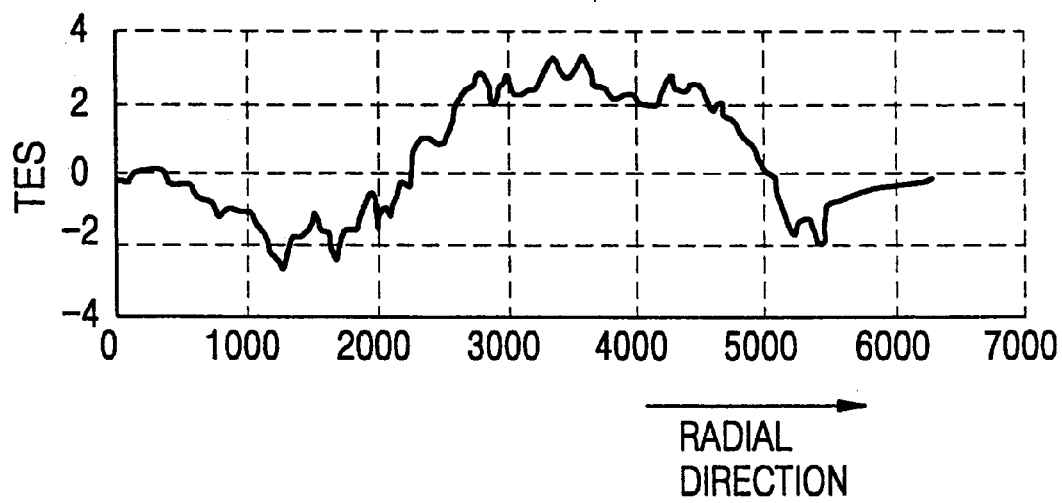

FIGS. 28 and 29 show a tracking error signal TES output from the phase comparator 1251 according to the present invention, and a tracking error signal TES' detected by the conventional method of FIG. 3, respectively. As shown in FIGS. 4A and 4B, the 0th order diffracted beam, and the overlapping portions of the 0th order diffracted beam and ±1st order diffracted beams are separately received by the light receiving portions of the photodetector in the present invention. Thus, the amplitude of the tracking error signal TES, which is detected by the present error signal detection apparatus, is increased and the level of noise is decreased, compared to the tracking error signal TES' shown in FIG. 3.

Figure 27B:
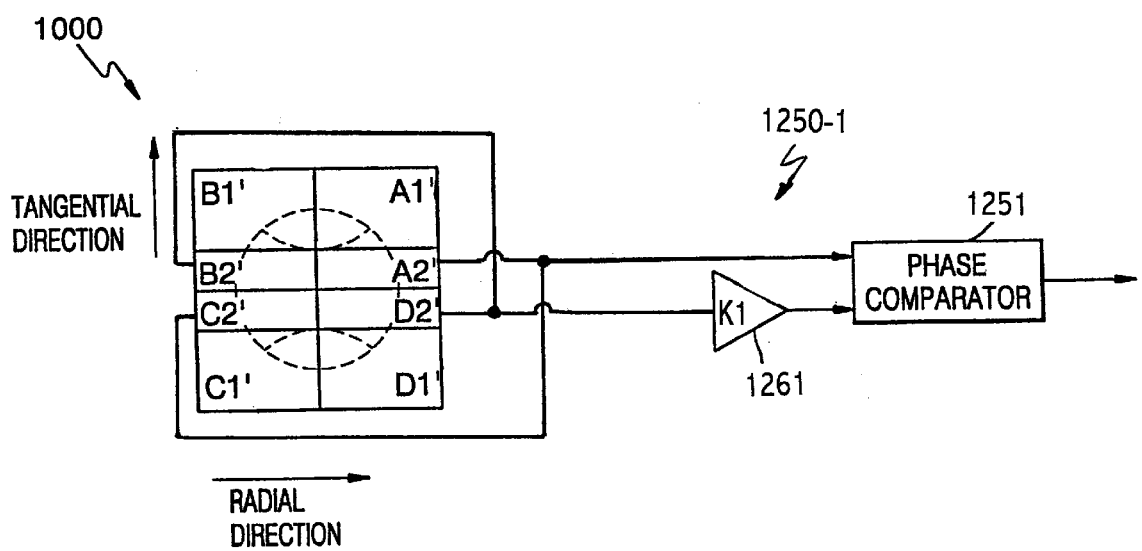

Alternately, the circuit unit 1250 of FIG. 27A may be constructed such that it uses the detection signals of the inner light receiving portions A2', B2', C2' and D2' in detecting an error signal. Such a construction is as shown in FIG. 27B, and is identified as circuit 1250-1. Circuit unit 1250-1 is similar to circuit unit 1250 of FIG. 27A and differs only in that amplifier 1261 as shown in FIG. 27B has a gain of K1 whereas amplifier 1260 in FIG. 27A has a gain of K, otherwise, the circuit 1250-1 in FIG. 27B should require no further explanation.

Figure 30:
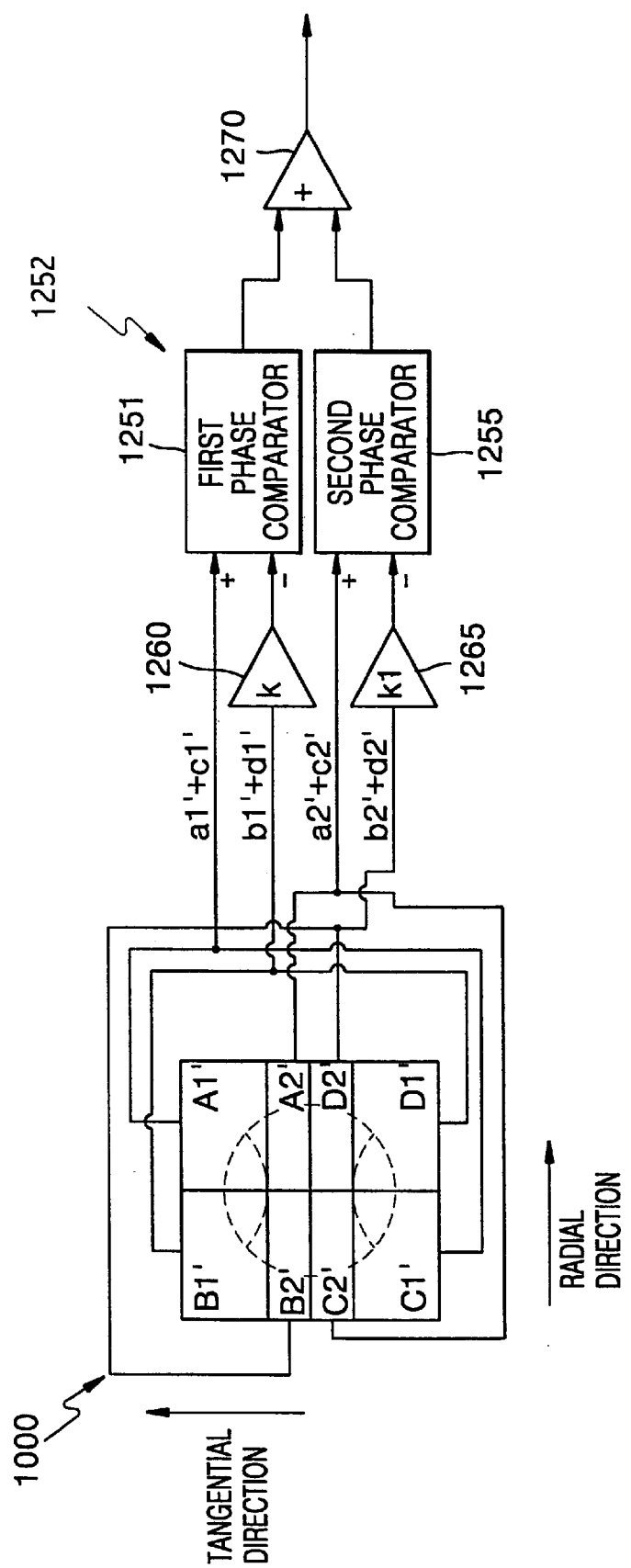
FIGS. 30 through 32 illustrate alternative embodiments of the circuit unit of FIG. 27A.

Instead of detecting the tracking error signal using the detection signals of either the inner or outer light receiving portions as shown in FIGS. 27A and 27B, an error signal may be detected using all the detection signals a2', b2', c2', d2', a1', b1', c1' and d1' of the inner and outer light receiving portions A2', B2', C2', D2', A1', B1', C1' and D1' as shown in FIG. 30.

In particular, the circuit unit 1252 includes a first amplifier 1260 for amplifying the sum of the detection signals b1' and d1' of the outer light receiving portions B1' and D1' arranged in a second diagonal direction with a predetermined gain factor k; a second amplifier 1265 for amplifying the sum of the detection signals b2' and d2' of the corresponding inner light receiving portions B2' and D2' ; a first phase comparator 1251 for comparing the phase of the sum of the detection signals a1' and c1' of the outer light receiving portions A1' and C1' arranged in a first diagonal direction and the phase of the output signal from the first amplifier 1260, and outputting a phase comparison signal from the outer light receiving portions A1', B1', C1' and D1' ; a second phase comparator 1255 for comparing the phase of the sum of the detection signals a2' and c2' of the inner light receiving portions A2' and C2' arranged in the first diagonal direction and the phase of the output signal from the second amplifier 1265, to output a phase comparison signal from the inner light receiving portions A2', B2', C2' and D2'; and an adder 1270 to output an error signal by summing the phase comparison signals from the first and second phase comparators 1251 and 1255.

Figure 31:
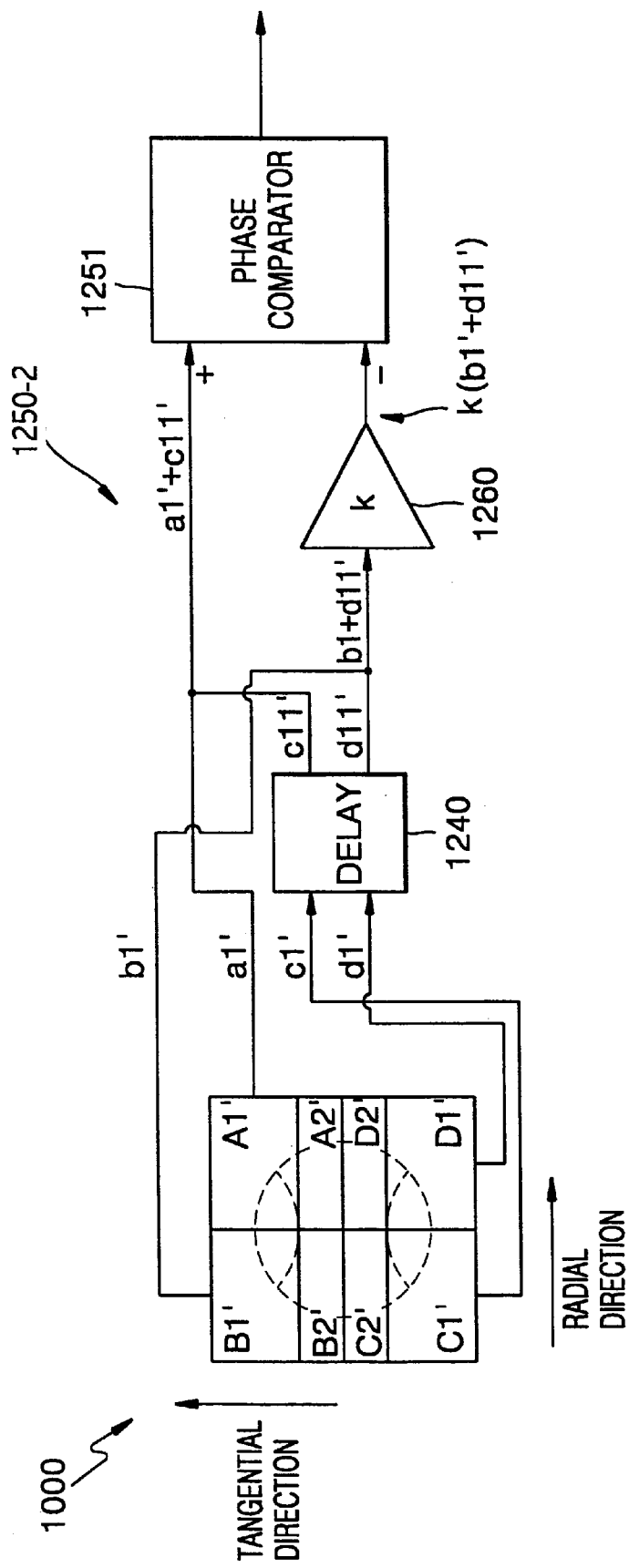

The circuit unit 1250 of FIG. 27A may further comprise a delay at the output ends of the outer light receiving portions C1' and D1' arranged in the fourth row of the photodetector 1000. In this case, as shown in FIG. 31, and identified as circuit unit 1250-2, a delay 1240 delays the detection signals c1' and d1' of the outer light receiving portions C1' and D1', to output delayed signals c11' and di', respectively. The delayed signals c11' and d1' are summed with the detection signals a1' and b1', respectively, of the outer light receiving portions A1' and B1' arranged in the first row of the photodetector 1000, and the summed signals, a1'+c11', and b1'+d11', are then input to the phase comparator 1251 and the amplifier 1260, respectively. Amplifier 1260 multiplies the signal b1'+d1' by a k to provide a second input to phase comparator 1251. The phase comparator 1251 compares signal a1'+c11' and the signal k(b1'+d11') to output an error signal.

In the case when the detection signals c1' and d1' of the outer light receiving portions C1' and D1' arranged in the same row are delayed in detecting an error signal, as illustrated in FIG. 31, the offset of the error signal which possibly occurs when the objective lens (not shown) is shifted, due to phase difference offset, can be corrected, and thus an error signal can be detected more precisely and accurately. In practice, the phase difference offset occurs between sums of the detection signals received by diagonally opposite light receiving portions, due to a difference in the depth of pits on the recording medium.

In other words, when a deviation of pit depth on the recording medium occurs, the conventional error signal detection apparatus detects an error signal by just summing the detection signals of the diagonally opposite light receiving portions and subtracting the results, so that degradation of the signal is serious. Meanwhile, the circuit unit 1250-2 of the present invention processes the detection signals of the diagonally opposite light receiving portions by, for example, delay and amplification, and then detects a phase difference between the signals. As a result, degradation of phase due to signal distortion, caused by such variations of pit depth, can be reduced or eliminated. Thus, even when the objective lens is shifted, the error signal can be detected with sharply reduced offset.

Figure 32:
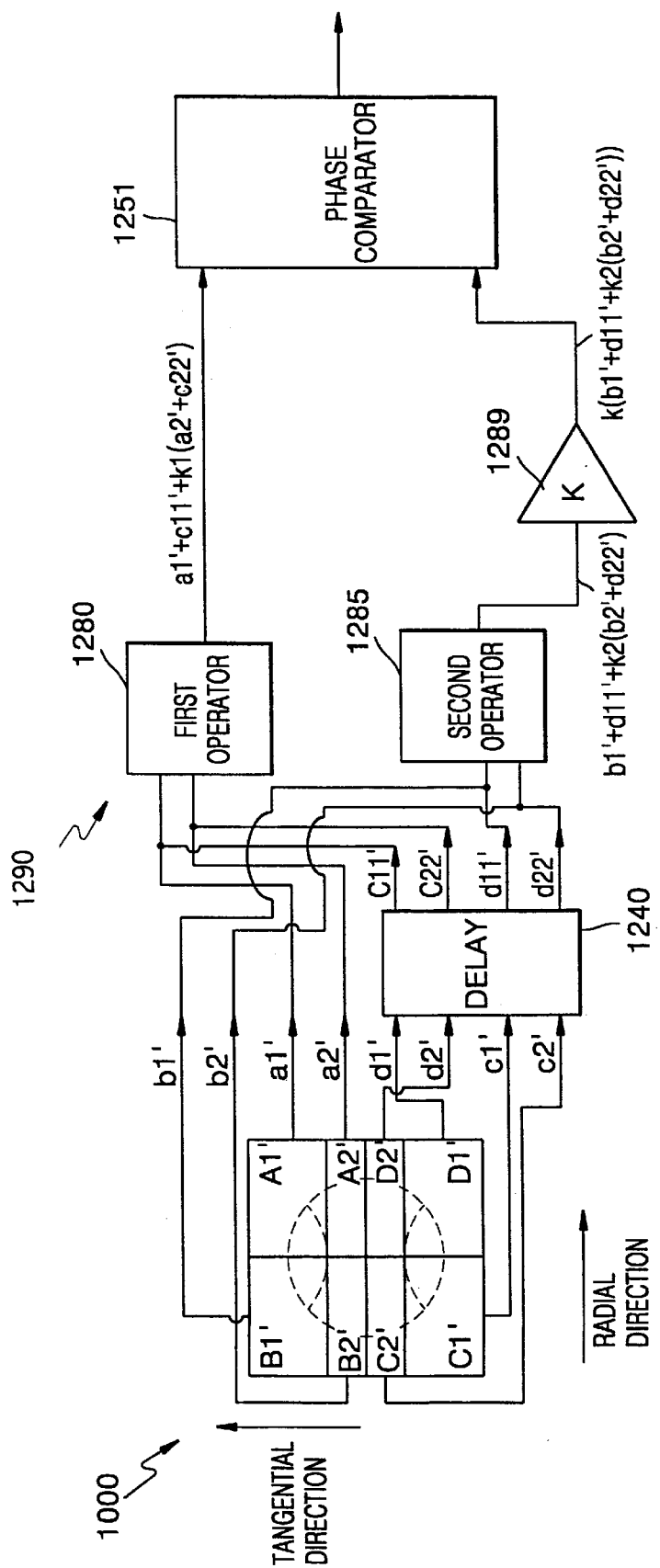

The structure of the circuit unit may be varied as shown in FIG. 32. In FIG. 32, a circuit unit 1290 delays the detection signals c1' and d1' of the outer light receiving portions C1' and D1' arranged in the same row, i.e., in the fourth row, and the corresponding inner light receiving portions C2' and D2', appropriately processes the delayed signals c11', d11', c22' and d22' with the detection signals a1', b1', a2' and b2' of the corresponding diagonally opposite outer and inner light receiving portions A1', B1', A2' and B2', and compares the phases of the resultant signals, thereby detecting an error signal.

In particular, a delay 1240 delays the detection signals c1', c2', d1' and d2' of the outer and inner light receiving portions C1', C2', D1' and D2' arranged in the tangential direction, and outputs the delayed signals c11', c22', d11' and d22'.

The delayed signals c11' and c22' of the outer and inner light receiving portions C1' and C2', and the detection signals a1' and a2' of the corresponding diagonal outer and inner light receiving portions A1' and A2' are input to a first operator 1280. The first operator 1280 amplifies the sum (a2'+c22') of the detection signals of the inner light receiving portions A2' and C2' by a predetermined gain factor k1, and sums the amplified signal with the sum (a1'+c11') of the detection signals of the outer light receiving portions A1' and C1'.

The delayed signals d11' and d22' of the other outer and inner light receiving portions D1' and D2', output from the delay 1240, and the detection signals b1' and b2' of the corresponding diagonally opposite light receiving portions B1' and B2', are input to a second operator 1285. The second operator 1285 amplifies the sum (b2'+d22') of the detection signals of the inner light receiving portions B2' and D2' by a predetermined gain factor k2, and sums the amplified signal with the sum (b1'+d11') of the detection signals of the outer light receiving portions B1' and D1'.

The output signal of the second operator 1285 is amplified by a predetermined gain factor k by an amplifier 1289. The output signal of the first operator 1280 and the output signal of the amplifier 1289 are input to the phase comparator 1251. The phase comparator 1251 compares the phases of the generated signals, to output an error signal.

In the present embodiment, the gain factor k is a non-zero constant. When the gain factors k1 and k2 are zero in the circuit unit 1290 of FIG. 32, the circuit unit 1290 is the same as that shown as 1250-2 in FIG. 31.

Similar to the circuit unit 1250-2 of FIG. 31, in the circuit unit 1290 having the structure shown in FIG. 32, even when a deviation of pit depth of the recording medium occurs, signal distortion can be prevented through delay and amplification. Thus, an error signal can be detected with sharply reduced offset, regardless of shifting of the objective lens.

Various embodiments of the tracking error signal detection apparatus, which detects an error signal with the photodetector 1000 divided into 8 light receiving portions A1', A2', B1', B2', C1', C2', D1' and D2', have been described above.

Figure 33:
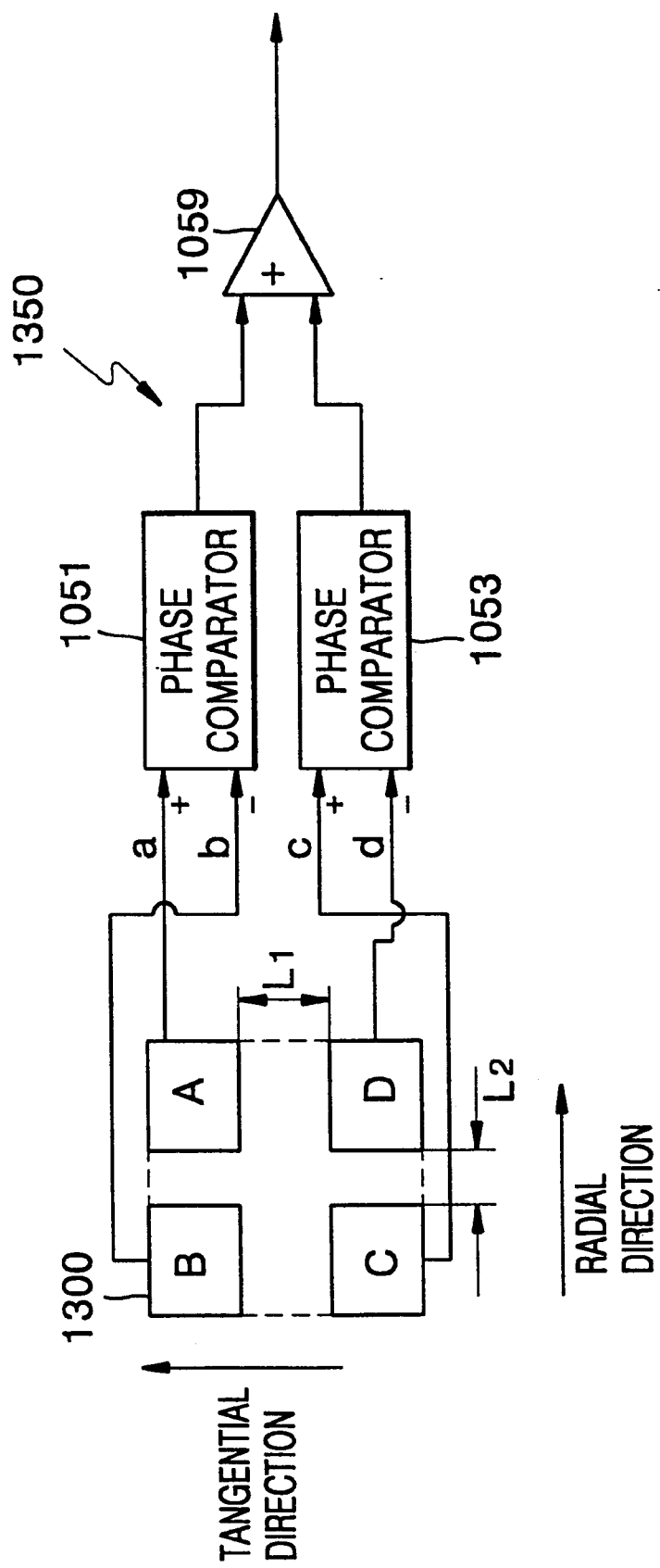
FIG. 33 illustrates the structure of another embodiment of the error signal detection apparatus according to the present invention.

Another embodiment of the tracking error signal detection apparatus according to the present invention, which adopts a photodetector including four light receiving portions, is shown in FIG. 33. The tracking error signal detection apparatus includes a photodetector 1300 including four light receiving portions A, B, C and D arranged counterclockwise in order, forming a 2×2 matrix, wherein the rows are parallel to a direction corresponding to the radial direction of the recording medium, and the columns are parallel to a direction corresponding to the tangential direction of the recording medium; and a circuit unit 1350 for detecting an error signal using the detection signals generated by the photodetector 1300.

The light receiving portions A, B, C and D are separated from each other by a predetermined distance L1 in the radial direction, and by a predetermined distance L2 in the tangential direction, such that a portion of incident light reflected from the recording medium is not received.

Preferably, the distance L1 is approximately the same as the total width of the inner light receiving portions A2', B2', C2' and D2' in the tangential direction of the detector 1000 shown in FIG. 23.

The phase relationship between the detection signals a, b, c and d of the first through fourth light receiving portions A, B, C and D is similar to that between the detection signals of the outer light receiving portions shown in FIGS. 5 and 23.

In the present embodiment, the first through fourth light receiving portions A, B, C and D are arranged a predetermined distance apart from each other. As a result, distortion of an error signal detected by receiving a portion of the incident light reflected and diffracted from the recording medium can be reduced. Thus, an error signal can be detected with increased accuracy.

When the error signal detection apparatus is used exclusively in detecting a tilt error signal, it is preferable that the photodetector 1300 is arranged such that it is able to receive only a portion of light reflected by the recording medium after having been focused on the recording medium by an objective lens of an optical pickup. For example, in an optical system having the optical pickup shown in FIG. 1, another beam splitting means can be positioned on the optical path between the beam splitter 5, which is adopted as an optical path changing means, and the light sensing lens 8. Then, the photodetector 1300 for detecting a tilt error signal is arranged such that it can receive a portion of light reflected and diffracted from the recording medium, which is split by the beam splitting means. For this case, an additional photodetector 9 (see FIG. 1) for use in detecting an information signal, as well as the photodetector 1300 for detection of a tilt error signal is needed for an optical recording/reproducing system.

The photodetector 1300 having the first through fourth light receiving portions A, B, C and D can be used for detection of both information and error signals by receiving a portion of light reflected and diffracted from the recording medium.

As shown in FIG. 33, the circuit portion 1350 compares the detection signals a and b of the light receiving portions A and B arranged in the first row, and the detection signals c and d of the light receiving portions C and D arranged in the second row, separately, and sums the phase comparison signals, thereby detecting an error signal. In this case, the structure of the circuit portion 1350, and the detection of an error signal are similar to the circuit structure and detection method of FIG. 23. Thus, like reference numerals are used to refer to like elements in FIGS. 23 and 33, and a description of the structure and operation is not provided.

The present embodiment is characterized in that the phases of the detection signals arranged in the same column are compared, and then error signals are detected using the obtained phase comparison signals.

Figure 34:
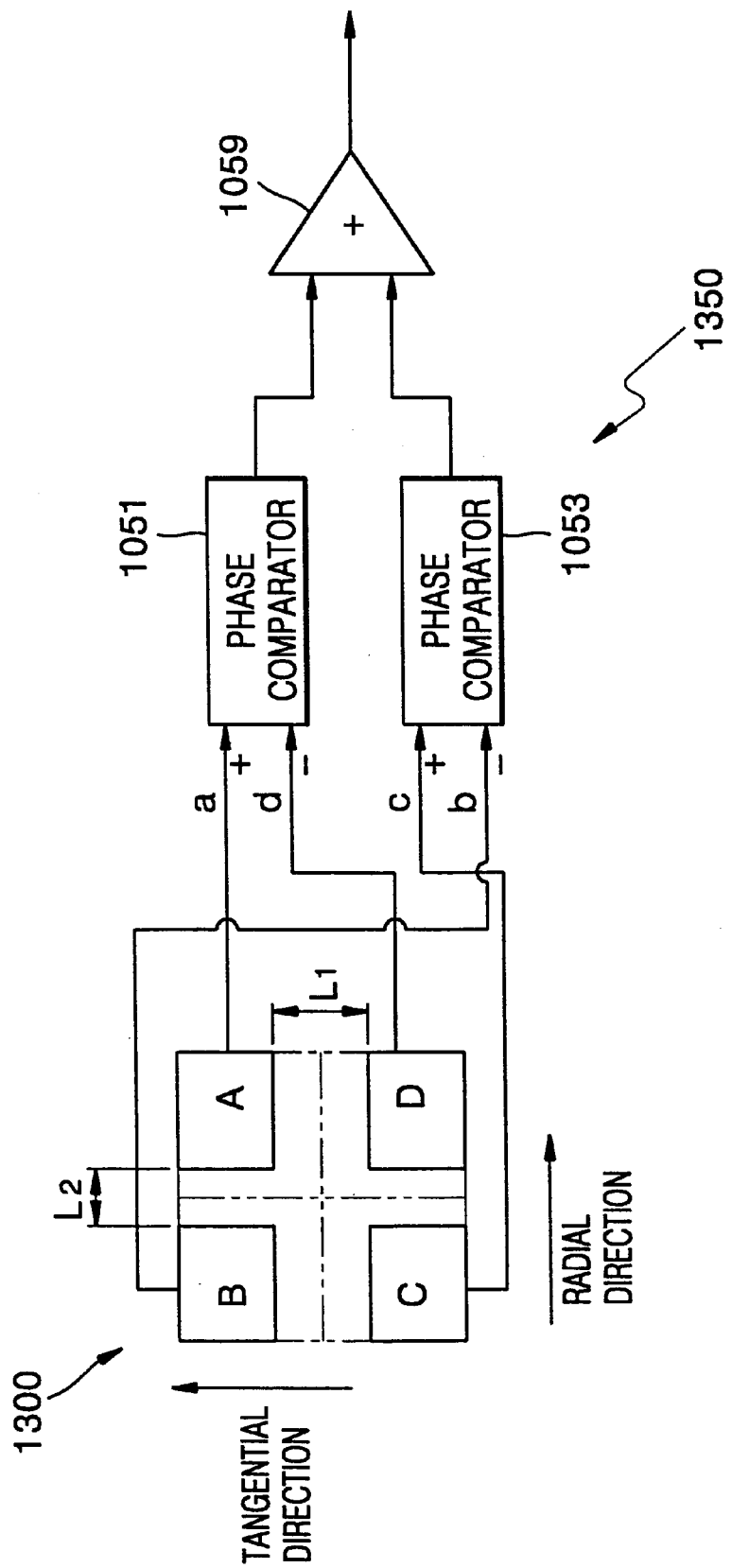
FIGS. 34 and 36 show alternative embodiments of the circuit unit of FIG. 33.

In FIG. 34, the circuit unit 1350 includes a phase comparator 1051 for comparing the phases of the detection signals a and d of first and fourth light receiving portions A and D arranged in a second column, a phase comparator 1053 for comparing the phases of the detection signals c and b of third and second light receiving portions C and B arranged in a first column, and an adder 1059 for subtracting the phase comparison signals received from the phase comparators 1051 and 1053.

As previously mentioned, when the error signals are detected by summing the phase comparison signals obtained by comparing the phases of the detection signals of the light receiving portions arranged in the same column, although a high-density disk having narrow tracks is adopted, noise caused by crosstalk between adjacent tracks can be reduced in detecting error signal.

When a light spot traces along On-track positions with operation of the tracking servo, the circuit unit 1350 outputs a tilt error signal. As for the optical recording/reproducing system where no tilt error occurs, the error signal detection apparatus can be used for detecting a tracking error signal.

The circuit unit 1350 illustrated in the present embodiment may be modified in a similar manner to the various circuit units described in the previous embodiments.

Figure 35:
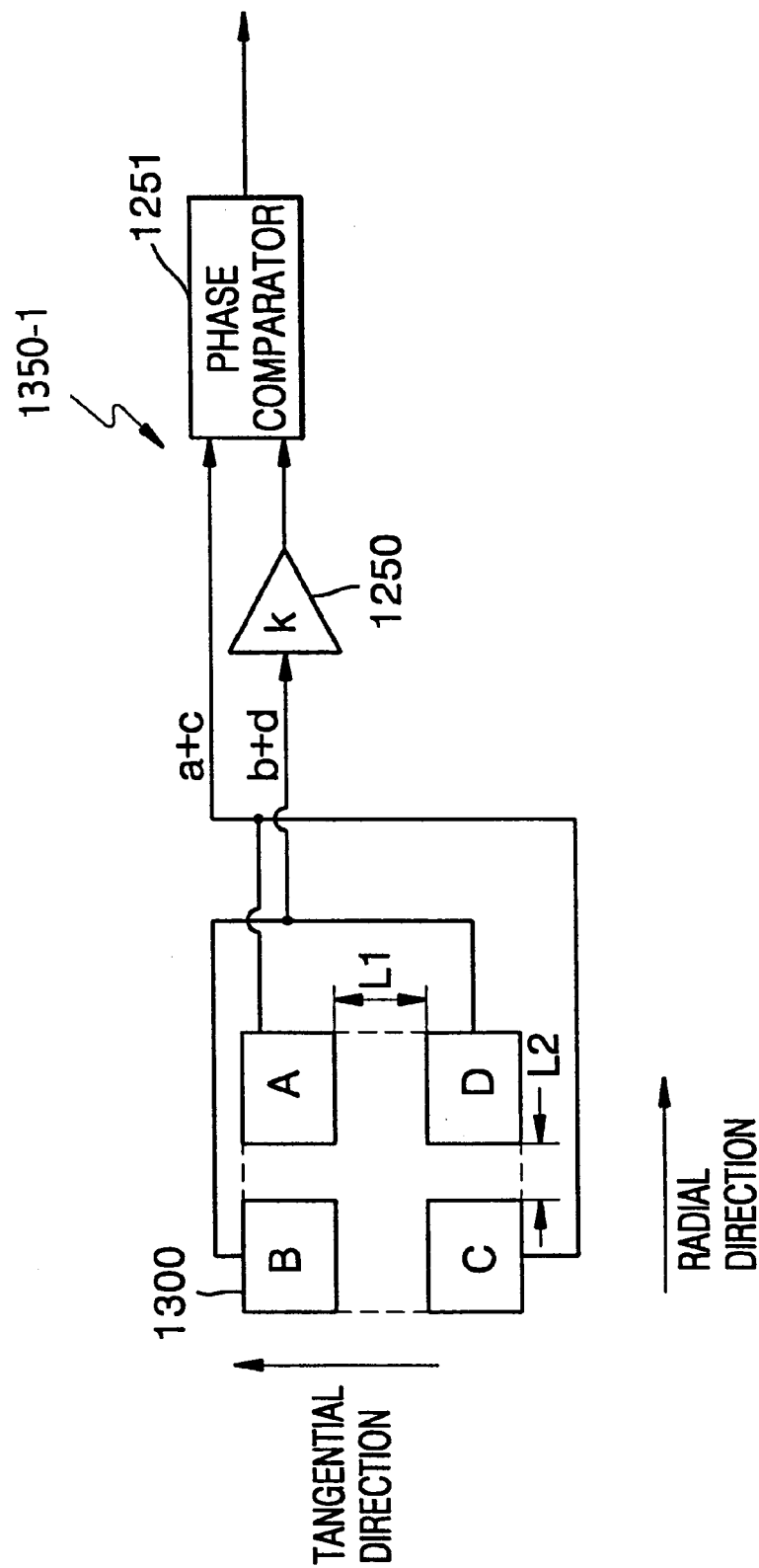

Another embodiment of the error detection apparatus is shown in FIG. 35. In the circuit unit 1350-1 of FIG. 35, the sum of the detection signals b and d of the light receiving portions B and D arranged in one diagonal direction is amplified by a predetermined gain factor k. The phase of the amplified signal is compared with that of the sum of the detection signals a and c of the light receiving portions A and C arranged in the other diagonal direction, thereby detecting an error signal. In this case, the structure of the circuit portion 1350-1, and the detection of the error signal are similar to the circuit 1250 structure and detection method of FIG. 27A. Thus, like reference numerals are used to refer to like elements in FIGS. 27 and 35, and a description of the structure and operation is not further provided.

Figure 36:
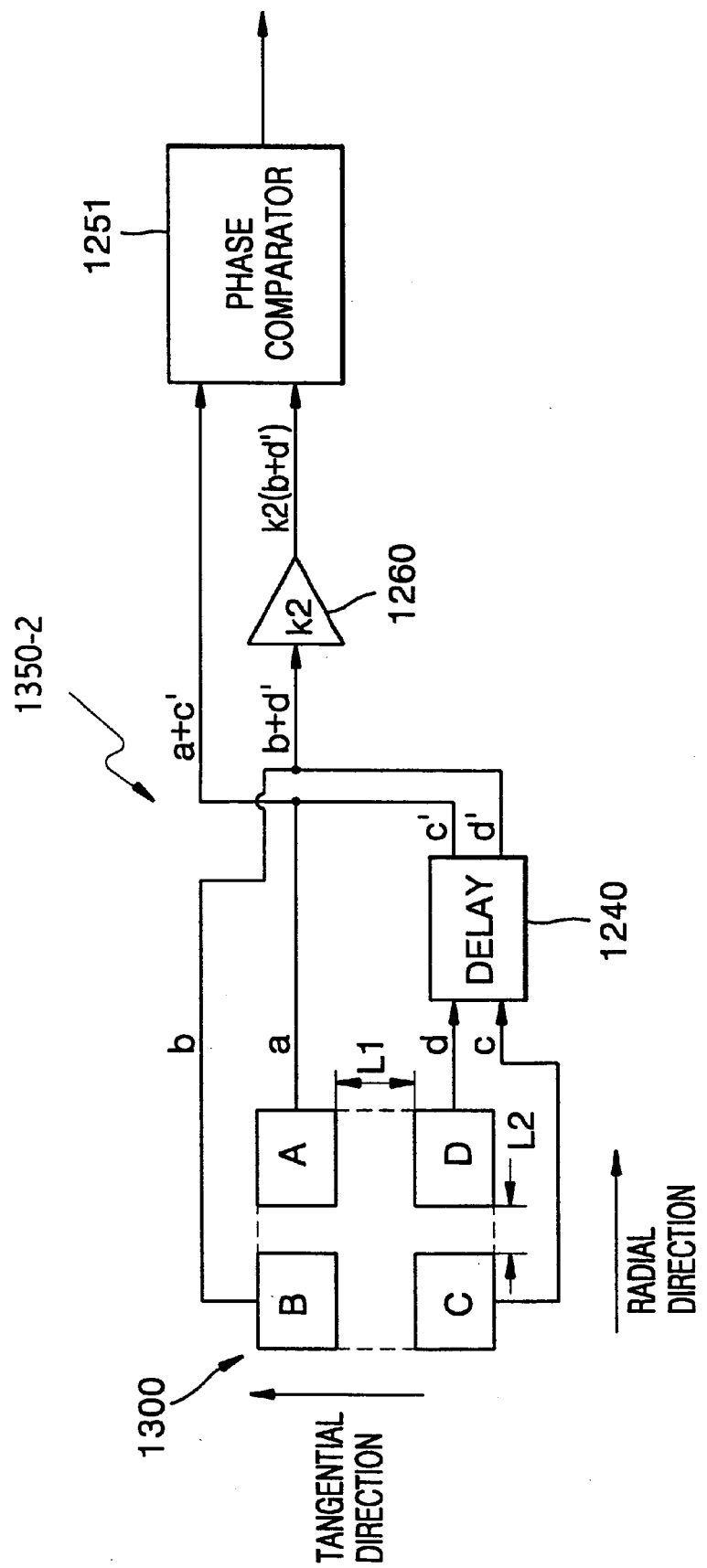

As shown in FIG. 36, the circuit unit 1350-1 of FIG. 35 may further comprise a delay 1240 for delaying the detection signals c and d generated by the light receiving portions C and D arranged in the same row, for example, in the second row of the photodetector 300, and outputting the delayed signals c' and d'. In this case, the structure of the circuit unit 1350-2 including the delay 1240, and the detection of the error signal are also similar to the circuit 1250-2 structure and detection method of FIG. 31. Thus, like reference numerals are used to refer to like elements in FIGS. 31 and 35, and a description of the structure and operation is not further provided.

Figure 37:
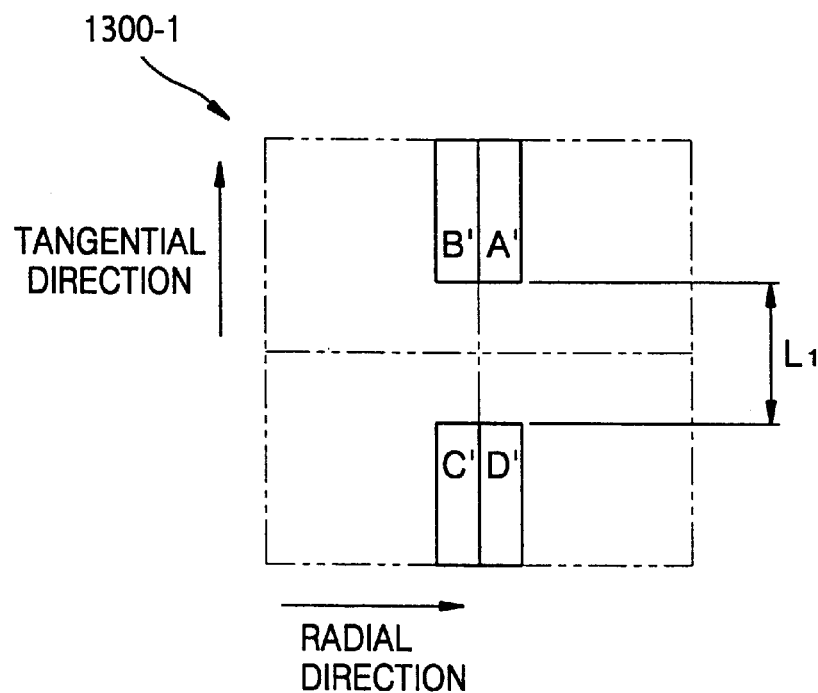
FIGS. 37 through 42 illustrate alternative examples of the photodetector shown in FIGS. 33 through 36.
Figure 38:
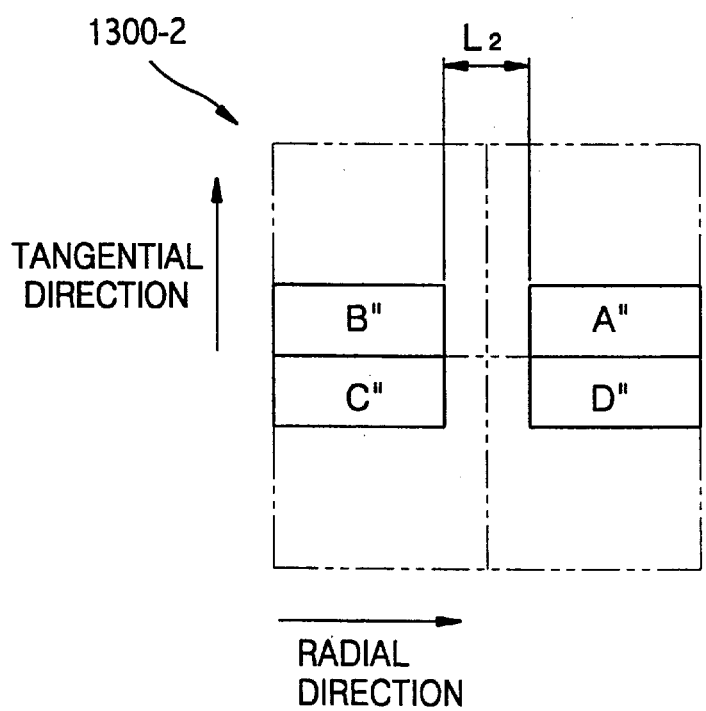
Figure 39:
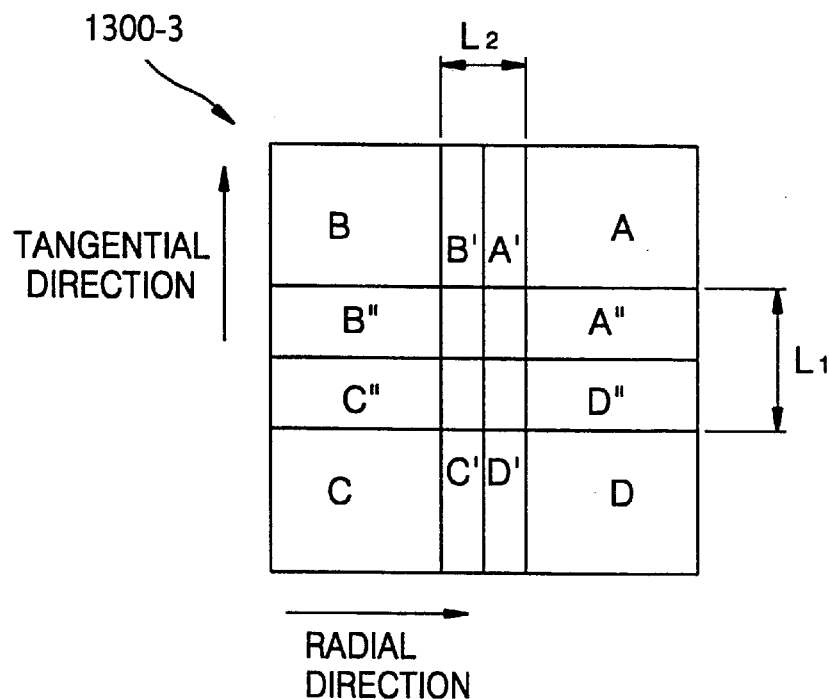

The photodetector 1300 of FIGS. 33 through 36 may be varied as shown in FIGS. 37 through 39.

For example, as shown in FIG. 37, first through fourth light receiving portions A', B', C' and D' of photodetector 1300-1 may be separated by a predetermined distance L1 only in the tangential direction, such that they receives a portion of the 0th order diffracted beam reflected and diffracted from the recording medium. Alternatively, as shown in FIG. 38, the photodetector 1300-2 may include first through fourth light receiving portions A", B", C" and D", which are separated by a predetermined distance L2 only in the radial direction.

Here, the first and second light receiving portions A' and B' of photodetector 1300-1 shown in FIG. 37 correspond to the space between the first and second light receiving portions A and B of the photodetector 1300 shown in FIGS. 33 through 36, and the third and fourth light receiving portions C' and D' of photodetector 1300-1 correspond to the space between the third and fourth light receiving portions C and D of the photodetector 1300 shown in FIGS. 33 through 36.

In a similar way, the first and fourth light receiving portions A" and D" of photodetector 1300-2 of FIG. 38 correspond to the space between the first and fourth light receiving portions A and D of FIGS. 33 through 36, and the second and third light receiving portions B" and C" of photodetector 1300-2 in FIG. 38 correspond to the space between the second and third light receiving portions B and C of the photodetector 1300 shown in FIGS. 33 through 36.

The arrangement of the first through fourth light receiving portions A', B', C' and D' of photodetector 1300-1 of FIG. 37 can be obtained by separating the inner light receiving portions A2, B2, C2 and D2 of FIG. 5 by a predetermined distance in the tangential direction, and removing the outer light receiving portions A1, B1, C1 and D1. The phase relationship between the detection signals a', b', c' and d' of the first through fourth light receiving portions A', B', C' and D' is similar to that between the detection signals a2, b2, c2 and d2 of the inner light receiving portions A2, B2, C2 and D2 of photodetector 30 of FIG. 5.

The phase relationship between the detection signals a", b", c" and d" of the first through fourth light receiving portions A", B", C" and D" shown in FIG. 38 is similar to that between the detection signals a1', b1', c1' and d1' of the inner light receiving portions A1', B1', C1' and D1' of FIG. 24.

The photodetectors 1300-1 and 1300-2 of FIGS. 37 and 38 may be modified into a 8-section structure further including the four L-shaped portions lines, and the error signal detection apparatus can be used in detecting a reproduction signal as well as error signals.

The arrangement of the first through fourth light receiving portions A', B', C' and D' of FIG. 37, and the first through fourth light receiving portions A", B", C" and D" of FIG. 38 can be obtained by dividing the corresponding L-shaped inner light receiving portions of FIG. 33 in the radial and tangential directions, respectively, along the inner edges of the light receiving portions A, B, C and D of FIG. 33.

As shown in FIG. 39, the photodetector 1300-3 of the error signal detection apparatus according to the present invention may have a 16-section structure including all the light receiving portions shown in FIGS. 33 through 38. For this case, the error detection performed with the first through fourth light receiving portions of FIGS. 33 through 38 can be achieved by selectively using the corresponding light receiving portions of the photodetector 1300-3 of FIG. 39. The photodetector 1300 with the 16-section structure can be used in detecting both a reproduction signal as well as error signals.

In the photodetectors 1300, 1301-1, 1301-2 and 1301-3 of FIGS. 33 through 39, the distances L1 and/or L2 between the first through fourth light receiving portions in the radial and/or tangential directions, respectively, are determined to be about 10–80% of the diameter of the 0th order diffracted beam reflected and diffracted from the recording medium. It is preferable that the distances L1 and/or L2 are optimized in consideration of the track pitch, the width and length of pits on the recording medium, the numerical aperture (NA) of the objective lens, the wavelength of light emitted from the light source, tangential tilt, and the like. The error signal detection apparatuses for an optical recording/reproducing system, which are described with reference to FIGS. 33 and 39, can detect a radial tilt error signal and/or a tracking error signal.

Figure 40:
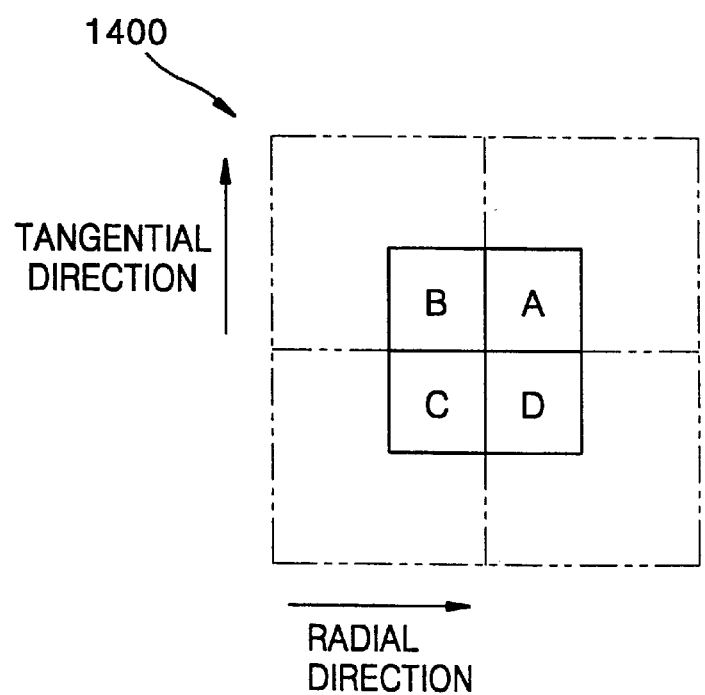

Unlike the photodetector 1300-3 of FIG. 39, the photodetector 1400 as shown in FIG. 40 may include first through fourth light receiving portions A, B, C and D, which are arranged close to each other to receive the central portion of the 0th order diffracted beam reflected and diffracted from the recording medium. For this case, the phase relationship between the detection signals a, b, c and d of the first through fourth light receiving portions A, B, C and D is the same as that between the detection signals a, b, c and d of the inner light receiving portions shown in FIG. 5 or 23.

Figure 41:
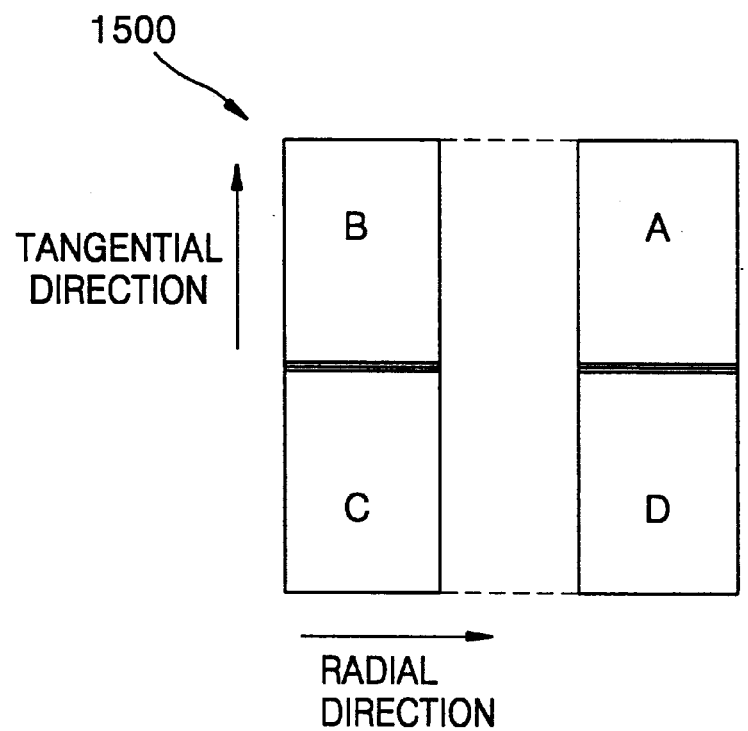

Alternatively, as shown in FIG. 41, the photodetector 1500 may include first through fourth light receiving portions A, B, C and D, which are separated in the radial direction. For this case, the first through fourth light receiving portions A, B, C and D are approximately the same as the outer light receiving portions A1, B1, C1 and D1 shown in FIG. 5 or 22.

Figure 42:
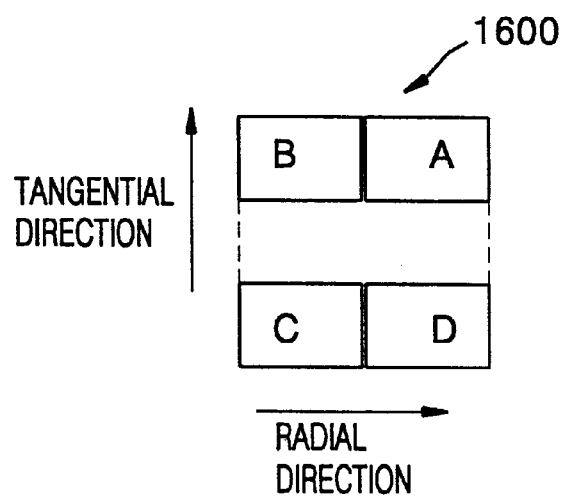

As shown in FIG. 42, the photodetector 1600 may include light receiving portions A, B, C and D arranged separated by a predetermined distance in only the tangential direction.

This arrangement of the light receiving portions A, B, C and D is similar to that of the outer light receiving portions A1', B1', C1' and D1' of the photodetector 1000 shown in FIG. 23.

In the error detection apparatuses described in the previous embodiments, assuming that tilt error signals detected at +1 and −1 radial tilts with respect to a reference level on On-track positions are v1 and v2, respectively, it is preferable that the maximum value of $|(v1-v2)/(v1+v2)|$ is 0.2 or less.

Assuming that the tilt error signals detected at +1° and −1° radial tilts with respect to a reference level on Off-track positions are v3 and v4, respectively, it is preferable that the minimum absolute value of v1 or v2 is about 30% of the value of v3 or v4.

As for a tracking error signal, assuming that the period of a channel clock of the optical recording/reproducing system is T, the average phase difference time is $\Delta t$, if the center of the light spot is off by 0.1 $\mu$m from the center of pit or mark stream recorded on the recording medium, the minimum value of $\Delta t/T$ is about 0.5.

Assuming that the positive maximum value of the tracking error signal is T1 and the negative maximum value thereof is T2, it is preferable that the maximum value of $|(T1-T2)/(T1+T2)|$ is about 0.2.

In the error signal detection apparatuses according to the present invention, the phase comparators selectively block or amplify the input signals according to frequency band, digitize the resultant signals, compare the phases of the digitized signal, and integrate the phase comparison signals, thereby outputting a tracking error signal.

In the previous embodiments, an adder can be adopted at the nodes of two or more signals of the circuit units.

As for the error detection apparatuses with the circuit unit adopting a plurality of phase comparators, as shown in FIG. 5, FIG. 8, FIG. 12, FIGS. 16 through 20, FIGS. 23 through 26, FIG. 30, and FIGS. 33 through 34, the detection signals generated by the diagonally opposite light receiving portions are input to each of the positive input ports of the phase comparators, and the phase comparison signals output from the comparators are summed, thereby detecting error signals. However, the structure of the circuit unit is not limited to this structure. If the detection signals generated by the light receiving portions arranged in the different diagonal directions are input to each of the positive ports of the phase comparators, the circuit unit may output error signals using a differential unit instead of the adder.

In the circuit units described in the previous embodiments, the adder may be a simple adder for summing two or more input signals, or a summing amplifier. Also, the differential unit may be a simple subtractor for subtracting one input signal from the other input signal, or a differential amplifier.

In the error signal detection apparatuses for an optical recording/reproducing system according to the present invention, the photodetector receives light with divided light receiving portions in consideration of the phase characteristics of incident light reflected and diffracted from a recording medium, to detect error signals. Thus, although a high-density disk with narrow tracks is adopted, a tilt error signal and/or a tracking error signal can be detected with increased accuracy and precision.

In addition, use of a 8-section photodetector in 4×2 matrix, wherein the row direction of the matrix is parallel to the radial direction of the recording medium and the column direction is parallel to the tangential direction, ensures detection of a high-gain tracking error signal with reduced noise due to signal interference in the tangential direction.

Furthermore, a circuit unit capable of delaying and amplifying the detection signals of certain light receiving portions is employed, thereby reducing degradation of phase due to distortion of signal by variations in the depth of pits. Thus, even when the objective lens is shifted, a tracking error signal and/or tilt error signal—in particular, a radial tilt error signal, which are/is almost free from offset, can be detected.

Therefore, when the error signal detection apparatus according to the present invention is adopted to an optical recording/reproducing system, tracking and/or tilting can be more precisely controlled even for a high-density recording medium having narrow tracks. In particular, the error signal detection apparatus according to the present invention is very useful in an optical recording/reproducing system for ROM type media, and particularly, HD-DVD ROM type media.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An error signal detection apparatus for an optical recording/reproducing system, comprising;
    a photodetector which detects an information signal by receiving light reflected and diffracted from a recording medium, the photodetector comprising eight light receiving portions arranged in a 2 row×4 column matrix, each light receiving portion to separately perform photoelectric conversion on light reflected and diffracted from the recording medium to generate a respective detection signal, the row of the matrix being parallel to a direction corresponding to a radial direction of the recording medium, the column of the matrix being parallel to a direction corresponding to a tangential direction of the recording medium, the eight light receiving portions including four inner light receiving portions arranged at a center region of the photodetector and four outer light receiving portions arranged around corresponding inner light receiving portions, a direction of an information stream recorded on the recording medium being defined as the tangential direction, and a direction perpendicular to the information stream being defined as the radial direction; and
    a circuit unit which compares the phases of the detection signals of the inner and/or outer light receiving portions arranged in the same row to output at least one of a tilt error signal and/or a tracking error signal based on the phase comparison.

2. The error signal detection apparatus of claim 1, wherein the circuit unit comprises:
    a first phase comparator which compares the phases of the detection signals of the two inner or outer light receiving portions arranged in the first row of the matrix, to output a phase comparison signal;
    a second phase comparator which compares the phases of the detection signals of the remainder two inner or outer light receiving portions arranged in the second row of the matrix, to output a phase comparison signal; and
    an operator which at least one of sums and subtracts the phase comparison signals from the first and second phase comparators.

3. The error signal detection apparatus of claim 2, wherein the circuit unit further comprises delays which delay the detection signals of two inner or outer light receiving portions arranged in the first or second row of the matrix, to output the delayed signals to the first or second phase comparator, wherein degradation of phase of the error signal due to a variation in depth of pits on the recording medium can be prevented.

4. The error signal detection apparatus of claim 1, wherein the circuit unit comprises:

a first phase comparator which compares the phases of a first sum signal of the detection signal generated by one inner light receiving portion arranged in the first row of the matrix and the detection signal generated by the corresponding outer light receiving portion, and a second sum signal of the detection signal of the other inner light receiving portion and the detection signal generated by the corresponding outer light receiving portion; and a second phase comparator which compares the phases of a third sum signal of the detection signal generated by one inner light receiving portion arranged in the second row of the matrix and the detection signal generated by the corresponding outer light receiving portion, and a fourth sum signal of the detection signal of the other inner light receiving portion and the detection signal generated by the corresponding outer light receiving portion; and an operator for summing or subtracting the output signals from the first and second phase comparators.

5. The error signal detection apparatus of claim 4, wherein the circuit unit further comprises gain controllers which amplify the detection signals generated by the inner or outer light receiving portions by a predetermined gain factor so as to correct for a difference in the amplitudes of error signals detected using the detection signals generated by the inner and outer light receiving portions.

6. The error signal detection apparatus of claim 1, further comprising a detector which detects the envelope or a variation of center value of a signal output from the circuit unit according to relative tilting between an objective lens and the recording medium, to allow detection of a tilt error signal even when a tracking servo is not operated.

7. The error signal detection apparatus of claim 1, wherein the circuit unit comprises:

first and second phase comparators which compare the phases of the detection signals generated by the two outer and inner light receiving portions, respectively, arranged in the first row of the matrix, to output first and second phase comparison signals;

third and fourth phase comparators which compare the phases of the detection signals generated by the two outer and inner light receiving portions, respectively, arranged in the second row of the matrix, to output third and fourth phase comparison signals;

a first operator for summing or subtracting the first and third phase comparison signals, to output a first phase signal;

a second operator for summing or subtracting the second and fourth phase comparison signals, by the inner light receiving portions, which are output from the second and fourth phase comparators, to output a second phase signal; and a third operator for subtracting or summing the first and second phase signals from the first and second operators, to output the error signal.

8. The error signal detection apparatus of claim 7, wherein the third operator outputs a tilt error signal, and the circuit unit further comprises a fourth operator which outputs a tracking error signal by summing or subtracting the first and second phase signals, output from the first and second phase comparators.

9. The error signal detection apparatus of claim 7, wherein the circuit unit further comprises a gain controller at an output end of the first or second operator, which amplifies the first or second phase signal by a predetermined gain factor, to correct for a difference in the amplitudes of the first and second phase signals output from the first and second operators.

10. The error signal detection apparatus of claim 8, wherein the circuit unit further comprises a gain controller at an output end of the first or second operator, which amplifies the first or second phase signal by a predetermined gain factor, to correct for a difference in the amplitudes of the first and second phase signals output from the first and second operators.

11. The error signal detection apparatus of claim 1, wherein assuming that tilt error signals detected at +1° and −10° radial tilts with respect to a reference level on On-track positions are v1 and v2, respectively, and tilt error signals detected at +1° and −1° radial tilts with respect to a reference level on Off-track positions are v3 and v4, respectively, the maximum value of $|(v1-v2)/(v1+v2)|$ is 0.2 or less, and the minimum absolute value of v1 or v2 is about 30% of the value of v3 or v4.

12. The error signal detection apparatus of claim 1, wherein, when a tracking error signal is detected and the center of the light spot is off by 0.1 $\mu$m from the center of information stream recorded on the recording medium, assuming that the period of a channel clock of the optical recording/reproducing system is T, and the average phase difference time is $\Delta t$, the minimum value of $\Delta t/T$ is about 0.5.

13. The error signal detection apparatus of claim 1, wherein assuming that the positive maximum value of the tracking error signal is T1 and the negative maximum value thereof is T2, the maximum value of $|(T1-T2)/(T1+T2)|$ is about 0.2.

14. The error signal detection apparatus of claim 1, wherein the inner light receiving portions of the photodetector are narrow in the radial direction and wide in the tangential direction, and the total width of the inner light receiving portions of the photodetector in the radial direction is determined such that the inner light receiving portions receive about 10 to 80% of a 0th order diffracted beam reflected and diffracted from the recording medium.

15. The error signal detection apparatus of claim 14, wherein the total width of the inner light receiving portions in the radial direction is determined such that the inner light receiving portions receive a portion of a 0th order diffracted beam reflected and diffracted from the recording medium, exclusive of the portions overlapping +1st order diffracted beams reflected and diffracted from the recording medium, or receive a portion of the 0th order diffracted beam overlapping both ±1st order diffracted beams.

16. An error signal detection apparatus for an optical recording/reproducing system, comprising;

a photodetector which detects an information signal by receiving light reflected and diffracted from a recording medium, the photodetector comprising eight light receiving portions in a 2 row×4 column matrix, each light receiving portion to separately perform photoelectric conversion on light reflected and diffracted from the recording medium to generate a respective detection signal, the row of the matrix being parallel to a direction corresponding to a radial direction of the recording medium, the column of the matrix being parallel to a direction corresponding to a tangential direction of the recording medium, the eight light receiving portions including four inner light receiving portions arranged at the center region of the photodetector and four outer light receiving portions arranged around corresponding inner light receiving portions, a direction of an information stream recorded on the recording medium being defined as the tangential direction, and a direction perpendicular to the information stream being defined as the radial direction; and a circuit unit comprising:
- at least one amplifier which amplifies the detection signals generated by the inner and/or outer light receiving portions arranged in a first diagonal direction by a predetermined gain factor to output respective amplified signals, and
- a comparator which compares a phase of the amplified signal with a phase of the detection signals generated by inner light receiving portions and/or the outer light receiving portions arranged in a second diagonal direction, to output at least one of a tilt error signal and a tracking error signal based on the phase comparison.

17. The error signal detection apparatus of claim 16, wherein the circuit unit comprises:
- a gain controller which amplifies the sum of the detection signals generated by the inner or outer light receiving portions arranged in the first diagonal direction; and
- a phase comparator which compares the phase of the signal output from the gain controller, and the phase of the sum of the detection signals of the inner or outer light receiving portions arranged in the second diagonal direction, to output a phase comparison signal.

18. The error signal detection apparatus of claim 17, wherein the circuit unit further comprises a delay which delays for a predetermined period of time one of the sums of the detection signals, to prevent degradation of phase of the error signal due to a difference in pit depth of the recording medium.

19. The error signal detection apparatus of claim 16, wherein the circuit unit comprises:
- a first delay which delays for a first predetermined period of time the detection signal generated by one of the inner or outer light receiving portions arranged in one row in the first diagonal direction;
- a second delay which delays for a second predetermined period of time the detection signal generated by one of the inner or outer light receiving portions arranged in one row in the second diagonal direction; and
- a phase comparator which compares the phase of a first sum signal of the output signal of the first delay and the detection signal generated by the inner or outer light receiving portion arranged in the other row in the first diagonal direction, and the phase of a second sum signal of the output signal of the second delay and the detection signal generated by the inner or outer light receiving portion arranged in the other row in the second diagonal direction, to output a phase comparison signal.

20. The error signal detection apparatus of claim 19, wherein the circuit unit further comprises a gain controller which amplifies the first or second sum signal by a predetermined gain factor.

21. The error signal detection apparatus of claim 16, wherein the circuit unit further comprises:
- first and second gain controllers which amplify a first sum signal of the detection signals generated by the inner light receiving portions arranged in the first diagonal direction, and a second sum signal of the detection signals generated by the outer light receiving portions arranged in the first diagonal direction, by a predetermined gain factor, respectively;
- first and second phase comparators which compare the phase of a third sum signal of the detection signals generated by the inner light receiving portions arranged in the second diagonal direction and the phase of the output signal of the first gain controller; and the phase of a third sum signal of the detection signals generated by the outer light receiving portions arranged in the second diagonal direction and the phase of the output signal of the second gain controller, respectively, to output phase comparison signals; and
- a first operator for subtracting or summing the phase comparison signals output from the first and second phase comparators, to output the error signal.

22. The error signal detection apparatus of claim 21, further comprising first and second delays which delay for first and second predetermined periods of time, respectively, the first and second sum signals, or the third and fourth sum signals, respectively.

23. The error signal detection apparatus of claim 21, wherein the circuit unit further comprises a third gain controller at an output end of at least one of the first and second phase comparators, which amplifies the phase comparison signal from one of the first and second phase comparators by a predetermined gain factor, to correct for a difference in the amplitudes of the phase comparison signals output from the first and second phase comparators according to a division ratio of the inner and outer light receiving portions of the photodetector.

24. The error signal detection apparatus of claim 21, wherein the first operator subtracts or sums the phase comparison signals output from the first and second phase comparators, to output a tilt error signal, and the circuit unit further comprises a second operator for summing or subtracting the phase comparison signals output from the first and second phase comparators, to output a tracking error signal.

25. The error signal detection apparatus of claim 22, wherein the first operator subtracts or sums the phase comparison signals output from the first and second phase comparators, to output the tilt error signal, and the circuit unit further comprises a second operator which sums or subtracts the phase comparison signals output from the first and second phase comparators, to output the tracking error signal.

26. The error signal detection apparatus of claim 23, wherein the first operator subtracts or sums the phase comparison signals output from the first and second phase comparators, to output the tilt error signal, and the circuit unit further comprises a second operator which sums or subtracts the phase comparison signals output from the first and second phase comparators, to output the tracking error signal.

27. The error signal detection apparatus of claim 16, wherein the circuit unit comprises:
- first through fourth delays which delay for a predetermined period of time the detection signals generated by the inner and outer light receiving portions arranged in one row, respectively;

first and second adders which sum the delayed detection signals of the inner and outer light receiving portions arranged in the first diagonal direction, and the detection signals generated by the inner and outer light receiving portions in the other row in the first diagonal direction, to output first and second sum signals, respectively;

third and fourth adders which sum the delayed detection signals of the inner and outer light receiving portions arranged in the second diagonal direction, and the detection signals generated by the inner and outer light receiving portions in the other row in the second diagonal direction, to output third and fourth sum signals, respectively;

a first gain controller which amplifies the sum of the first and second sum signals by a predetermined gain factor; and a phase comparator which compares the phase of the output signal of the first gain controller and the phase of the sum of the third and fourth sum signals.

28. The error signal detection apparatus of claim 27, wherein the circuit unit further comprises a second gain controller which amplifies the first or second sum signal by a predetermined gain factor.

29. The error signal detection apparatus of claim 16, wherein the circuit unit comprises:

a first phase comparator which compares the phase of the sum of the detection signals generated by the outer light receiving portions arranged in the first diagonal direction, and the phase of the sum of the detection signals generated by the outer light receiving portions arranged in the second diagonal direction, to output a first phase comparison signal;

a second phase comparator which compares the phase of the sum of the detection signals generated by the inner light receiving portions arranged in the first diagonal direction, and the phase of the sum of the detection signals generated by the inner light receiving portions arranged in the second diagonal direction, to output a second phase comparison signal; and an operator sums or subtracts the first and second phase comparison signals.

30. The error signal detection apparatus of claim 16, wherein the inner light receiving portions of the photodetector are narrow in the radial direction and wide in the tangential direction, and the total width of the inner light receiving portions of the photodetector in the radial direction is determined such that the inner light receiving portions receive about 10 to 80% of a 0th order diffracted beam reflected and diffracted from the recording medium.

31. The error signal detection apparatus of claim 30, wherein the total width of the inner light receiving portions in the radial direction is determined such that the inner light receiving portions receive a portion of a 0th order diffracted beam reflected and diffracted from the recording medium, exclusive of the portions overlapping ±1st order diffracted beams reflected and diffracted from the recording medium, or receive a portion of the 0th order diffracted beam overlapping both ±1st order diffracted beams.

32. The error signal detection apparatus of claim 16, further comprising a detector which detects the envelope or a variation of a center value of a signal output from the circuit unit according to relative tilting between an objective lens and the recording medium, to allow detection of the tilt error signal even when a tracking servo is not operated.

33. The error signal detection apparatus of claim 16, wherein assuming that tilt error signals detected at +1° and −1° radial tilts with respect to a reference level on On-track positions are v1 and v2, respectively, and tilt error signals detected at +1° and −1° radial tilts with respect to a reference level on Off-track positions are v3 and v4, respectively, the maximum value of $|(v1-v2)/(v1+v2)|$ is 0.2 or less, and the minimum absolute value of v1 or v2 is about 30% of the value of v3 or v4.

34. The error signal detection apparatus of claim 16, wherein, when a tracking error signal is detected and the center of the light spot is off by 0.1 $\mu$m from the center of information stream recorded on the recording medium, assuming that the period of a channel clock of the optical recording/reproducing system is T, and the average phase difference time is $\Delta t$, the minimum value of $\Delta t/T$ is about 0.5.

35. The error signal detection apparatus of claim 16, wherein assuming that the positive maximum value of the tracking error signal is T1 and the negative maximum value thereof is T2, the maximum value of $|(T1-T2)/(T1+T2)|$ is about 0.2.

36. An error signal detection apparatus for an optical recording/reproducing system, comprising:

a photodetector which receives light reflected and diffracted from a recording medium, the photodetector comprising first through fourth light receiving portions arranged counterclockwise in order in a 2 row×2 column matrix, each light receiving portion to separately perform photoelectric conversion on light reflected and diffracted from the recording medium to generate a respective detection signal, the row of the matrix being parallel to a direction corresponding to a radial direction of the recording medium, the column of the matrix being parallel to a direction corresponding to a tangential direction of the recording medium, the direction of an information stream recorded on the recording medium being defined as the tangential direction, and a direction perpendicular to the information stream being defined as the radial direction; and a circuit unit which compares phases of the detection signals generated by the light receiving portions arranged in the same row or column, to detect at least one of a tilt error signal and a tracking error signal based on the phase comparison.

37. The error signal detection apparatus of claim 36, wherein the first through fourth light receiving portions are separated from each other by a distance L2 and/or a distance L1 in the direction corresponding to the radial and/or tangential direction, respectively.

38. The error signal detection apparatus of claim 37, wherein respective distances between the first through fourth light receiving portions separated in the direction corresponding to the radial and/or tangential direction is about 10 to 80% of the diameter of a 0th order diffracted beam reflected and diffracted from the recording medium.

39. The error signal detection apparatus of claim 36, wherein the first through fourth light receiving portions are arranged close to each other, such that the first through fourth light receiving portions receive the center region of 0th order diffracted beam reflected and diffracted from the recording medium.

40. The error signal detection apparatus of claim 36, wherein the circuit unit comprises:

a first phase comparator which compares the phases of the detection signals generated by the first and second light receiving portion arranged in one row of the matrix, or the first and fourth light receiving portions arranged in one column of the matrix, to output a first phase comparison signal;

a second phase comparator which compares the phases of the detection signals generated by the third and fourth light receiving portions arranged in the other row of the matrix, or the second and third light receiving portions arranged in the other column of the matrix, to output a second phase comparison signal; and an operator which sums or subtracts the first and second phase comparison signals.

41. The error signal detection apparatus of claim 36, wherein assuming that tilt error signals detected at +1° and −1° radial tilts with respect to a reference level on On-track positions are v1 and v2, respectively, and tilt error signals detected at +1° and −1° radial tilts with respect to a reference level on Off-track positions are v3 and v4, respectively, the maximum value of $|(v1-v2)/(v1+v2)|$ is 0.2 or less, and the minimum absolute value of v1 or v2 is about 30% of the value of v3 or v4.

42. The error signal detection apparatus of claim 36, wherein, when the tracking error signal is detected and the center of the light spot is off by 0.1 μm from the center of information stream recorded on the recording medium, assuming that the period of a channel clock of the optical recording/reproducing system is T, and the average phase difference time is Δt, the minimum value of Δt/T is about 0.5.

43. The error signal detection apparatus of claim 36, wherein the positive maximum value of the tracking error signal is T1 and the negative maximum value thereof is T2, the maximum value of $|(T1-T2)/(T1+T2)|$ is about 0.2.

44. The error signal detection apparatus of claim 36, wherein the photodetector has at least four additional light receiving portions inwards or outwards the first through fourth light receiving portions, and the additional light receiving portions detect an information signal from the recording medium.

45. An error signal detection apparatus for an optical recording/reproducing system, comprising:

a photodetector which receives light reflected and diffracted from a recording medium, the photodetector comprising first through fourth light receiving portions arranged counterclockwise in order in a 2 row×2 column matrix and separated by a predetermined distance in a direction corresponding to the radial direction, each first through fourth light receiving portion to separately perform photoelectric conversion on light reflected and diffracted from the recording to generate a respective detection signal, the row of the matrix being parallel to the direction corresponding to a radial direction of the recording medium, and the column of the matrix is parallel to a direction corresponding to a tangential direction of the recording medium, a direction of information stream recorded in the recording medium is defined as a tangential direction, and a direction perpendicular to the information stream is defined as a radial direction; and a detection circuit unit, comprising:

first and second delays which delay the phases of the respective detection signals generated by the first and second light receiving portions arranged in one row of the matrix, respectively; and a phase comparator which compares a phase of a sum of the delayed detection signal of the first light receiving portion and the detection signal generated by the diagonally opposite third light receiving portion, and a phase of a sum of the delayed detection signal of the second light receiving portion and the detection signal generated by the diagonally opposite fourth light receiving portion.

46. An error signal detection apparatus for an optical recording/reproducing system comprising:

a photodetector which receives light reflected and diffracted from a recording medium, the photodetector comprises eight light receiving portions in a 4×2 matrix, to separately perform photoelectric conversion on light reflected and diffracted from the recording medium, wherein the row of the matrix is parallel to a direction corresponding to the radial direction, and the column of the matrix is parallel to a direction corresponding to the tangential direction, and the eight light receiving portions include four inner light receiving portions arranged at the center region of the photodetector, and four outer light receiving portions arranged around the corresponding inner light receiving portions, and a circuit unit which compares the phases of the detection signals of the inner and/or outer light receiving portions arranged in the same row, to output at least one of a tilt and/or a tracking error signal based on the phase comparison.

47. The error signal detection apparatus of claim 46, wherein the circuit unit comprises:

a first phase comparator which compares the phases of the outer light receiving portions arranged in the first row, or the phases of the inner light receiving portions arranged in the second row, to output a first phase comparison signal;

a second phase comparator which compares the phases of the outer light receiving portions arranged in the fourth row, or the phases of the inner light receiving portions arranged in the third row, to output a second phase comparison signal; and an operator which sums or subtracts the first and second phase comparison signals, to output the tilt or tracking error signal.

48. The error signal detection apparatus of claim 46, wherein the circuit unit comprises:

first and second phase comparators which compares the phases of the detection signals generated by the outer light receiving portions arranged in the first row, and the phases of the detection signals generated by the outer light receiving portions arranged in the fourth row, to output first and second phase comparison signals, respectively;

third and fourth comparators which compare the phases of the detection signals generated by the inner light receiving portions arranged in the second row, and the phases of the detection signals generated by the inner light receiving portions arranged in the third row, to output third and fourth phase comparison signals, respectively;

a first operator which sums or subtracts the first and second phase comparison signals from the first and second phase comparators, to detect a first error signal by the outer light receiving portions;

a second operator sums or subtracts the third and fourth the phase comparison signals, to detect a second error signal by the inner light receiving portions; and a third operator which sums the first and second error signals, to output the tilt and or tracking error signal.

49. The error signal detection apparatus of claim 48, wherein the third operator amplifies at least one of the first and second error signals by a predetermined gain factor, and sums the amplified error signal and the other error signal, to detect at least one of the tilt error signal and the tracking error signal.

50. The error signal detection apparatus of claim 46, wherein the circuit unit comprises:

a first operator which amplifies the detection signal generated by one inner light receiving portion arranged in a first column by a predetermined gain factor, which sums the amplified signal and the detection signal generated by the corresponding outer light receiving portion;

a second operator which amplifies the detection signal generated by the other inner light receiving portion arranged in the first column by a predetermined gain factor, which sums the amplified signal and the detection signal generated by the corresponding outer light receiving portion;

a third operator which amplifies the detection signal generated by one inner light receiving portion arranged in a second column by a predetermined gain factor, which sums the amplified signal and the detection signal generated by the corresponding outer light receiving portion;

a fourth operator which amplifies the detection signal generated by the other inner light receiving portion arranged in the second column by a predetermined gain factor, which sums the amplified signal and the detection signal generated by the corresponding outer light receiving portion;

a first phase comparator which compares the phases of the signals output from the first and third operators, to output a phase comparison signal;

a second phase comparator which compares the phases of the signals output from the second and fourth operators, to output a phase comparison signal; and a fifth operator for summing or subtracting the phase comparison signals output from the first and second phase comparators, to output at least one of the tilt and tracking error signal.

51. The error signal detection apparatus of claim 46, wherein, when the tracking error signal is detected and the center of the light spot is off by 0.1 μm from the center of information stream recorded on the recording medium, the period of a channel clock of the optical recording/reproducing system is T, and the average phase difference time is Δt, the minimum value of Δt/T is about 0.5.

52. The error signal detection apparatus of claim 46, wherein when the positive maximum value of the tracking error signal is T1 and the negative maximum value thereof is T2, the maximum value of $|(T1-T2)/(T1+T2)|$ is about 0.2.

53. The error signal detection apparatus of claim 46, wherein when that tilt error signals detected at +1° and −1° radial tilts with respect to a reference level on On-track positions are v1 and v2, respectively, and tilt error signals detected at +1° and −1° radial tilts with respect to a reference level on Off-track positions are v3 and v4, respectively, the maximum value of $(v1-v2)/(v1+v2)|$ is 0.2 or less, and the minimum absolute value of v1 or v2 is about 30% of the value of v3 or v4.

54. An error signal detection apparatus for an optical recording/reproducing system, comprising:

a photodetector which receives light reflected and diffracted from a recording medium, the photodetector comprising eight light receiving portions in a 4 row×2 column matrix, each light receiving portion to separately perform photoelectric conversion on light reflected and diffracted from the recording medium to generate a respective detection signal, the row of the matrix being parallel to a direction corresponding to a radial direction of the recording medium, and the column of the matrix is parallel to a direction corresponding to a tangential direction of the recording medium, the eight light receiving portions including four inner light receiving portions arranged at the center region of the photodetector, and four outer light receiving portions arranged around corresponding inner light receiving portions, and a circuit unit which amplifies a sum of the detection signals generated by the inner and/or outer light receiving portions arranged in a first diagonal direction by a predetermined gain factor, compares a phase of the amplified signal with a phase of a sum of the detection signals generated by the inner and/or outer light receiving portions arranged in a second diagonal direction, to detect at least one of a tilt error signal and a tracking error signal.

55. The error signal detection apparatus of claim 54, wherein the circuit unit comprises:

an amplifier which amplifies the sum of the detection signals in the first diagonal direction; and a phase comparator which compares the phase of the amplified signal and the phase of the sum of the detection signals generated by the outer or inner light receiving portions arranged in the second diagonal direction, to detect the at least one tilt error signal and tracking error signal.

56. The error signal detection apparatus of claim 55, wherein the circuit unit further comprises delays which delay for a predetermined period of time the detection signals generated by the outer or inner light receiving portions arranged in one row, and the sums of the delayed signals and the detection signals generated by the inner or outer light receiving portion arranged in the other row are input to the amplifier and/or the phase comparator.

57. The error signal detection apparatus of claim 54, wherein the circuit unit comprises:

a first amplifier which amplifies the sum of the detection signals generated by the outer light receiving portions arranged in the first diagonal direction by a predetermined gain factor;

a second amplifier which amplifies the sum of the detection signals generated by the inner light receiving portions arranged in the first diagonal direction by a predetermined gain factor;

a first phase comparator which compares the phase of the output signal of the first amplifier and the phase of the sum of the detection signals generated by the outer light receiving portions arranged in the second diagonal direction, to output a first phase comparison signal;

a second phase comparator which compares the phase of the output signal of the second amplifier and the phase of the sum of the detection signals generated by the inner light receiving portions arranged in the second diagonal direction, to output a second phase comparison signal; and an operator for summing or subtracting the first and second phase comparison signals, to output at least one of the tilt error signal and the tracking error signal.

58. The error signal detection apparatus of claim 54, wherein the circuit unit comprises:

delays which delay for a predetermined period of time the detection signals generated by the outer light receiving portions arranged in one row, and the corresponding inner light receiving portions, to output delayed signals;

a first operator which receives the delayed detection signals for one inner light receiving portion and the corresponding outer light receiving portion, and the detection signals generated by the diagonally opposite inner and outer light receiving portions, amplifying the sum of the detection signals generated by the inner light receiving portions by a predetermined gain factor, which sums the amplified signal and the detection signals generated by the outer light receiving portions;

a second operator which receives the delayed detection signals for the other inner light receiving portion and the corresponding outer light receiving portion, and the detection signals generated by the diagonally opposite inner and outer light receiving portions, amplifying the sum of the detection signals generated by the inner light receiving portions by a predetermined gain factor, which sums the amplified signal and the detection signals generated by the outer light receiving portions;

an amplifier which amplifies the signal output from one of the first and second operators by a predetermined gain factor; and a phase comparator which compares the phase of the output signal output from the other first or second operator and the phase of the output signal of the amplifier, to detect the tilt and/or tracking error signal.

59. The error signal detection apparatus of claim 54, wherein, when a tracking error signal is detected and the center of the light spot is off by 0.1 μm from the center of information stream recorded on the recording medium, the period of a channel clock of the optical recording/reproducing system is T, and the average phase difference time is Δt, the minimum value of Δt/T is about 0.5.

60. The error signal detection apparatus of claim 54, wherein when the positive maximum value of the tracking error signal is T1 and the negative maximum value thereof is T2, the maximum value of |(T1−T2)/(T1+T2)| is about 0.2.

61. The error signal detection apparatus of claim 54, wherein when the tilt error signals detected at +1° and −1° radial tilts with respect to a reference level on On-track positions are v1 and v2, respectively, and tilt error signals detected at +1° and −1° radial tilts with respect to a reference level on Off-track positions are v3 and v4, respectively, the maximum value of |(v1−v2)/(v1+v2)| is 0.2 or less, and the minimum absolute value of v1 or v2 is about 30% of the value of v3 or v4.

62. An error signal detection apparatus for an optical recording/reproducing system, comprising:

a photodetector for receiving which detects light reflected and diffracted from a recording medium, the photodetector comprising first through fourth light receiving portions arranged counterclockwise in order in a 2×2 matrix, and separated in the radial and/or tangential direction, to separately perform photoelectric conversion on light reflected and diffracted from the recording medium, the first through fourth light receiving portions, wherein the row of the matrix is parallel to a direction corresponding to the radial direction of the recording medium, and the column of the matrix is parallel to a direction corresponding to the tangential direction, a direction of an information stream recorded on the recording medium being defined as the tangential direction, and a direction perpendicular to the information stream is defined as the radial direction; and a circuit unit comprising:

an amplifier which amplifies a sum of the detection signals generated by the first and third light receiving portions arranged in a first diagonal direction by a predetermined gain factor; and a phase comparator which compares a phase of an output signal of the amplifier and a phase of a sum of the detection signals generated by the second and fourth light receiving portions arranged in a second diagonal direction, to detect at least one of a tilt error signal and a tracking error signal.

63. The error signal detection apparatus of claim 62, wherein the circuit unit further comprises delays which delay for a predetermined period of time the detection signals generated by the first and second light receiving portions arranged in the first row, and the sums of the delayed signals and the detection signals generated by the third and fourth light receiving portions arranged in the second row are input to the amplifier and/or the phase comparator.

64. The error signal detection apparatus of claim 62, wherein the distance between the first through fourth light receiving portions separated in the direction corresponding to the radial and/or tangential direction is about 10 to 80% of the diameter of 0th order diffracted beam reflected and diffracted from the recording medium.

65. The error signal detection apparatus of claim 62, wherein, when a tracking error signal is detected and the center of the light spot is off by 0.1 μm from the center of information stream recorded on the recording medium, the period of a channel clock of the optical recording/reproducing system is T, and the average phase difference time is Δt, the minimum value of Δt/T is about 0.5.

66. The error signal detection apparatus of claim 62, wherein when the positive maximum value of the tracking error signal is T1 and the negative maximum value thereof is T2, the maximum value of |(T1−T2)/(T1+T2)| is about 0.2.

67. The error signal detection apparatus of claim 62, wherein when tilt error signals detected at +1° and −1° radial tilts with respect to a reference level on On-track positions are v1 and v2, respectively, and tilt error signals detected at +1° and −1° radial tilts with respect to a reference level on Off-track positions are v3 and v4, respectively, the maximum value of |(v1−v2)/(v1+v2)| is 0.2 or less, and the minimum absolute value of v1 or v2 is about 30% of the value of v3 or v4.

68. An apparatus for detecting a reproduction signal with a photodetector having eight light receiving portions in a 2×4 matrix, four inner light receiving portions arranged at the center region of the photodetector, and four outer light receiving portions arranged around the corresponding inner light receiving portions, wherein, when the direction of information stream recorded on the recording medium is defined as a tangential direction, and the direction perpendicular to the information stream is defined as a radial direction, the row of the matrix is parallel to a direction corresponding to the radial direction of the recording medium, and the column of the matrix is parallel to a direction corresponding to the tangential direction, the apparatus comprising:

first through fourth delays which delay a predetermined period of time the detection signals generated by the inner and outer light receiving portions, respectively, arranged in one row;

a first adder for summing a delayed detection signal for one of the inner light receiving portions arranged in a first diagonal direction and the detection signal generated by the other inner light receiving portion arranged in the first diagonal direction, to output a first sum signal;

a second adder for summing a delayed detection signal for one of the outer light receiving portions arranged in the first diagonal direction and the detection signal generated by the other outer light receiving portion arranged in the first diagonal direction, to output a second sum signal;

a third adder for summing a delayed detection signal for one of the inner light receiving portions arranged in a second diagonal direction and the detection signal generated by the other inner light receiving portion arranged in the second diagonal direction, to output a third sum signal;

a fourth adder for summing a delayed detection signal for one of the outer light receiving portions arranged in the second diagonal direction and the detection signal generated by the other outer light receiving portion arranged in the second diagonal direction, to output a fourth sum signal; and a fifth adder for summing the first through fourth sum signals to output the reproduction signal.

69. The apparatus of claim 68, further comprising first and second amplifiers amplifies the first and third sum signals, or the second and fourth sum signals, respectively, by a predetermined gain factor.

70. The apparatus of claim 69, wherein the sum of the gain factors for the first and second amplifiers is constant.

71. A method of detecting an error signal in an optical recording/reproducing system, the optical recording/reproduction system adapted to reproduce an information stream from a recording medium having a tangential direction parallel to a direction of the information stream, the method comprising:

providing a plurality of detectors which detect light reflected and diffracted from the recording medium, the detectors arranged in a matrix wherein at least two of the plurality of detectors are in each row and column of the matrix and the row of the matrix is parallel to the tangential direction of the information stream, each detector providing a respective detection signal having a phase relationship with respect to each of the other detectors;

comparing the phases of at least two of the detection signals, other than signals provided from the same column; and generating an error signal based on the comparison; and generating at least one of an envelope signal and a center value signal from the error signal.

72. The method as claimed in claim 71, further comprising delaying one of the detection signals by a predetermined time prior to the phase comparison.

73. The method as claimed in claim 71, further comprising multiplying one of the detection signals by a predetermined factor prior to the phase comparison.

74. A method of detecting an error signal in an optical recording/reproducing system, the optical recording/reproduction system adapted to reproduce an information stream from a recording medium having a tangential direction parallel to a direction of the information stream, the method comprising:

providing a plurality of detectors which detect light reflected and diffracted from the recording medium, the detectors arranged in a matrix wherein at least two of said plurality of detectors are in each row and column of the matrix and the row of the matrix is parallel to the tangential direction of the information stream, each detector providing a respective detection signal having a phase relationship with respect to each of the other detectors;

summing at least four of the detection signals in pairs, other than a pair provided from the same column of the matrix;

multiplying at least one of the summed signals by a predetermined factor;

comparing a phase of at least one multiplied signal with a phase of at least one summed signal; and generating at least one of a tilt error signal and a tracking error signal based on the comparison.

75. The method as claimed in claim 73, further comprising delaying one of the summed signals by a predetermined time prior to the phase comparison.

* * * * *

UNITED STATES PATENT AND TRADEMARK OFFICE
CERTIFICATE OF CORRECTION

PATENT NO. : 6,507,544 B1
DATED : January 14, 2003
INVENTOR(S) : Byung-in Ma et al.

It is certified that error appears in the above-identified patent and that said Letters Patent is hereby corrected as shown below:

Title page,
Item [56], References Cited, U.S. PATENT DOCUMENTS, delete "08/2001" and insert -- 04/1998 --.
Item [57], ABSTRACT,
Line 8, after "photodetector", insert -- . --.

Column 30,
Line 23, delete "-10º" and insert -- -1º --.

Column 34,
Line 37, insert paragraph after "; and".

Column 37,
Line 56, after "value of", insert -- 1 --.

Signed and Sealed this

Twenty-ninth Day of July, 2003

JAMES E. ROGAN
*Director of the United States Patent and Trademark Office*